US012431608B2

(12) United States Patent
Kim et al.

(10) Patent No.: US 12,431,608 B2
(45) Date of Patent: Sep. 30, 2025

(54) ANTENNA MODULE ARRANGED IN VEHICLE

(71) Applicant: LG ELECTRONICS INC., Seoul (KR)

(72) Inventors: Dongjin Kim, Seoul (KR); Kangjae Jung, Seoul (KR); Soyeon Lee, Seoul (KR); Kukheon Choi, Seoul (KR); Byeongyong Park, Seoul (KR); Ilnam Cho, Seoul (KR); Byungwoon Jung, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 19/099,418

(22) PCT Filed: Aug. 2, 2022

(86) PCT No.: PCT/KR2022/011420
§ 371 (c)(1),
(2) Date: May 8, 2025

(87) PCT Pub. No.: WO2024/029640
PCT Pub. Date: Feb. 8, 2024

(65) Prior Publication Data
US 2025/0266606 A1    Aug. 21, 2025

(51) Int. Cl.
*H01Q 1/12* (2006.01)
*H01Q 5/30* (2015.01)
(Continued)

(52) U.S. Cl.
CPC ............. *H01Q 1/1271* (2013.01); *H01Q 5/30* (2015.01); *H01Q 9/26* (2013.01); *B60J 1/00* (2013.01)

(58) Field of Classification Search
CPC ............ H01Q 1/1271; H01Q 5/30; H01Q 9/26
See application file for complete search history.

(56) References Cited

U.S. PATENT DOCUMENTS

| 7,324,049 B2 * | 1/2008 | Myoung | H01Q 9/40 |
| | | | 343/846 |
| 9,270,017 B2 * | 2/2016 | Villarroel | H01Q 1/3275 |
| (Continued) | | | |

FOREIGN PATENT DOCUMENTS

| KR | 10-2005-0071968 | 7/2005 |
| KR | 10-2016-0054848 | 5/2016 |
| (Continued) | | |

OTHER PUBLICATIONS

PCT International Application No. PCT/KR2022/011420, International Search Report dated Apr. 27, 2023, 4 pages.

*Primary Examiner* — Awat M Salih
(74) *Attorney, Agent, or Firm* — LEE, HONG, DEGERMAN, KANG & WAIMEY

(57) ABSTRACT

This vehicle comprises: a transparent dielectric substrate including a first region and a second region; an antenna arranged in the first region of one side surface of the dielectric substrate; and a ground conductive pattern and a feed pattern arranged in the second region of the one side surface of the dielectric substrate. The antenna includes: a first conductive pattern including a first portion and a second portion; a second conductive pattern electrically connected to a first portion of the ground conductive pattern; a third conductive pattern including a third portion, a fourth portion, a fifth portion, and a sixth portion; and a fourth conductive pattern surrounding the first conductive pattern, the second conductive pattern, and the third conductive pattern on the one side of the dielectric substrate.

19 Claims, 45 Drawing Sheets

(51) Int. Cl.
*H01Q 9/26* (2006.01)
*B60J 1/00* (2006.01)

(56) References Cited

U.S. PATENT DOCUMENTS

| | | | | |
|---|---|---|---|---|
| 10,027,015 B2 * | 7/2018 | Kim | ................... | H01Q 1/1271 |
| 11,569,580 B2 * | 1/2023 | Dai | ................... | H01Q 1/325 |
| 11,955,708 B2 * | 4/2024 | Park | ................... | H01Q 21/08 |
| 12,009,585 B2 * | 6/2024 | Woo | ................... | H01Q 1/44 |
| 2007/0120756 A1 * | 5/2007 | Ogino | ................... | H01Q 1/1271 |
| | | | | 343/704 |

FOREIGN PATENT DOCUMENTS

| KR | 10-2021-0126778 | 10/2021 |
|---|---|---|
| KR | 10-2021-0127760 | 10/2021 |
| KR | 10-2022-0106203 | 7/2022 |

\* cited by examiner (a)

(b)

(c)

(a)

(b)

(a)

(b)

(a)

(b)

(a)

(b)

(a)

(b)

(a)

(b)

(a)

(b)

(a)

(b)

(a)

(b)

(a)

(b)

(a)

(b)

(a)

(b)

(a)

(b)

(a)

(b)

(c)

(d)

(a)

(b)

(c)

ANTENNA MODULE ARRANGED IN VEHICLE

CROSS-REFERENCE TO RELATED APPLICATION

This application is the National Stage filing under 35 U.S.C. 371 of International Application No. PCT/KR2022/011420, filed on Aug. 2, 2022, the contents of which are hereby incorporated by reference herein its entirety.

TECHNICAL FIELD

The present disclosure relates to a transparent antenna disposed on a vehicle. One specific implementation relates to an antenna assembly made of a transparent material to suppress an antenna region from being visible on glass of a vehicle.

BACKGROUND ART

A vehicle may perform wireless communication services with other vehicles or nearby objects, infrastructures, or a base station. In this regard, various communication services may be provided through a wireless communication system to which an LTE communication technology or a 5G communication technology is applied. Meanwhile, some of LTE frequency bands may be allocated to provide 5G communication services.

On the other hand, there is a problem in that a vehicle body and a vehicle roof are formed of a metallic material to block radio waves. Accordingly, a separate antenna structure may be disposed on a top of the vehicle body or the vehicle roof. Or, when the antenna structure is disposed on a bottom of the vehicle body or roof, a portion of the vehicle body or roof corresponding to a region where the antenna structure is disposed may be formed of a non-metallic material.

However, in terms of design, the vehicle body or roof needs to be integrally formed. In this case, the exterior of the vehicle body or roof may be formed of a metallic material. This may cause antenna efficiency to be drastically lowered due to the vehicle body or roof.

In order to increase a communication capacity without a change in the exterior design of the vehicle, a transparent antenna may be disposed on glass corresponding to a window of the vehicle. However, antenna radiation efficiency and impedance bandwidth characteristics may be deteriorated due to an electrical loss of the transparent antenna. Additionally, when a transparent antenna is disposed on a glass panel of a vehicle, there is a problem that antenna radiation efficiency may be reduced due to loss on the glass panel at frequencies above 2 GHz.

Meanwhile, in order to perform wireless communication in a vehicle, an antenna radiation pattern needs to be formed in a low elevation area within a certain angle range based on a horizontal plane of the vehicle. In this regard, vehicle glass may be formed to be inclined at a certain angle or more with respect to a vertical axis. There is a problem that an antenna radiation pattern is formed in an upward direction, i.e., a vertical direction, when the transparent antenna is disposed on the vehicle glass that is formed to be inclined at the certain angle or more.

DISCLOSURE OF INVENTION

Technical Problem

The present disclosure is directed to solving the aforementioned problems and other drawbacks. One aspect of the present disclosure is to provide a broadband transparent antenna assembly that can be disposed on vehicle glass.

Another aspect of the present disclosure is to improve antenna efficiency of a broadband transparent antenna assembly that can be disposed on vehicle glass.

Another aspect of the present disclosure is to improve an antenna radiation pattern in a low elevation area.

Another aspect of the present disclosure is to improve low elevation radiation characteristics when an antenna assembly is disposed on rear glass or front glass, which is configured in an inclined shape, among various types of vehicle glass.

Another aspect of the present disclosure is to provide an antenna structure that is capable of improving isolation characteristics between antenna elements performing a multiple-input and multiple-output (MIMO) operation.

Another aspect of the present disclosure is to provide a broadband antenna structure made of a transparent material that can reduce a feeding loss and improving antenna efficiency while operating in a wide band.

Another aspect of the present disclosure is to improve antenna efficiency of a feeding structure of a broadband transparent antenna assembly that can be disposed on vehicle glass, and secure reliability of a mechanical structure including the feeding structure.

Another aspect of the present disclosure is to minimize interference between a dummy mesh grid disposed in a dielectric region and an antenna region.

Another aspect of the present disclosure is to ensure invisibility of a transparent antenna and an antenna assembly including the same without deterioration of antenna performance.

Solution to Problem

According to one aspect of the present specification for achieving the above or other purposes, a vehicle includes: a transparent dielectric substrate including a first region and a second region; an antenna disposed in the first region on one side of the dielectric substrate; and a ground conductive pattern and a feeding pattern disposed in the second region on the one side of the dielectric substrate. The antenna includes: a first conductive pattern including a first part and a second part; a second conductive pattern electrically connected to a first part of the ground conductive pattern; a third conductive pattern including a third part, a fourth part, a fifth part, and a sixth part; and a fourth conductive pattern configured to surround the first conductive pattern, the second conductive pattern, and the third conductive pattern on the one side of the dielectric substrate.

In an embodiment, the first part may be vertically connected to the second part, and a portion of the second part may be connected to the feeding pattern. The third part may be parallel to the fifth part, a first end of the third part and a second end of the fifth part may be separated by a first gap, a second end of the third part and a first end of the fifth part may be connected by the fourth part, the sixth part may be connected to the second portion of the fifth part, and a portion of the sixth part may be electrically connected to the ground conductive pattern. A first end of the fourth conductive pattern may be electrically connected to a third part of the ground conductive pattern, and a second end of the fourth conductive pattern may be electrically connected to a fourth part of the ground conductive pattern.

In an embodiment, the first conductive pattern and the third conductive pattern may operate in a quasi self-complementary dipole antenna mode in a first frequency band.

In an embodiment, the first conductive pattern may operate in a monopole antenna mode in a second frequency band. The second frequency band may be wider than the first frequency band.

In an embodiment, the second conductive pattern may operate in a third frequency band. The third frequency band may be wider than the second frequency band.

In an embodiment, the first conductive pattern may have a size smaller than a size of the third conductive pattern. The second conductive pattern may be arranged between the first part of the first conductive pattern and the ground conductive pattern. The first part of the ground conductive pattern may include a first open slot.

In an embodiment, a height of the fifth part of the third conductive pattern may be $\lambda gh/2$ or less, and $\lambda gh$ may denote a guided wavelength corresponding to a highest frequency of an operating frequency band.

In an embodiment, a gap between the first part of the first conductive pattern and the first part of the ground conductive pattern may be equal to a height of the fifth part of the third conductive pattern.

In an embodiment, a horizontal distance from an end of the first conductive pattern to an end of the third conductive pattern may be equal to $\lambda gl/2$ and $\lambda gl$ may denote an induced wavelength corresponding to a lowest frequency of an operating frequency band.

In an embodiment, a mid-inside boundary of the third part and a mid-inside boundary of the fourth part may be separated by a second gap. The first gap may be smaller than the second gap.

In an embodiment, the third part, the fourth part, and the fifth part of the third conductive pattern may form a second open slot. A shape of the second open slot may be similar to a shape of the first part of the first conductive pattern.

In an embodiment, a gap between the third conductive pattern and the fourth conductive pattern may be equal to or smaller than $\lambda gh/4$.

In an embodiment, a width of the fourth conductive pattern may be formed to be equal to or smaller than $\lambda gh/2$.

In an embodiment, a first boundary side of the first part of the first conductive pattern may have a first straight line. A second boundary side of the first part of the first conductive pattern may have a first stepped structure. A third boundary side of the first part of the first conductive pattern may be arranged between a first end of the first boundary side of the first conductive pattern and a first end of the second boundary side of the first conductive pattern. A fourth boundary side of the first part of the first conductive pattern may be arranged between a second end of the first boundary side of the first conductive pattern and a second end of the second boundary side of the first conductive pattern.

In an embodiment, the first part of the ground conductive pattern and the third part of the ground conductive pattern may be separated by a first ground gap portion. The second part of the ground conductive pattern and the fourth part of the ground conductive pattern may be separated by a second ground gap portion.

In an embodiment, a distance of the second ground gap portion may be equal to or greater than a distance of the first ground gap portion.

In an embodiment, the first conductive pattern, the second conductive pattern, the third conductive pattern, and the fourth conductive pattern may be formed in a metal mesh shape having a plurality of opening areas on the transparent dielectric substrate. The first conductive pattern, the second conductive pattern, and the third conductive pattern may be formed in a Coplanar Waveguide (CPW) structure on the transparent dielectric substrate.

In an embodiment, the antenna assembly may include a plurality of dummy mesh grid patterns on an outer portion of the conductive patterns on the transparent dielectric substrate. The plurality of dummy metal grid patterns may be not connected to the feeding pattern and the ground conductive pattern. The plurality of dummy mesh grid patterns may be separated from each other.

A vehicle according to another aspect of the present disclosure may include a glass panel having a transparent region and an opaque region, and an antenna assembly disposed on the glass panel. The antenna assembly may include: a first transparent dielectric substrate including a first region and a second region; an antenna element disposed in the first region on one side of the first transparent dielectric substrate, wherein the first region on the one side of the first transparent dielectric substrate is disposed in the transparent region of the glass panel; first connection patterns connected to the antenna element and disposed in the second region on the one side of the first transparent dielectric substrate, wherein the second region on the one side of the first transparent dielectric substrate is disposed in the opaque region of the glass panel; a second dielectric substrate disposed in the opaque region of the glass panel; and a ground conductive pattern and a feeding pattern disposed in a third region on one side of the second dielectric substrate.

In an embodiment, the antenna pattern may include: a first conductive pattern including a first part and a second part; a second conductive pattern electrically connected to a first part of the ground conductive pattern; a third conductive pattern including a third part, a fourth part, a fifth part, and a sixth part; and a fourth conductive pattern configured to surround the first conductive pattern, the second conductive pattern, and the third conductive pattern on one side of the dielectric substrate.

In an embodiment, the first part may be vertically connected to the second part, and a portion of the second part may be connected to the feeding pattern. The third part may be parallel to the fifth part, a first end of the third part and a second end of the fifth part may be separated by a first gap, a second end of the third part and a first end of the fifth part may be connected by the fourth part, the sixth part may be connected to the second portion of the fifth part, and a portion of the sixth part may be electrically connected to the ground conductive pattern. A first end of the fourth conductive pattern may be electrically connected to a third part of the ground conductive pattern, and a second end of the fourth conductive pattern may be electrically connected to a fourth part of the ground conductive pattern.

A vehicle according to still another aspect of the present disclosure may include a glass panel having a transparent region and an opaque region, and an antenna assembly disposed on the glass panel. One side of the opaque region may include a ground conductive pattern and a feeding pattern. The antenna assembly may include: a first transparent dielectric substrate including a first region and a second region; an antenna element disposed in the first region on one side of the first transparent dielectric substrate, wherein the first region on the one side of the first transparent dielectric substrate is disposed in the transparent region of the glass panel; first connection patterns connected to the antenna element and disposed in the second region on the one side of the first transparent dielectric substrate, wherein the second region on the one side of the first transparent dielectric substrate is disposed in the opaque region of the glass panel; a second dielectric substrate disposed in the opaque region of the glass panel; and a ground conductive pattern and a feeding pattern disposed in a third region on one side of the second dielectric substrate.

In an embodiment, the antenna element may include: a first conductive pattern including a first part and a second part; a second conductive pattern electrically connected to the first part of the ground conductive pattern; a third conductive pattern including a third part, a fourth part, a fifth part, and a sixth part; and a fourth conductive pattern configured to surround the first conductive pattern, the second conductive pattern, and the third conductive pattern on one side of the dielectric substrate.

In an embodiment, the first part may be vertically connected to the second part, and a portion of the second part may be connected to the feeding pattern. The third part may be parallel to the fifth part, a first end of the third part and a second end of the fifth part may be separated by a first gap, a second end of the third part and a first end of the fifth part may be connected by the fourth part, the sixth part may be connected to the second portion of the fifth part, and a portion of the sixth part may be electrically connected to the ground conductive pattern. A first end of the fourth conductive pattern may be electrically connected to a third end of the ground conductive pattern, and a second end of the fourth conductive pattern may be electrically connected to a fourth part of the ground conductive pattern.

Advantageous Effects of Invention

Technical effects of a transparent antenna disposed on a vehicle will be described as follows.

According to this specification, an antenna assembly that can be disposed on vehicle glass can be implemented to operate in a plurality of operating modes to achieve a broadband operation.

According to this specification, the antenna efficiency of a broadband transparent antenna assembly can be improved by optimizing the shapes of conductive patterns that may be disposed within a limited space of vehicle glass.

According to this specification, impedance matching characteristics and antenna efficiency of a broadband transparent antenna assembly can be improved by forming conductive patterns in a complementary structure.

According to this specification, an antenna radiation pattern in a low elevation area can be improved by forming a conductive pattern operating as a ground to surround conductive patterns operating as radiators.

According to this specification, a conductive pattern operating as a ground can be formed to surround conductive patterns operating as radiators, thereby improving low elevation radiation characteristics in a structure in which an antenna assembly is disposed on rear glass or front glass configured in an inclined shape among various types of vehicle glass.

According to this specification, a ground conductive pattern of a ground ring structure can be arranged around antenna elements or between antenna elements to improve antenna performance, including isolation characteristics, during a MIMO operation.

According to this specification, an antenna assembly made of a transparent material can be optimally configured in a transparent region and an opaque region of vehicle glass, so that an antenna region is invisible on the vehicle glass.

According to this specification, a difference in visibility between a region where an antenna made of a transparent material to be disposed on vehicle glass is disposed and the other region can be minimized through optimization with a frit pattern for each metal mesh region.

According to this specification, a step that is generated when an opaque substrate is coupled to a transparent electrode part can be removed, thereby solving the problem of deteriorated visibility and mass production due to the step upon the coupling.

According to this specification, invisibility of a transparent antenna for a vehicle and an antenna assembly including the same can be secured without feeding loss and deterioration of antenna performance, which are caused by an increase in length of a transmission line due to a separate impedance matching part.

According to this specification, it is possible to ensure both invisibility of an antenna pattern and the shape of a transmission line and invisibility of an antenna assembly including a transparent electrode part and an opaque substrate part when the antenna assembly is attached to vehicle glass.

According to this specification, a wideband antenna structure made of a transparent material that can be implemented in various shapes on a single plane can be provided through a plurality of metal mesh-shaped conductive patterns, a CPW feeder, and a conversion structure between them.

According to this specification, a wideband antenna structure made of a transparent material that can reduce feeding loss and improve antenna efficiency while operating in a wide band can be provided through a transparent region and a frit region of vehicle glass.

MODE FOR THE INVENTION

Figure 1:
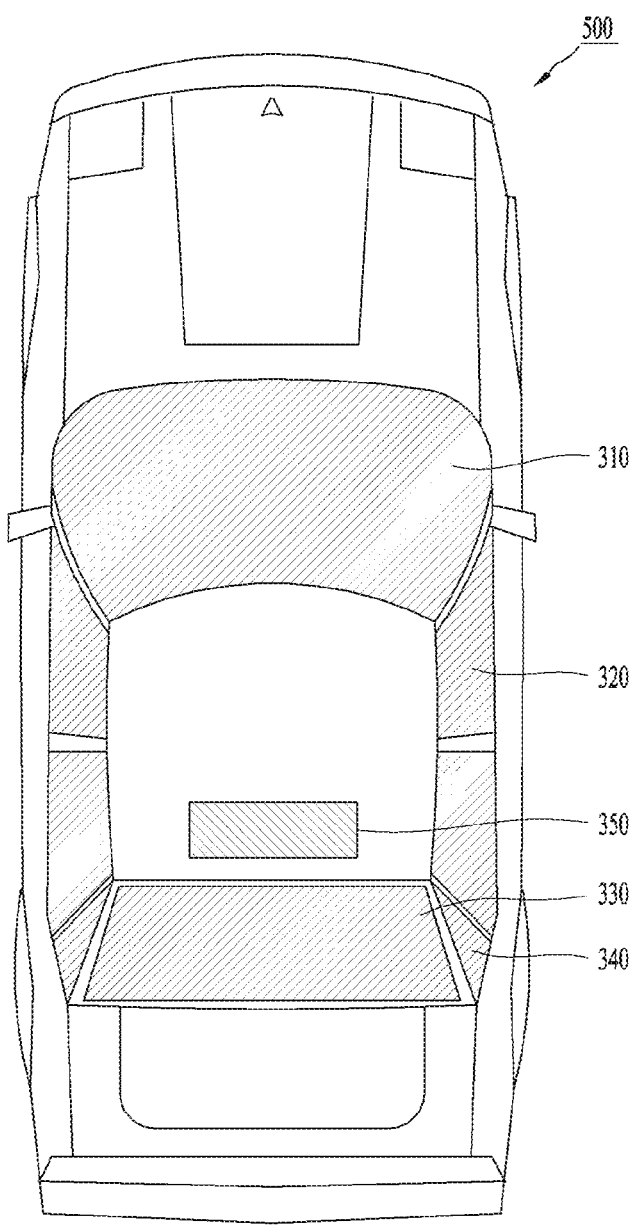
FIG. 1 is a diagram illustrating glass of a vehicle on which an antenna structure according to an embodiment of the present disclosure is to be disposed.

Description will now be given in detail according to exemplary implementations disclosed herein, with reference to the accompanying drawings. For the sake of brief description with reference to the drawings, the same or equivalent components may be provided with the same or similar reference numbers, and description thereof will not be repeated. A suffix "module" or "unit" used for elements disclosed in the following description is merely intended for easy description of the specification, and the suffix itself is not intended to give any special meaning or function. In describing the present disclosure, if a detailed explanation for a related known function or construction is considered to unnecessarily divert the gist of the present disclosure, such explanation has been omitted but would be understood by those skilled in the art. The accompanying drawings are used to help easily understand the technical idea of the present disclosure and it should be understood that the idea of the present disclosure is not limited by the accompanying drawings. The idea of the present disclosure should be construed to extend to any alterations, equivalents and substitutes besides the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the another element or intervening elements may also be present. In contrast, when an element is referred to as being "directly connected with" another element, there are no intervening elements present.

A singular representation may include a plural representation unless it represents a definitely different meaning from the context.

Terms "include" or "has" used herein should be understood that they are intended to indicate the existence of a feature, a number, a step, an element, a component or a combination thereof disclosed in the specification, and it may also be understood that the existence or additional possibility of one or more other features, numbers, steps, elements, components or combinations thereof are not excluded in advance.

An antenna system described herein may be mounted on a vehicle. Configurations and operations according to implementations may also be applied to a communication system, namely, antenna system mounted on a vehicle. In this regard, the antenna system mounted on the vehicle may include a plurality of antennas, and a transceiver circuitry and a processor that control the plurality of antennas.

Hereinafter, an antenna assembly (antenna module) that may be disposed on a window of a vehicle according to the present disclosure and an antenna system for a vehicle including the antenna assembly will be described. In this regard, the antenna assembly may refer to a structure in which conductive patterns are combined on a dielectric substrate, and may also be referred to as an antenna module.

Figure 5A:
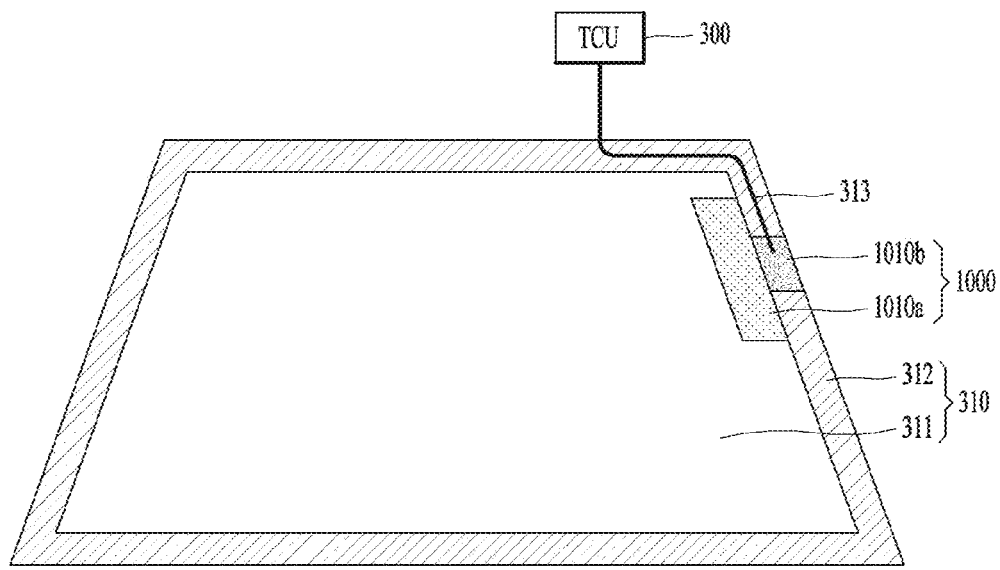
FIGS. 5A to 5C illustrate a configuration that an antenna assembly according to the present disclosure is disposed on vehicle glass.

FIG. 5A illustrates glass of a vehicle in which an example of an antenna module can be disposed. Referring to FIG. 1, the vehicle 500 may include a front glass 310, door glass 320, rear glass 330, and quarter glass 340. In some examples, the vehicle 500 may further include a top glass 350 that is a window disposed on a roof in an upper region.

Therefore, the glass constituting the window of the vehicle 500 may include the front glass 310 disposed at a front region of the vehicle, the door glass 320 disposed at a door region of the vehicle, and the rear glass 330 disposed at a rear region of the vehicle. In some examples, the glass constituting the window of the vehicle 500 may further include the quarter class 340 disposed at a partial region of the door region of the vehicle. In addition, the glass constituting the window of the vehicle 500 may further include the top glass 350 spaced apart from the rear glass 330 and disposed at an upper region of the vehicle. Accordingly, each glass constituting the window of the vehicle 500 may be referred to as a window.

The front glass 310 may be referred to as a front windshield because it prevents wind blown from a front side from entering the inside of the vehicle. The front glass 310 may have a two-layer bonding structure having a thickness of about 5.0 to 5.5 mm. The front glass 310 may have a bonding structure of glass/shatterproof film/glass.

The door glass 320 may have a two-layer bonding structure or may be formed of single-layer compressed glass. The rear glass 330 may have a two-layer bonding structure having a thickness of about 3.5 to 5.5 mm or may be formed of single-layer compressed glass. In the rear glass 330, a spaced distance between a transparent antenna and a hot wire and an AM/FM antenna is required. The quarter glass 340 may be formed of single-layer compressed glass having a thickness of about 3.5 to 4.0 mm, but is not limited thereto.

The size of the quarter glass 340 may vary depending on a type of vehicle, and may be significantly smaller than the sizes of the front glass 310 and the rear glass 330.

Figure 2A:
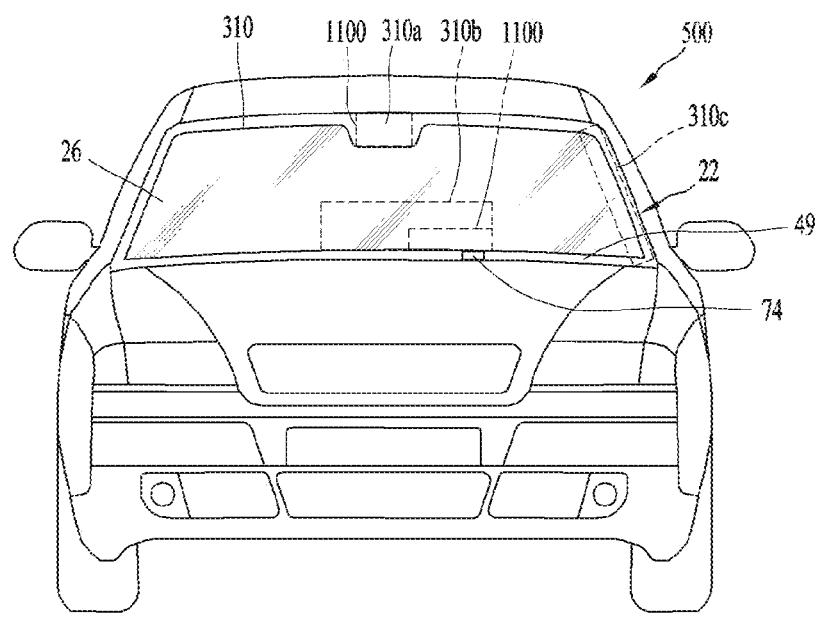
FIG. 2A is a front view of the vehicle with an antenna assembly disposed in different regions of a front glass of the vehicle of FIG. 1.
Figure 2B:
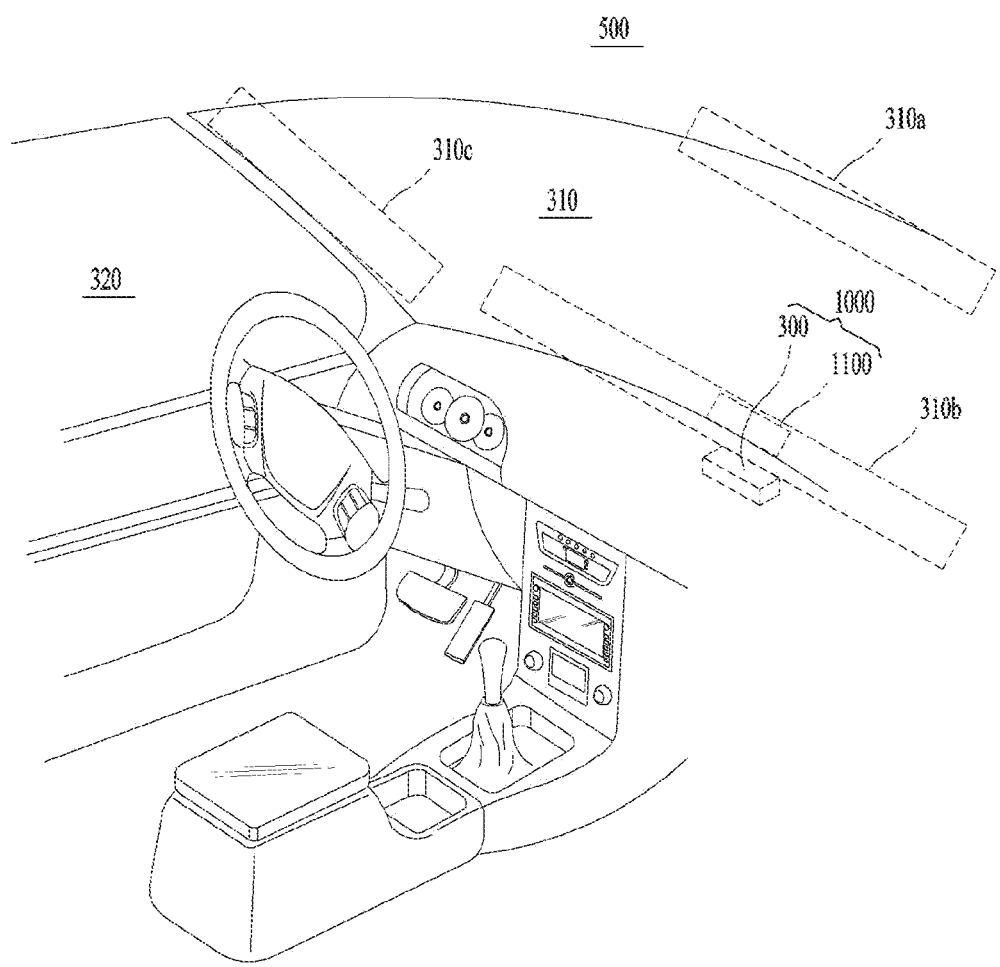
FIG. 2B is a front perspective view illustrating the inside of the vehicle with the antenna assembly disposed in the different regions of the front glass of the vehicle of FIG. 1.
Figure 2C:
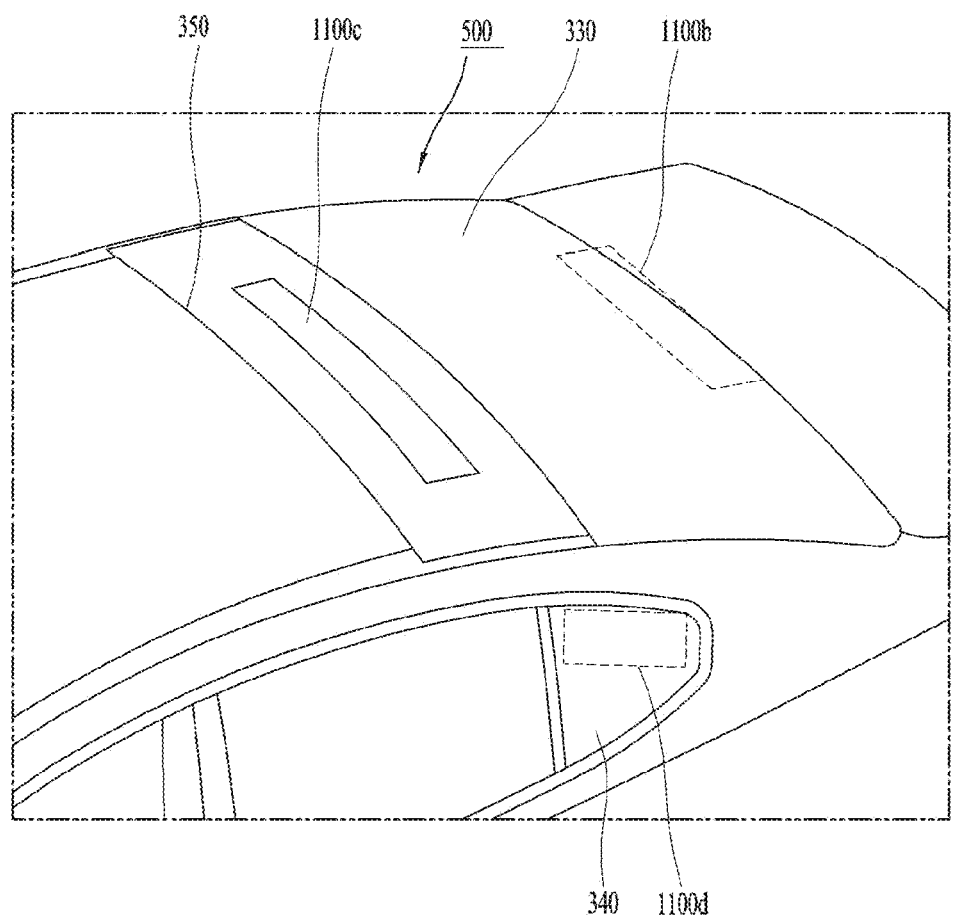
FIG. 2C is a side perspective view of the vehicle with the antenna assembly disposed on upper glass of the vehicle of FIG. 1.

Hereinafter, a structure in which an antenna assembly according to the present disclosure is disposed in different regions of the front glass of a vehicle will be described. An antenna assembly attached to the vehicle glass may be implemented as a transparent antenna. In this regard, FIG. 2A is a front view of the vehicle with an antenna assembly disposed in different regions of a front glass of the vehicle of FIG. 1. FIG. 2B is a front perspective view illustrating the inside of the vehicle with the antenna assembly disposed in the different regions of the front glass of the vehicle of FIG. 1. FIG. 2C is a side perspective view of the vehicle with the antenna assembly disposed on upper glass of the vehicle of FIG. 1.

Referring to FIG. 2A which is the front view of the vehicle 500, a configuration in which the transparent antenna for the vehicle can be disposed is illustrated. A pane assembly 22 may include an antenna disposed in an upper region 310a. The pane assembly 22 may include an antenna on the upper region 310a, an antenna on a lower region 310b, and/or an antenna on a side region 310c. In addition, the pane assembly 22 may include a translucent pane glass 26 formed of a dielectric substrate. The antenna on the upper region 310a, the antenna on the lower region 310b, and/or the antenna on the side region 310c are configured to support any one of various communication systems.

An antenna module 1100 may be disposed in the upper region 310a, the lower region 310b, or the side region 310c of a front glass 310. When the antenna module 1100 is disposed in the lower region 310b of the front glass 310, the antenna module 1100 may extend to a body 49 of a lower region of a translucent pane 26. The body 49 of the lower region of the translucent pane 26 may have lower transparency than other portions. A portion of a feeder and other interface lines may be disposed on the body 49 of the lower region of the translucent pane 26. A connector assembly 74 may be disposed on the body 49 of the lower region of the translucent pane 26. The body 49 of the lower region may constitute a vehicle body made of a metal material.

Referring to FIG. 2B, an antenna assembly 1000 may include a telematics control unit (TCU) 300 and an antenna assembly 1100. The antenna module 1100 may be disposed in different regions of glass of the vehicle.

Referring to FIGS. 2A and 2B, the antenna assembly may be disposed in the upper region 310a, the lower region 310b, and/or the side region 310c of the vehicle glass. Referring to FIGS. 2A to 2C, the antenna assembly may be disposed on the front glass 310, rear glass 330, quarter glass 340, and upper glass 350 of the vehicle.

Referring to FIGS. 2A to 2C, the antenna disposed in the upper region 310a of the front glass 310 of the vehicle may be configured to operate in a low band (LB), a mid band (MB), a high band (HB), and a 5G Sub6 band of 4G/5G communication systems. The antenna on the lower region 310b and/or the antenna on the side region 310c may also be configured to operate in the LB, MB, HB, and 5G Sub6 band of the 4G/5G communication systems. An antenna structure 1100b on the rear glass 330 of the vehicle may also be configured to operate in the LB, MB, HB, and 5G Sub6 band of the 4G/5G communication systems. An antenna structure 1100c on the upper glass 350 of the vehicle may also be configured to operate in the LB, MB, HB, and 5G Sub6 band of the 4G/5G communication systems. An antenna structure 1100d on the quarter glass 350 of the vehicle may also be configured to operate in the LB, MB, HB, and 5G Sub6 band of the 4G/5G communication systems.

At least a portion of an outer region of the front glass 310 of the vehicle may be defined by the translucent pane 26. The translucent pane 26 may include a first part at which an antenna and a portion of a feeder are formed, and a second part at which another portion of the feeder and a dummy structure are formed. The translucent pane 26 may further include a dummy region at which conductive patterns are not formed. For example, a transparent region of the translucent pane 22 may be transparent to secure light transmission and a field of view.

Although it is exemplarily illustrated that conductive patterns can be formed on a partial region of the front glass 310, the conductive patterns may extend to the side glass 320 and the rear glass 330 of FIG. 1, and an arbitrary glass structure. In the vehicle 500, the occupants or driver can view road and surrounding environment through the pane assembly 22. In addition, the occupants or driver can view the road and surrounding environment without interference with the antenna on the upper region 310a, the antenna on the lower region 310b, and/or the antenna on the side region 310c.

Figure 3:
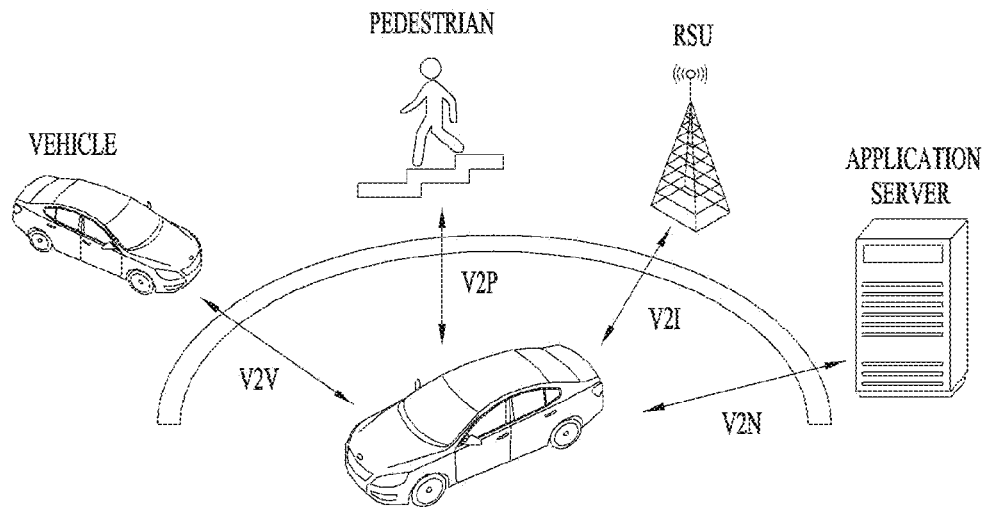
FIG. 3 illustrates types of V2X applications.

The vehicle 500 may be configured to communicate with pedestrians, surrounding infrastructures, and/or servers in addition to adjacent vehicles. FIG. 3 illustrates a type of V2X application. Referring to FIG. 3, V2X communication may include communications between a vehicle and all entities, such as V2V (Vehicle-to-Vehicle) which refers to communication between vehicles, V2I (Vehicle-to-Infrastructure) which refers to communication between a vehicle and an eNB or RSU (Road Side Unit), V2P (Vehicle-to-Pedestrian) which refers to communication between a vehicle and a terminal possessed by a person (pedestrian, cyclist, vehicle driver, or passenger), V2N (vehicle-to-network), and the like.

Figure 4:
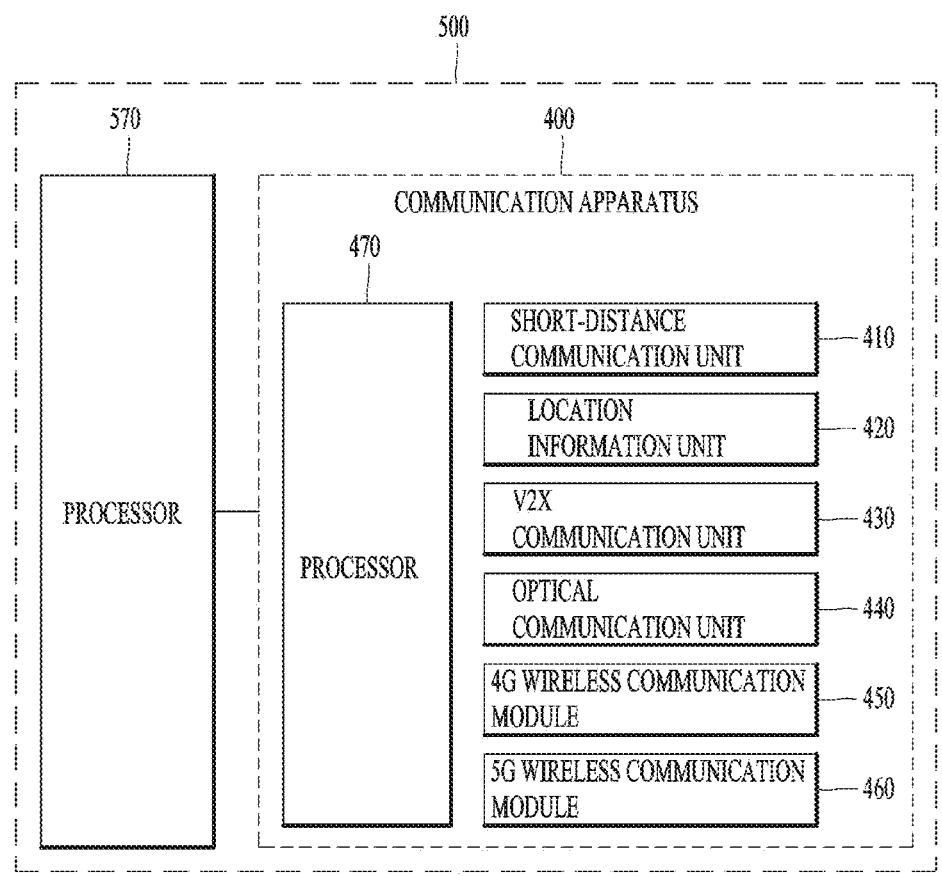
FIG. 4 is a block diagram referenced for explaining a vehicle and an antenna system mounted on the vehicle according to an embodiment of the present disclosure.

Meanwhile, FIG. 4 is a block diagram illustrating a vehicle and an antenna system mounted on the vehicle in accordance with an embodiment.

The vehicle 500 may include the communication apparatus 400 and the processor 570. The communication apparatus 400 may correspond to a telematics control unit of the vehicle 500.

The communication apparatus 400 may be an apparatus for performing communication with an external device. Here, the external device may be another vehicle, a mobile terminal, or a server. The communication apparatus 400 may perform the communication by including at least one of a transmitting antenna, a receiving antenna, and radio frequency (RF) circuit and RF device for implementing various communication protocols. In this regard, the communication apparatus 400 may include at least one of the short-range communication unit 410, the location information unit 420, the V2X communication unit 430, the optical communication unit 440, a 4G wireless communication module 450, and a 5G wireless communication module 460. The communication apparatus 400 may include a processor 470. According to an embodiment, the communication apparatus 400 may further include other components in addition to the components described, or may not include some of the components described.

A 4G wireless communication module 450 and a 5G wireless communication module 460 perform wireless communication with one or more communication systems through one or more antenna modules. The 4G wireless communication module 450 may transmit and/or receive signals to and/or from a device in a first communication system through a first antenna module. In addition, the 5G wireless communication module 460 may transmit and/or receive signals to and/or from a device in a second communication system through a second antenna module. The 4G wireless communication module 450 and 5G wireless communication module 460 may be physically implemented as one integrated communication module. For example, the first communication system and the second communication system may be an LTE communication system and a 5G communication system, respectively. However, the first communication system and the second communication system may not be limited thereto, and may be changed according to applications.

The processor of the device in the vehicle 500 may be implemented as a micro control unit (MCU) or a modem. The processor 470 of the communication apparatus 400 may correspond to a modem, and the processor 470 may be implemented as an integrated modem. The processor 470 may obtain surrounding information from other adjacent vehicles, objects, or infrastructures through wireless communication. The processor 470 may perform vehicle control using the acquired surrounding information.

The processor 570 of the vehicle 500 may be a processor of a car area network (CAN) or advanced driving assistance system (ADAS), but is not limited thereto. When the vehicle 500 is implemented in a distributed control manner, the processor 570 of the vehicle 500 may be replaced with a processor of each device.

In some examples, the antenna module disposed in the vehicle 500 may include a wireless communication unit. The 4G wireless communication module 450 may perform transmission and reception of 4G signals with a 4G base station through a 4G mobile communication network. In this case, the 4G wireless communication module 450 may transmit at least one 4G transmission signal to the 4G base station. In addition, the 4G wireless communication module 450 may receive at least one 4G reception signal from the 4G base station. In this regard, Uplink (UL) Multi-input and Multi-output (MIMO) may be performed by a plurality of 4G transmission signals transmitted to the 4G base station. In addition, Downlink (DL) MIMO may be performed by a plurality of 4G reception signals received from the 4G base station.

The 5G wireless communication module 460 may perform transmission and reception of 5G signals with a 5G base station through a 5G mobile communication network. Here, the 4G base station and the 5G base station may have a Non-Stand-Alone (NSA) architecture. The 4G base station and the 5G base station may be disposed in the Non-Stand-Alone (NSA) architecture. Alternatively, the 5G base station may be disposed in a Stand-Alone (SA) architecture at a separate location from the 4G base station. The 5G wireless communication module 460 may perform transmission and reception of 5G signals with a 5G base station through a 5G mobile communication network. In this case, the 5G wireless communication module 460 may transmit at least one 5G transmission signal to the 5G base station. In addition, the 5G wireless communication module 460 may receive at least one 5G reception signal from the 5G base station. In this instance, a 5G frequency band that is the same as a 4G frequency band may be used, and this may be referred to as LTE re-farming. In some examples, a Sub6 frequency band, which is a range of 6 GHz or less, may be used as the 5G frequency band. In contrast, a millimeter-wave (mmWave) band may be used as the 5G frequency band to perform wideband high-speed communication. When the mmWave band is used, the electronic device may perform beamforming for coverage expansion of an area where communication with a base station is possible.

Regardless of the 5G frequency band, in the 5G communication system, Multi-Input/Multi-Output (MIMO) may be supported to be performed multiple times, in order to improve a transmission rate. In this instance, UL MIMO may be performed by a plurality of 5G transmission signals that are transmitted to a 5G base station. In addition, DL MIMO may be performed by a plurality of 5G reception signals that are received from the 5G base station.

In some examples, a state of dual connectivity (DC) to both the 4G base station and the 5G base station may be attained through the 4G wireless communication module 450 and the 5G wireless communication module 460. As such, the dual connectivity with the 4G base station and the 5G base station may be referred to as EUTRAN NR DC (EN-DC). On the other hand, if the 4G base station and 5G base station are disposed in a co-located structure, throughput improvement can be achieved by inter-Carrier Aggregation (inter-CA). Accordingly, when the 4G base station and the 5G base station are disposed in the EN-DC state, the 4G reception signal and the 5G reception signal may be simultaneously received through the 4G wireless communication module 450 and the 5G wireless communication module 460, respectively. Short-range communication between electronic devices (e.g., vehicles) may be performed between electronic devices (e.g., vehicles) using the 4G wireless communication module 450 and the 5G wireless communication module 460. In one embodiment, after resources are allocated, vehicles may perform wireless communication in a V2V manner without a base station.

Meanwhile, for transmission rate improvement and communication system convergence, Carrier Aggregation (CA) may be carried out using at least one of the 4G wireless communication module 450 and the 5G wireless communication module 460 and a WiFi communication module. In this regard, 4G+WiFi carrier aggregation (CA) may be performed using the 4G wireless communication module 450 and the Wi-Fi communication module 113. Or, 5G+WiFi CA may be performed using the 5G wireless communication module 460 and the Wi-Fi communication module.

In some examples, the communication apparatus 400 may implement a display apparatus for a vehicle together with the user interface apparatus. In this instance, the display apparatus for the vehicle may be referred to as a telematics apparatus or an Audio Video Navigation (AVN) apparatus.

In some examples, a wideband transparent antenna structure that can be disposed on glass of a vehicle can be implemented as a single dielectric substrate on the same plane as a CPW feeder. In addition, the wideband transparent antenna structure that can be disposed on the glass of the vehicle may be implemented as a structure in which grounds are formed at both sides of a radiator so as to constitute a broadband structure.

Figure 5B:
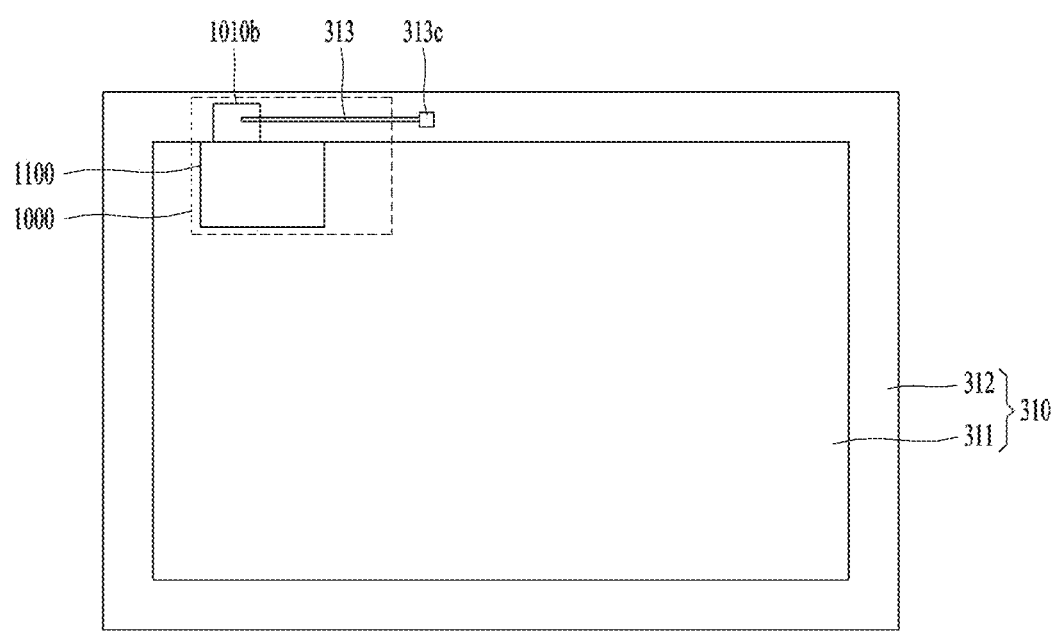

Hereinafter, an antenna assembly associated with a broadband transparent antenna structure according to the present disclosure will be described. In this regard, FIGS. 5A and 5B illustrate a configuration that the antenna assembly according to the present disclosure is disposed on the vehicle glass. Referring to FIG. 5A, the antenna assembly 1000 may include a first dielectric substrate 1010a and a second dielectric substrate 1010b. The first dielectric substrate 1010a is implemented as a transparent substrate and thus may be referred to as a transparent substrate 1010a. The second dielectric substrate 1010b may be implemented as an opaque substrate 1010b.

The glass panel 310 may be configured to include a transparent region 311 and an opaque region 312. The opaque region 312 of the glass panel 310 may be a frit region formed of a frit layer. The opaque region 312 may be formed to surround the transparent region 311. The opaque region 312 may be formed outside the transparent region 311. The opaque region 312 may form a boundary region of the glass panel 310.

A signal pattern formed on the dielectric substrate 1010 may be connected to the telematics control unit (TCU) 300 through a connector part 313 such as a coaxial cable. The telematics control unit (TCU) 300 may be disposed inside the vehicle, but is not limited thereto. The telematics control unit (TCU) 300 may be disposed on a dashboard inside the vehicle or a ceiling region inside the vehicle, but is not limited thereto.

Figure 5C:
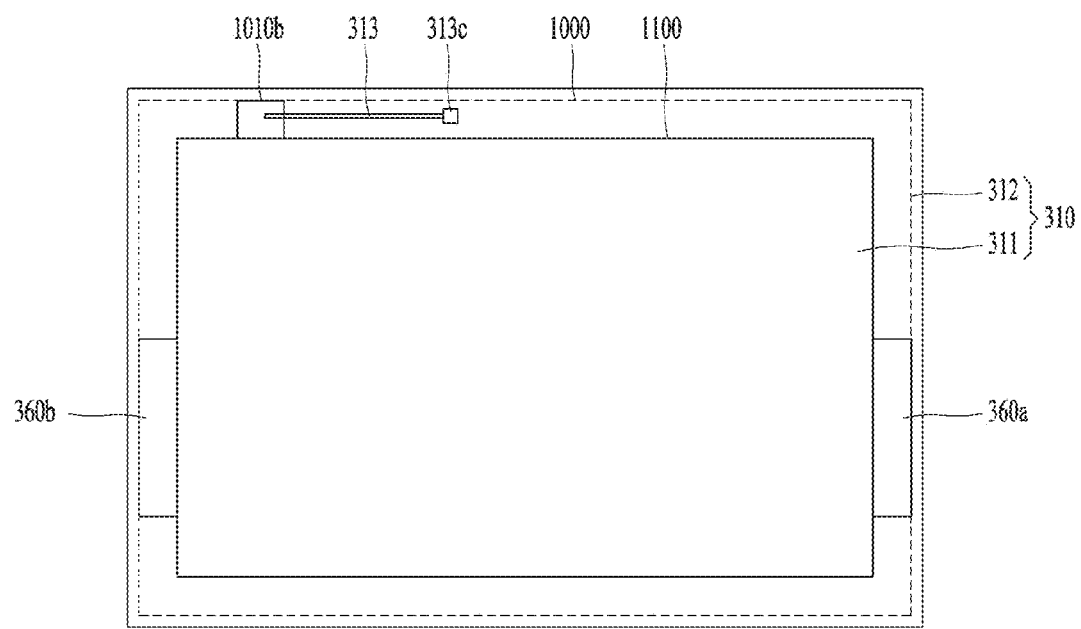

FIG. 5B illustrates a configuration in which the antenna assembly 1000 is disposed in a partial region of the glass panel 310. FIG. 5C illustrates a configuration in which the antenna assembly 1000 is disposed in an entire region of the glass panel 310.

Referring to FIGS. 5B and 5C, the glass panel 310 may include the transparent region 311 and the opaque region 312. The opaque region 312 is a non-visible region with transparency below a certain level and may be referred to as a frit region, black printing (BP) region, or black matrix (BM) region. The opaque region 312 corresponding to the non-visible region may be formed to surround the transparent region 311. The opaque region 312 may be formed in a region outside the transparent region 311. The opaque region 312 may form a boundary region of the glass panel 310. A second dielectric substrate 1010b or heating pads 360a and 360b corresponding to a feeding substrate may be disposed in the opaque region 312. A second dielectric substrate 1010b disposed in the opaque region 312 may be referred to as an opaque substrate. Even when the antenna assembly 1000 is disposed in the entire region of the glass panel 310 as illustrated in FIG. 5C, the heating pads 360a and 360b may be disposed in the opaque region 312.

Referring to FIG. 5B, the antenna assembly 1000 may include the first transparent dielectric substrate 1010a and the second dielectric substrate 1010b. Referring to FIGS. 5B and 5C, the antenna assembly 1000 may include the antenna module 1100 formed of conductive patterns and the second dielectric substrate 1010b. The antenna module 1100 may be formed of a transparent electrode part to be implemented as a transparent antenna module. The antenna module 1100 may be formed of one or more antenna elements. The antenna module 1100 may include a MIMO antenna and/or other antenna elements for wireless communication. The other antenna elements may include at least one of GNSS/radio/broadcasting/WiFi/satellite communication/UWB, and remote keyless entry (RKE) antennas for vehicle applications.

Referring to FIGS. 5A to 5C, the antenna assembly 1000 may be interfaced with the telematics control unit (TCU) 300 through the connector part 313. The connector part 313 may have a connector 313c on an end portion of a cable to be electrically connected to the TCU 300. A signal pattern formed on the second dielectric substrate 1010b of the antenna assembly 1000 may be connected to the TCU 300 through the connector part 313 such as a coaxial cable. The antenna module 1100 may be electrically connected to the TCU 300 through the connector part 313. The TCU 300 may be disposed inside a vehicle, but is not limited thereto. The TCU 300 may be disposed on a dashboard inside the vehicle or a ceiling region inside the vehicle, but is not limited thereto.

Meanwhile, when the transparent antenna assembly according to the present disclosure is attached to the inside or surface of the glass panel 310, a transparent electrode part including an antenna pattern and a dummy pattern may be disposed in the transparent region 311. On the other hand, an opaque substrate part may be disposed in the opaque region 312.

Figure 6A:
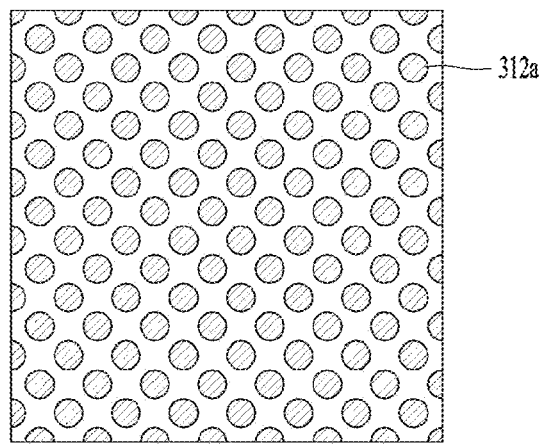
FIG. 6A illustrates various embodiments of a frit pattern according to the present disclosure.
Figure 6A:
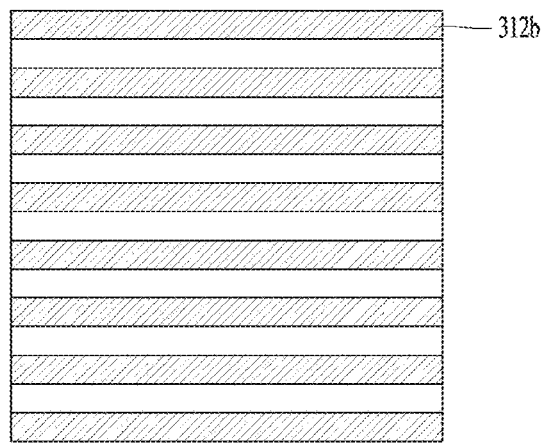
Figure 6A:
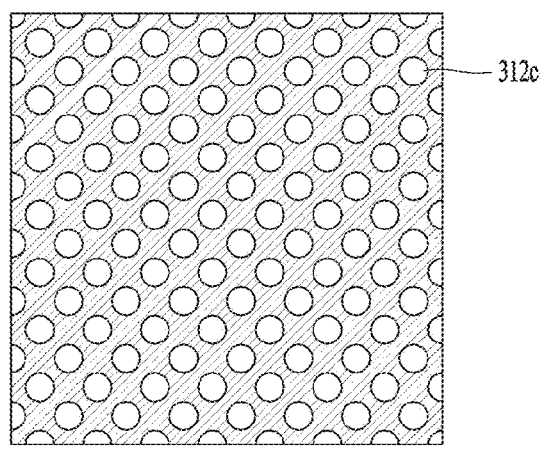
Figure 6B:
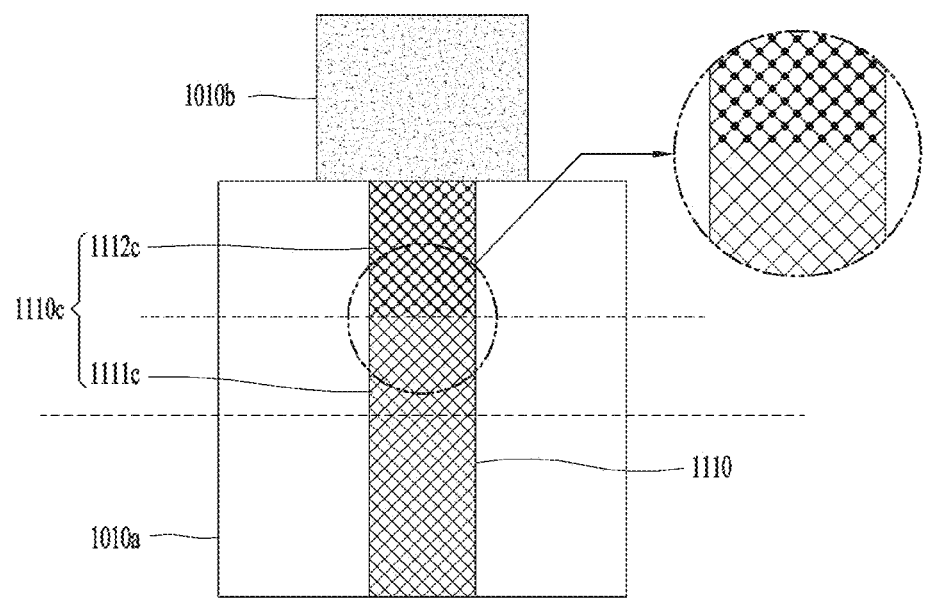
FIGS. 6B and 6C are diagrams illustrating a transparent antenna pattern and a structure in which the transparent antenna pattern is disposed on vehicle glass according to embodiments.
Figure 6B:
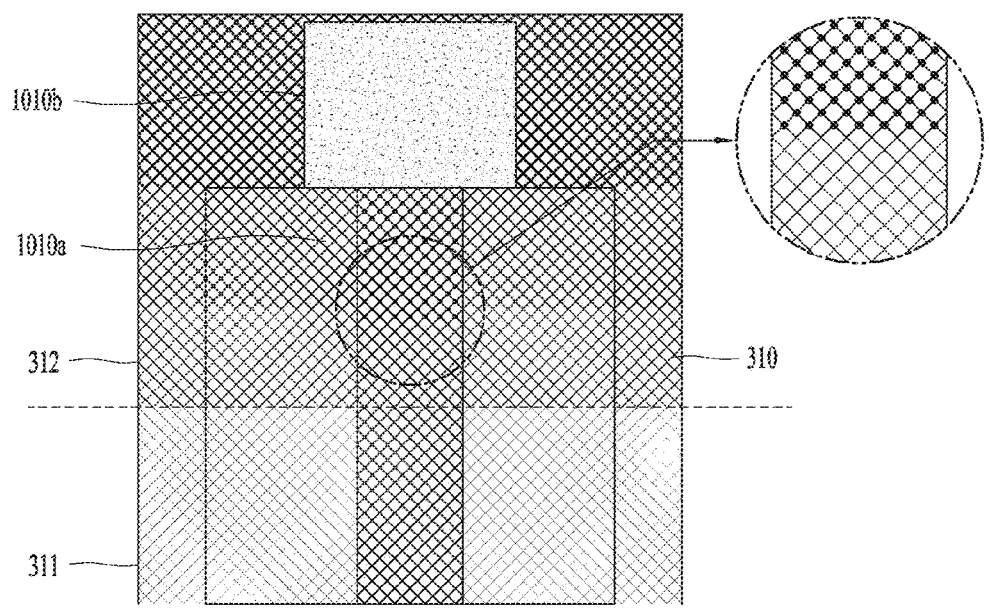
Figure 6C:
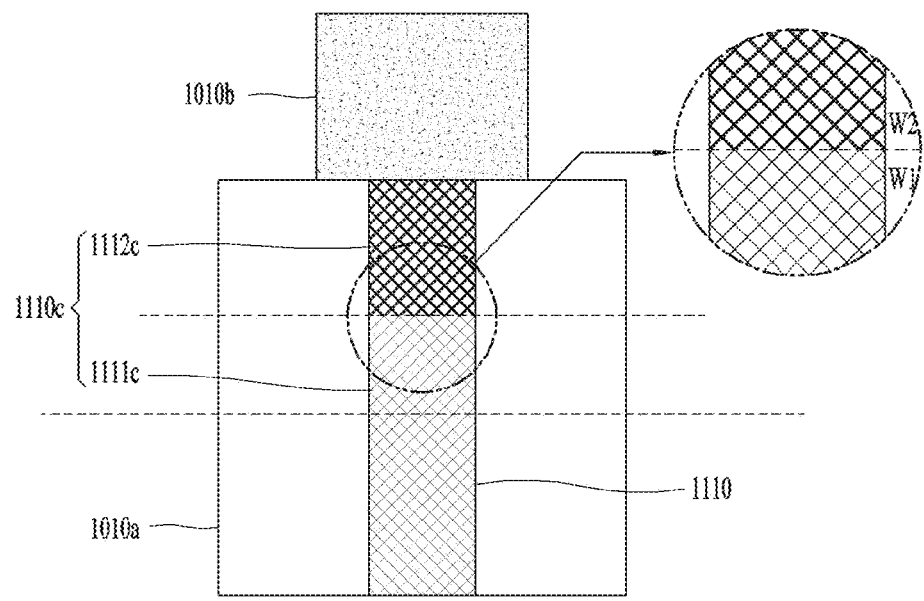
Figure 6C:
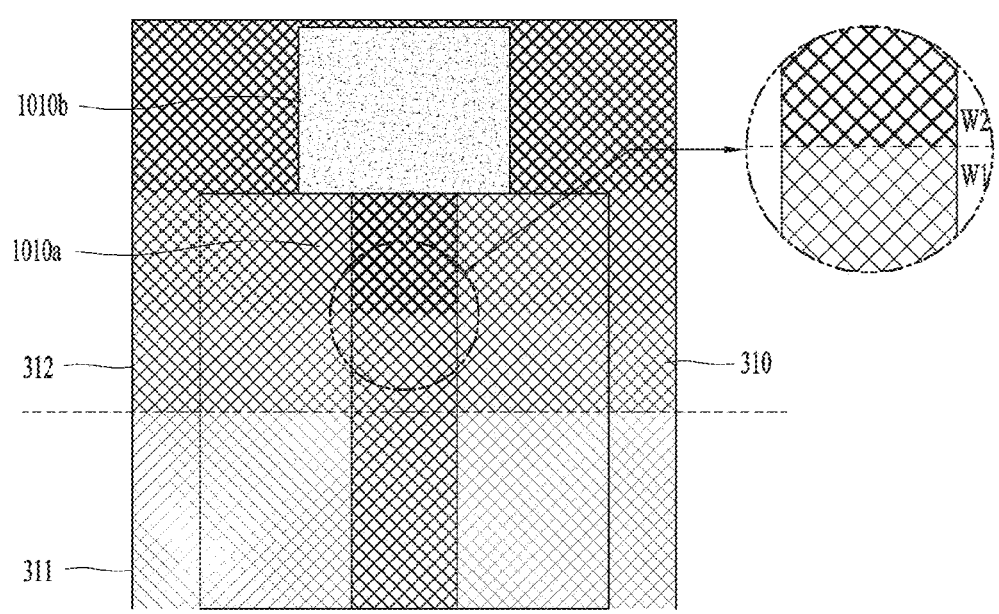

The antenna assembly formed on the vehicle glass according to the present disclosure may be disposed in the transparent region and the opaque region. In this regard, FIG. 6A illustrates various embodiments of a frit pattern according to the present disclosure. FIGS. 6B and 6C are diagrams illustrating a transparent antenna pattern and a structure in which the transparent antenna pattern is disposed on vehicle glass according to embodiments.

Referring to (a) of FIG. 6A, the frit pattern 312a may be formed as a metal pattern in a circular (polygonal, or oval) shape with a certain diameter. The frit pattern 312a may be disposed in a two-dimensional (2D) structure in both axial directions. The frit pattern 312a may be formed in an offset structure where center points between patterns forming adjacent rows are spaced apart by a certain distance.

Referring to (b) of FIG. 6A, the frit pattern 312b may be formed as a rectangular pattern in one axial direction. The frit pattern 312c may be disposed in a one-dimensional structure in one axial direction or in a two-dimensional structure in both axial directions.

Referring to (c) of FIG. 6A, the frit pattern 312c may be formed as a slot pattern, from which a metal pattern has been removed, in a circular (polygonal or oval) shape with a certain diameter. The frit pattern 312b may be disposed in a two-dimensional (2D) structure in both axial directions. The frit pattern 312c may be formed in an offset structure where center points between patterns forming adjacent rows are spaced apart by a certain distance.

Referring to FIGS. 5A to 6C, the opaque substrate 1010b and the transparent substrate 1010a may be electrically connected on the opaque region 312. In this regard, a dummy pattern, which is electrically very small to be a certain size or less, may be disposed adjacent to the antenna pattern to secure non-visibility of a transparent antenna pattern. Accordingly, the pattern within the transparent electrode can be made invisible to the naked eye without deterioration of antenna performance. The dummy pattern may be designed to have light transmittance similar to that of the antenna pattern within a certain range.

The transparent antenna assembly including the opaque substrate 1010b bonded to the transparent electrode part may be mounted on the glass panel 310. In this regard, to ensure invisibility, the opaque substrate 1010b connected to an RF connector or coaxial cable is disposed in the opaque region 312 of the vehicle glass. Meanwhile, the transparent electrode part may be disposed in the transparent region 311 of the vehicle glass to ensure the invisibility of the antenna from outside of the vehicle glass.

A portion of the transparent electrode part may be attached to the opaque region 312 in some cases. The frit pattern of the opaque region 312 may be gradated from the opaque region 312 to the transparent region 311. Transmission efficiency of a transmission line can be improved while the invisibility of the antenna can be improved in a manner of matching the light transmittance of the frit pattern with the light transmittance of the transparent electrode part within a certain range. Meanwhile, a metal mesh shape similar to the frit pattern can reduce sheet resistance while ensuring invisibility. In addition, the risk of disconnection of the transparent electrode layer during manufacturing and assembly can be reduced by increasing a line width of a metal mesh grid in a region connected to the opaque substrate 1010b.

Referring to (a) of FIGS. 6A and 6B, a conductive pattern 1110 of the antenna module may include metal mesh grids with the same line width on the opaque region 312. The conductive pattern 1110 may include a connection pattern 1110c for connecting the transparent substrate 1010a and the opaque substrate 1010b. On the opaque region 312, the connection pattern 1110c and the frit patterns of a predetermined shape on both side surfaces of the connection pattern 1110c may be disposed at certain intervals. The connection pattern 1110c may include a first penetration ratio portion 1111c formed with a first penetration ratio and a second penetration ratio portion 1112c formed with a second penetration ratio.

The frit patterns 312a formed on the opaque region 312 may include metal grids of a certain diameter arranged in one axial direction and another axial direction. The metal grids of the frit patterns 312a are the second penetration ratio portion 1112c of the connection pattern 1110c may be disposed at intersections of the metal mesh grids.

Referring to (b) of FIGS. 6A and 6B, the frit patterns 312b formed on the opaque region 312 may include slot grids of a certain diameter, from which a metal region has been removed, disposed in one axial direction and another axial direction. The slot grids of the frit patterns 312b may be disposed between the metal mesh grids in the connection pattern 1110c. Accordingly, the metal regions of the frit patterns 312b where slot grids are not formed may be disposed at the intersections of the metal mesh grids.

Referring to FIGS. 6A and 6C, the connection pattern 1110c may include metal mesh grids with a first line width W1 in the first penetration ratio portion 1111c adjacent to the transparent region 311. The connection pattern 1110c may be formed with a second line width W2 thicker than the first line width W1 in the second penetration ratio portion 1112c adjacent to the opaque substrate 1010b. In this regard, the first transparency of the first penetration ratio portion 1111c may be set higher than the second transparency of the second penetration ratio portion 1112c.

When the transparent antenna assembly is attached to the inside of the vehicle glass as illustrated in FIGS. 5A to 5C, the transparent electrode part may be disposed in the transparent region 311 and the opaque substrate 1010b may be disposed in the opaque region 312. In this regard, the transparent electrode part may be disposed in the opaque region 312 in some cases.

Metal patterns of a low-transmittance pattern electrode part and a high-transmittance pattern electrode part located on the opaque region 312 may partially be disposed in a gradient region of the opaque region 312. If the antenna pattern and a transmission line portion of the low-transmittance pattern electrode part is configured as a transparent electrode, a decrease in antenna gain may be caused by a decrease in transmission efficiency due to an increase in sheet resistance. As a way to overcome this loss of gain, the transmittance of the frit pattern 312 where an electrode is located and the transmittance of the transparent electrode can be made to match each other within a certain range.

Low sheet resistance can be achieved by increasing the line width of the transparent electrode located on a region where the transmittance of the frit pattern 312a, 312b, 312c is low or by adding the same shape as that of the frit pattern 312a, 312b, 312c. Accordingly, invisibility can be secured while solving the problem of reduced transmission efficiency. The transmittance and pattern of the opaque region 312 are not limited to those in the structure of FIG. 6A and may differ depending on a glass manufacturer or vehicle manufacturer. Accordingly, the shape and transparency (line width and spacing) of the transparent electrode of the transmission line can change in various ways.

Figure 7A:
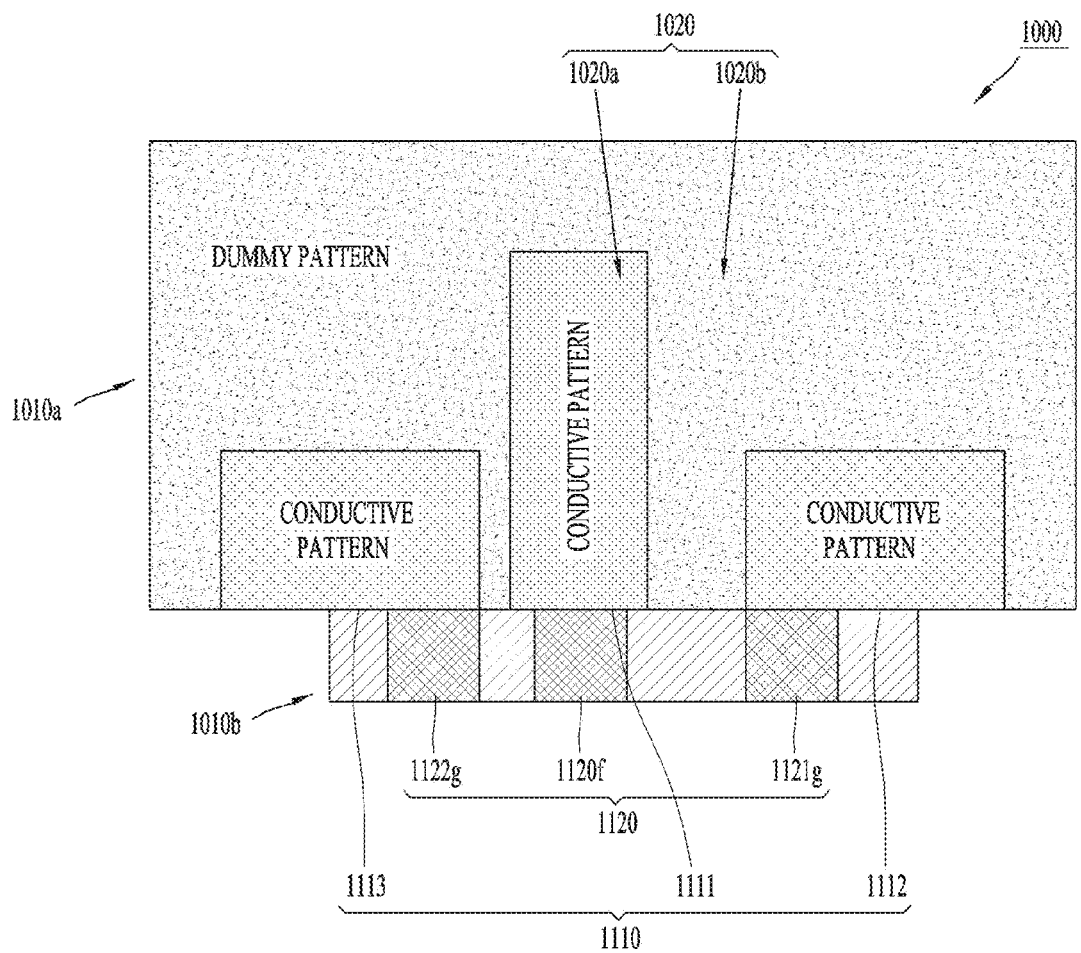
FIG. 7A shows a front view and a cross-sectional view of a transparent antenna assembly according to the present disclosure.
Figure 7A:
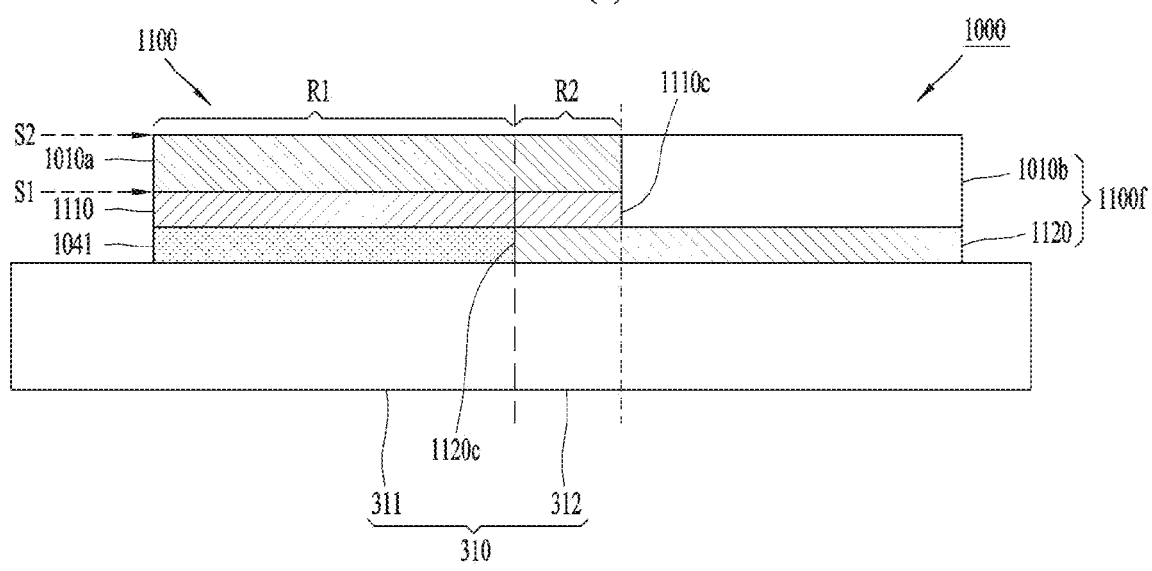
Figure 7B:
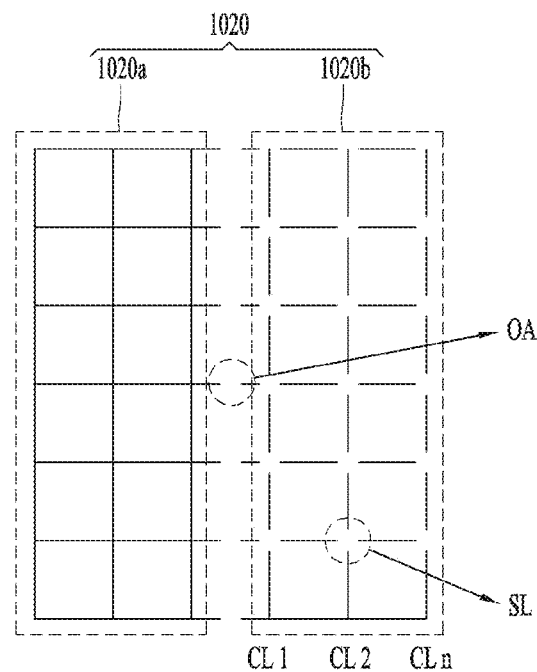
FIG. 7B is a diagram illustrating a grid structure of a metal mesh radiator region and a dummy metal mesh region according to embodiments.
Figure 7B:
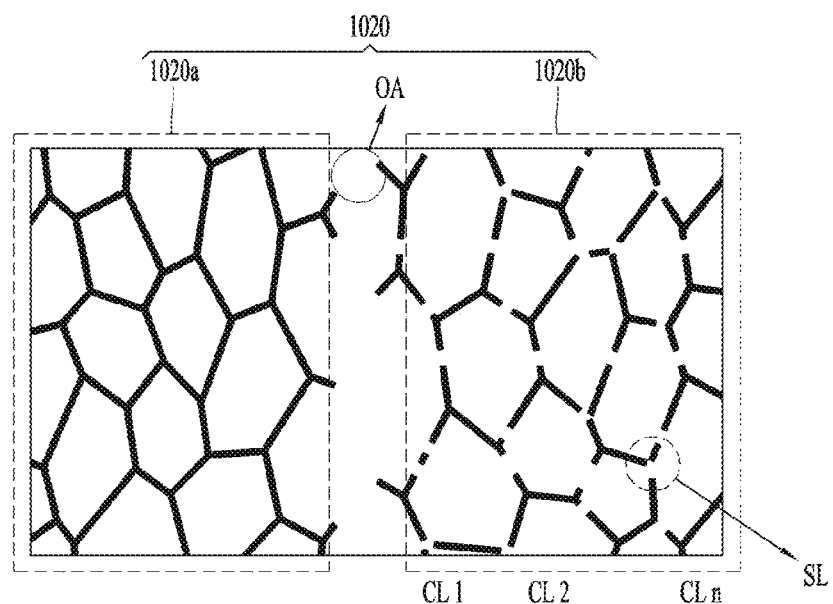

FIG. 7A shows a front view and a cross-sectional view of a transparent antenna assembly according to the present disclosure. FIG. 7B is a diagram illustrating a grid structure of a metal mesh radiator region and a dummy metal mesh region according to embodiments.

(a) of FIG. 7A illustrates a front view of the transparent antenna assembly 1000, and (b) of FIG. 7A is a cross-sectional view of the transparent antenna assembly 1000, showing the layered structure of the transparent antenna assembly 1000. Referring to FIG. 7A, the antenna assembly 1000 may include the first transparent dielectric substrate 1010a and the second dielectric substrate 1010b. Conductive patterns 1110 that act as radiators may be disposed on one surface of the first transparent dielectric substrate 1010a. A feeding pattern 1120f and ground patterns 1121g and 1122g may be formed on one surface of the second dielectric substrate 1010b. The conductive patterns 1110 acting as radiators may be configured to include one or more conductive patterns. The conductive patterns 1110 may include a first pattern 1111 connected to the feeding pattern 1120*f*, and a second pattern 1112 connected to the ground pattern 1121*g*. The conductive patterns 1110 may further include a third pattern 1113 connected to the ground pattern 1122*g*.

The conductive patterns 1110 constituting the antenna module may be implemented as transparent antennas. Referring to FIG. 7B, the conductive patterns 1110 may be metal grid patterns 1020*a* with a certain line width or less to form a metal mesh radiator region. Dummy metal grid patterns 1020*b* may be formed in inner regions between or outer regions of the first to third patterns 1111, 1112, and 11113 of the conductive patterns 1100 to maintain transparency at a certain level. The metal grid patterns 1020*a* and the dummy metal grid patterns 1020*b* may form a metal mesh layer 1020.

(a) of FIG. 7B illustrates a typical structure of the metal grid patterns 1020*a* and the dummy metal grid patterns 1020*b*. (b) of FIG. 7 illustrates an atypical structure of the metal grid patterns 1020*a* and the dummy metal grid patterns 1020*b*. As illustrated in (a) of FIG. 7B, the metal mesh layer 1020 may be formed in a transparent antenna structure by a plurality of metal mesh grids. The metal mesh layer 1020 may be formed in a typical metal mesh shape, such as a square shape, a diamond shape, or a polygonal shape. Conductive patterns may be configured such that the plurality of metal mesh grids operate as feeding lines or radiators. The metal mesh layer 1020 may constitute a transparent antenna region. As one example, the metal mesh layer 1020 may have a thickness of about 2 mm, but is not limited thereto.

The metal mesh layer 1020 may include the metal grid patterns 1020*a* and the dummy metal grid patterns 1020*b*. The metal grid patterns 1020*a* and the dummy metal grid patterns 1020*b* may have end portions disconnected from each other to form an open area OA, thereby being electrically disconnected. The dummy metal grid patterns 1020*b* may have slits SL formed so that end portions of mesh grids CL1, CL2, . . . , CLn are not connected.

Referring to (b) of FIG. 7B, the metal mesh layer 1020 may be formed by a plurality of atypical metal mesh grids. The metal mesh layer 1020 may include the metal grid patterns 1020*a* and the dummy metal grid patterns 1020*b*. The metal grid patterns 1020*a* and the dummy metal grid patterns 1020*b* may have end portions disconnected from each other to form the open area OA, thereby being electrically disconnected. The dummy metal grid patterns 1020*b* may have slits SL formed so that end portions of mesh grids CL1, CL2, . . . , CLn are not connected.

Figure 8A:
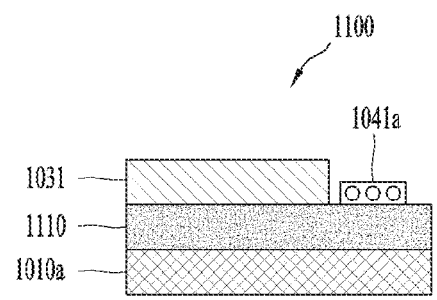
FIG. 8A illustrates a layered structure of an antenna module and a feeding module.
Figure 8A:
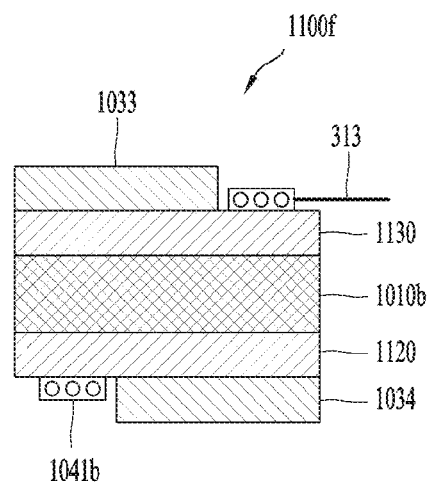
Figure 8B:
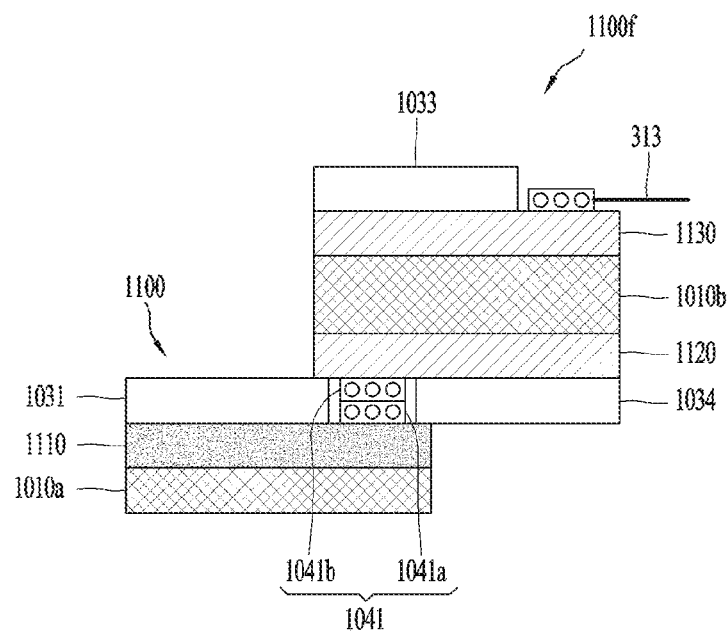
FIG. 8B illustrates an opaque substrate including the layered structure, in which the antenna module and the feeding structure are coupled to each other, and a coupled portion.
Figure 8B:
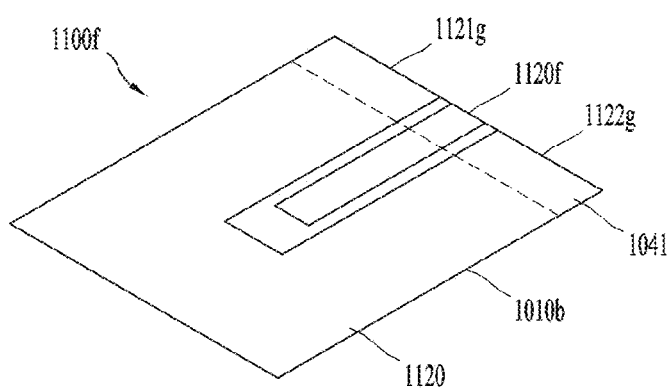

Meanwhile, the transparent substrate on which the transparent antenna according to the present disclosure is formed may be disposed on the vehicle glass. In this regard, FIG. 8A illustrates a layered structure of an antenna module and a feeding pattern. FIG. 8B illustrates an opaque substrate including the layered structure, in which the antenna module and the feeding structure are coupled to each other, and a coupled portion.

Referring to (a) of FIG. 8A, the antenna module 1100 may include a first transparent dielectric substrate 1010*a* formed on a first layer, and a first conductive pattern 1110 formed on a second layer disposed on the first layer. The first conductive pattern 1110 may be implemented as the metal mesh layer 1020 including the metal grid patterns 1020*a* and the dummy metal grid patterns 1020*b*, as illustrated in FIG. 7B. The antenna module 1100 may further include a protective layer 1031 and an adhesive layer 1041*a* disposed on the second layer.

Referring to (b) of FIG. 8A, a feeding structure 1100*f* may include a second dielectric substrate 1010*b*, a second conductive pattern 1120, and a third conductive pattern 1130. The feeding structure 1100*f* may further include first and second protective layers 1033 and 1034 stacked on the second conductive pattern 1120 and the third conductive pattern 1130, respectively. The feeding structure 1100*f* may further include an adhesive layer 1041*b* formed on a partial region of the second conductive pattern 1120.

The second conductive pattern 1120 may be disposed on one surface of the second dielectric substrate 1010*b* implemented as an opaque substrate. The third conductive pattern 1130 may be disposed on another surface of the second dielectric substrate 1010*b*. The first protective layer 1033 may be formed on the top of the third conductive pattern 1130. The second protective layer 1034 may be formed on the bottom of the second conductive pattern 1120. Each of the first and second protective layers 1033 and 1034 may be configured to have a low permittivity below a certain value, enabling low-loss feeding to the transparent antenna region.

Referring to (a) of FIG. 8B, the antenna module 1100 may be coupled with the feeding structure 1100*f* including the second dielectric substrate 1010*b*, which is the opaque substrate. The first conductive pattern 1110 implemented as the metal mesh layer, which is the transparent electrode layer, may be formed on the top of the first transparent dielectric substrate 1010*a*. The protective layer 1031 may be formed on the top of the first conductive pattern 1110. The protective layer 1031 and the first adhesive layer 1041*a* may be formed on the top of the first conductive pattern 1110. The first adhesive layer 1041*a* may be formed adjacent to the protective layer 1031.

The first adhesive layer 1041*a* formed on the top of the first conductive pattern 1110 may be bonded to the second adhesive layer 1041*b* formed on the bottom of the second conductive layer 1120. The first transparent dielectric substrate 1010*a* and the second dielectric substrate 1010*b* may be adhered by the bonding between the first and second adhesive layers 1041*a* and 1041*b*. Accordingly, the metal mesh grids formed on the first transparent dielectric substrate 1010*a* may be electrically connected to the feeding patterns formed on the second dielectric substrate 1010*b*.

The second dielectric substrate 1010*b* may be formed as the feeding structure 1100*f* that have the second conductive pattern 1120 and the third conductive pattern 1130 disposed on one surface and another surface thereof. The feeding structure 1100*f* may be implemented as a flexible printed circuit board (FPCB), but is not limited thereto. The first protective layer 1033 may be disposed on the top of the third conductive pattern 1130, and the second protective layer 1034 may be disposed on the bottom of the second conductive pattern 1120. The adhesive layer 1041*b* on the bottom of the third conductive pattern 1130 may be bonded to the adhesive layer 1041*a* of the antenna module 1100. Accordingly, the feeding structure 1100*f* may be coupled with the antenna module 1100 and the first and second conductive patterns 1110 and 1120 may be electrically connected.

The antenna module 1100 implemented with the first transparent dielectric substrate 1010*a* may be formed to have a first thickness. The feeding structure 1100*f* implemented with the second dielectric substrate 1010*b* may be formed to have a second thickness. For example, the thicknesses of the dielectric substrate 1010*a*, the first conductive pattern 1110, and the protective layer 1031 of the antenna module 1100 may be 75 µm, 9 µm, and 25 µm, respectively. The first thickness of the antenna module 1100 may be 109 µm. The thicknesses of the second dielectric substrate

1010*b*, the second conductive pattern 1120, and the third conductive pattern 1130 of the feeding structure 1100*f* may be 50 μm, 18 μm, and 18 μm, respectively, and the thicknesses of the first and second protective layers 1033 and 1034 may be 28 μm. Accordingly, the second thickness of the feeding structure 1100*f* may be 142 μm. Since the adhesive layers 1041*a* and 1041*b* are formed on the top of the first conductive pattern 1110 and the bottom of the second conductive pattern 1120, the entire thickness of the antenna assembly may be smaller than the sum of the first thickness and the second thickness. For example, the antenna assembly 1000 including the antenna module 1100 and the feeding structure 1100*f* may have a thickness of 198 μm.

Referring to (b) of FIG. 8B, the conductive pattern 1120 may be formed on one surface of the second dielectric substrate 1010*b* forming the feeding structure 1100*f*. The conductive pattern 1120 may be formed in a CPW type feeding structure that includes the feeding pattern 1120*f* and ground patterns 1121*g* and 1122*g* formed on both sides of the feeding pattern 1120*f*. The feeding structure 1100*f* may be coupled with the antenna module 1100, as illustrated in (a) of FIG. 8B, through a region where the adhesive layer 1041 is formed.

The antenna module and the feeding structure constituting the antenna assembly according to the present disclosure may be disposed on the vehicle glass and coupled through a specific coupling structure. In this regard, FIG. 9A illustrates a coupling structure of a transparent antenna that is disposed in a transparent region and a frit region of vehicle glass.

Figure 9A:
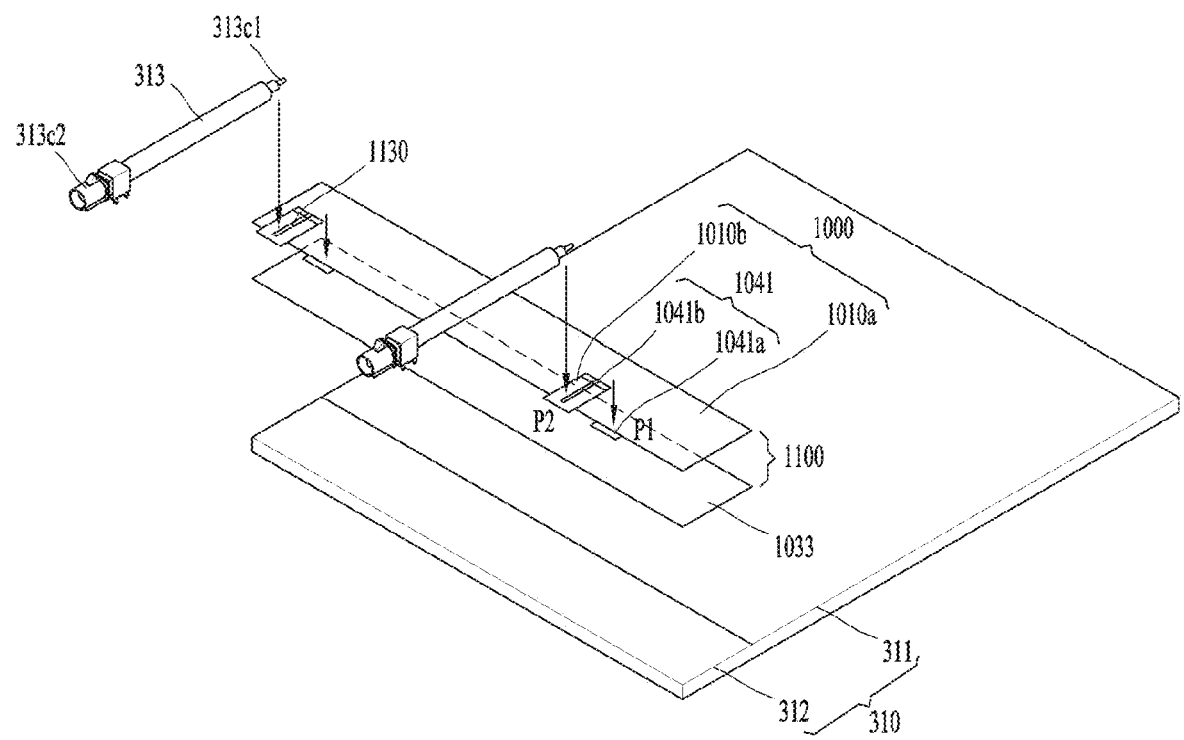
FIG. 9A is a diagram illustrating a coupling structure of a transparent antenna that is disposed in a transparent region and a frit region of vehicle glass.

Referring to FIG. 9A, the first transparent dielectric substrate 1010*a* may be adhered to the glass panel 310 through the adhesive layer 1041. The conductive pattern of the first transparent dielectric substrate 1010*a* may be bonded to the conductive pattern 1130 of the second dielectric substrate 1010*b* through ACF bonding. ACF bonding involves bonding a tape, to which metal balls are added, to a bonding surface at high temperature/high pressure (e.g., 120 to 150 degrees, 2 to 5 Mpa) for a few seconds, and may be achieved by allowing electrodes to be in contact with each other through the metal ball therebetween. ACF bonding electrically connects conductive patterns and simultaneously provides adhesive strength by thermally hardening the adhesive layer 1041.

The first transparent dielectric substrate 1010*a* on which the transparent electrode layer is formed and the second dielectric substrate 1010*b* in the form of the FPCB may be attached to each other using a local soldering technique. The connection pattern of the FPCB and the transparent antenna electrode may be connected through local soldering using a coil in a magnetic field induction manner. During such local soldering, the FPCB can be maintained flat without deformation due to an increase in temperature of a soldered portion. Accordingly, an electrical connection with high reliability can be achieved through the local soldering between the conductive patterns of the first transparent dielectric substrate 1010*a* and the second dielectric substrate 1010*b*.

The first transparent dielectric substrate 1010*a*, and the metal mesh layer 1020 of FIG. 7A, the protective layer 1033, and the adhesive layer 1041 may form a transparent electrode. The second dielectric substrate 1010*b*, which is an opaque substrate, may be implemented as the FPCB, but is not limited thereto. The second dielectric substrate 1010*b*, which is the FPCB with the feeding pattern, may be connected to the connector part 313 and the transparent electrode.

The second dielectric substrate 1010*b*, which is the opaque substrate, may be attached to a partial region of the first transparent dielectric substrate 1010*a*. The first transparent dielectric substrate 1010*a* may be formed in the transparent region 311 of the glass panel 310. The second dielectric substrate 1010*b* may be formed on the opaque region 312 of the glass panel 310. The partial region of the first transparent dielectric substrate 1010*a* may be formed in the opaque region 312, and the first transparent dielectric substrate 1010*a* may be coupled to the second dielectric substrate 1010*b* on the opaque region 312.

The first transparent dielectric substrate 1010*a* and the second dielectric substrate 1010*b* may be adhered by bonding between the adhesive layers 1041*a* and 1041*b*. A position at which the second dielectric substrate 1010*b* is bonded to the adhesive layer 1041 may be set to a first position P1. A position at which the connector part 313 is soldered to the opaque substrate 1010*b* may be set to a second position P2.

Figure 9B:
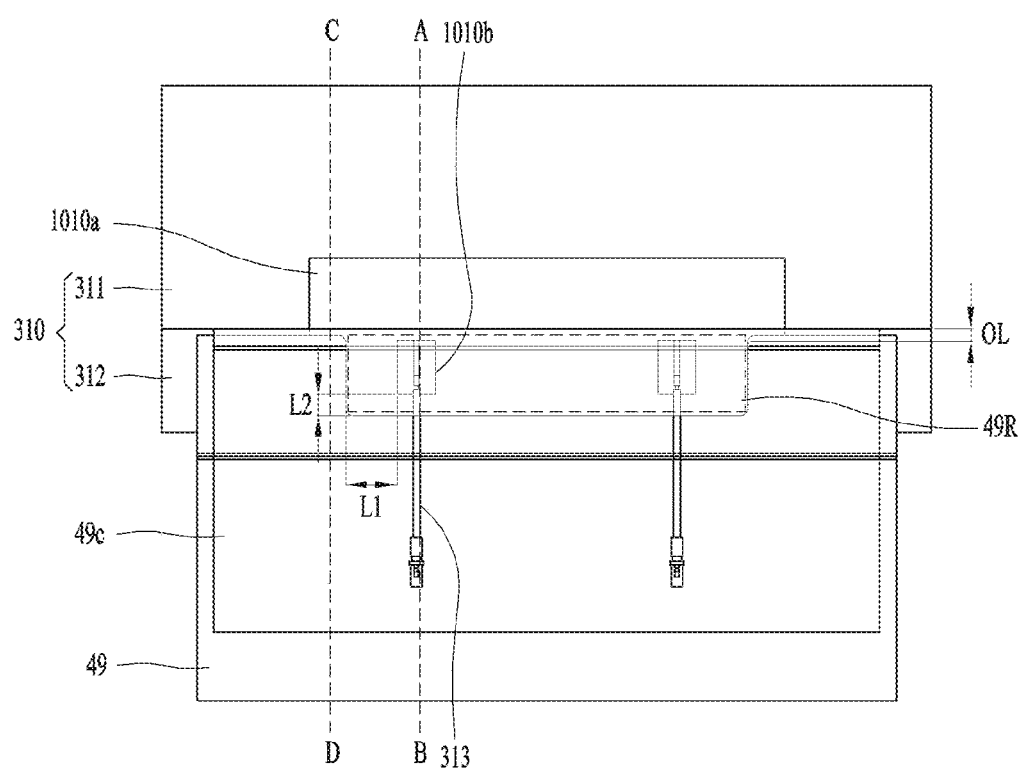
FIG. 9B is an enlarged front view of a region where glass with the transparent antenna of FIG. 9A is coupled to a body structure of the vehicle.
Figure 9C:
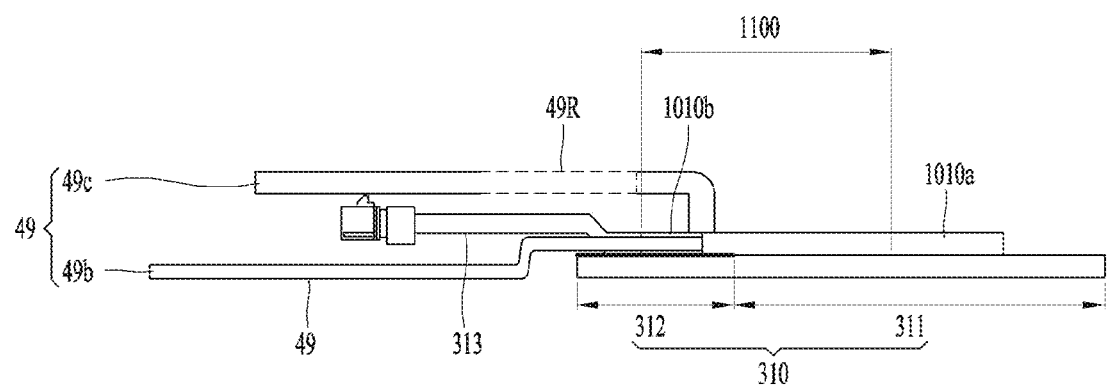
FIG. 9C is a cross-sectional view illustrating the coupling structure between the vehicle glass and the body structure of FIG. 9B, viewed from different positions.
Figure 9C:
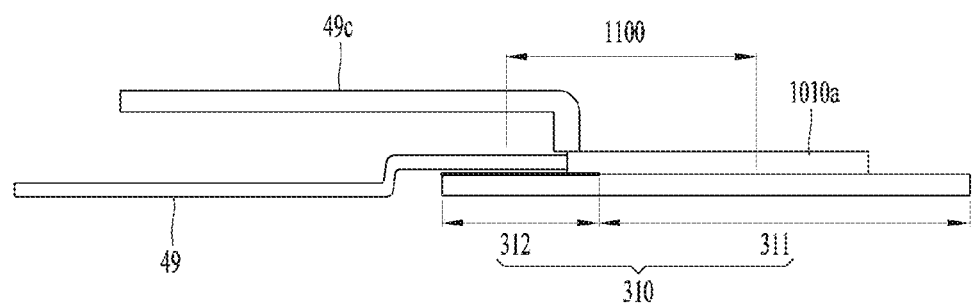

Meanwhile, the vehicle glass on which the antenna assembly according to the present disclosure is formed may be coupled to a body structure of the vehicle. In this regard, FIG. 9B is an enlarged front view of a region where glass with the transparent antenna of FIG. 9A is coupled to a body structure of the vehicle. FIG. 9C is a cross-sectional view illustrating the coupling structure between the vehicle glass and the body structure of FIG. 9B, viewed from different positions.

Referring to FIG. 9B, the first transparent dielectric substrate 1010*a* on which a transparent antenna is formed may be disposed in the transparent region 311 of the glass panel 310. The second dielectric substrate 1010*b* may be disposed in the opaque region 312 of the glass panel 310. Since the transmittance of the opaque region 312 is lower than that of the transparent region 311, the opaque region 312 may also be referred to as a black matrix (BM) region. A portion of the first transparent dielectric substrate 1010*a* on which the transparent antenna is formed may extend up to the opaque region 312 corresponding to the BM region. The first transparent dielectric substrate 1010*a* and the opaque region 312 may be formed to overlap each other by an overlap length OL in one axial direction.

(a) of FIG. 9C is a cross-sectional view of the antenna assembly, cut along the line AB in FIG. 9B. (a) of FIG. 9C is a cross-sectional view of the antenna assembly, cut along the line CD in FIG. 9B.

Referring to FIG. 9B and (a) of FIG. 9C, the first transparent dielectric substrate 1010*a* on which the transparent antenna is formed may be disposed in the transparent region 311 of the glass panel 310. The second dielectric substrate 1010*b* may be disposed in the opaque region 312 of the glass panel 310. The partial region of the first transparent dielectric substrate 1010*a* may extend up to the opaque region 312, so that the feeding pattern formed on the second dielectric substrate 1010*b* and the metal mesh layer of the transparent antenna can be bonded to each other.

An interior cover 49*c* may be configured to accommodate the connector part 313 connected to the second dielectric substrate 1010*b*. The connector part 313 may be disposed in a space between a body 49*b* made of a metal material and the interior cover 49*c*, and the connector part 313 may be coupled to an in-vehicle cable. The interior cover 49*c* may be disposed in an upper region of the body 49*b* made of the metal material. The interior cover 49*c* may be formed with one end portion bent to be coupled to the body 49*b* made of the metal material.

The interior cover 49*c* may be made of a metal material or dielectric material. When the interior cover 49*c* is made of the metal material, the interior cover 49c and the body 49b made of the metal material constitute a metal frame 49. In this regard, the vehicle may include the metal frame 49. The opaque region 312 of the glass panel 310 may be supported by a portion of the metal frame 49. To this end, a portion of the body 49b of the metal frame 49 may be bent to be coupled to the opaque region 312 of the glass panel 310.

When the interior cover 49c is made of the metal material, at least a portion of a metal region of the interior cover 49c on the upper region of the second dielectric substrate 1010b may be removed. A recess portion 49R from which the metal region has been removed may be formed in the interior cover 49c. Accordingly, the metal frame 49 may include the recess portion 49R. The second dielectric substrate 1010b may be disposed within the recess portion 49R of the metal frame 49.

The recess portion 49R may also be referred to as a metal cut region. One side of the recess portion 49R may be formed to be spaced apart from one side of the opaque substrate 1010b by a first length L1 which is equal to or greater than a threshold value. A lower boundary side of the recess portion 49R may be formed to be spaced apart from a lower boundary side of the opaque substrate 1010b by a second length L2 which is equal to or greater than a threshold value. As a metal is removed from a partial region of the interior cover 49c made of the metal material, signal loss and changes in antenna characteristics due to a surrounding metal structure can be suppressed.

Referring to FIG. 9B and (b) of FIG. 9C, a recess portion like a metal cut region may not be formed in the interior cover 49c on a region where the connector part and the opaque substrate are not disposed. In this regard, while protecting the internal components of the antenna module 1100 by use of the interior cover 49c, internal heat can be dissipated to the outside through the recess portion 49R of FIG. 9B and (a) of FIG. 9C. In addition, whether it is necessary to repair a connected portion can be immediately determined through the recess portion 49R of the interior cover 49c. Meanwhile, a recess portion may not be formed in the interior cover 49c on the region where the connector part and the second dielectric substrate are not disposed, which may result in protecting the internal components of the antenna module 1100.

Meanwhile, the antenna assembly 1000 according to the present disclosure may be formed in various shapes on the glass panel 310, and the glass panel 310 may be attached to the vehicle frame. In this regard, FIG. 10 illustrates a stacked structure of an antenna assembly and an attachment region between vehicle glass and a vehicle frame according to embodiments.

Figure 10:
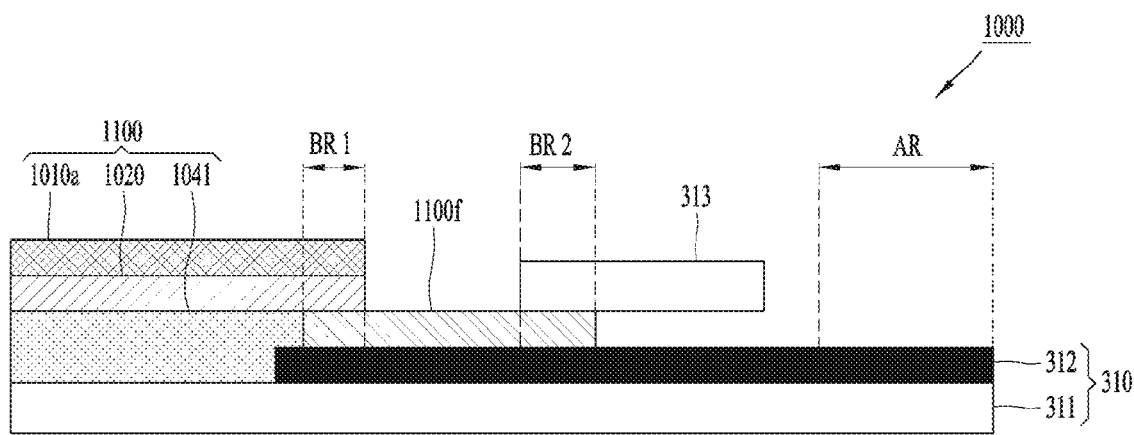
FIG. 10 is a diagram illustrating a laminated structure of an antenna assembly and an attachment region between vehicle glass and a vehicle frame according to embodiments.
Figure 10:
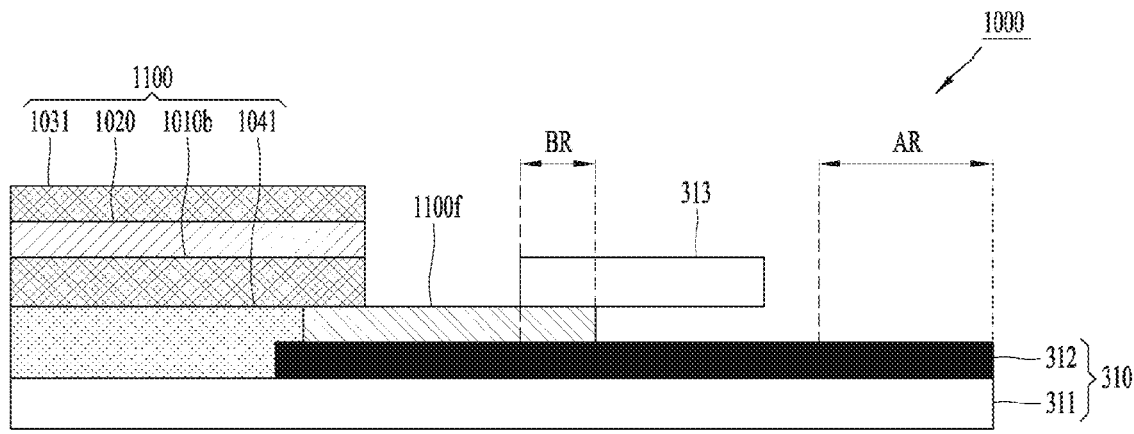

Referring to (a) of FIG. 10, the glass panel 310 may include the transparent region 311 and the opaque region 312. The antenna assembly 1000 may include the antenna module 1100 and the feeding structure 1100f. The antenna module 1100 may include the first transparent dielectric substrate 1010a, the transparent electrode layer 1020, and the adhesive layer 1041. The feeding structure 1100f implemented as the opaque region and the transparent electrode layer 1020 implemented as the transparent substrate may be electrically connected to each other. The feeding structure 1100f and the transparent electrode layer 1020 may be directly connected through a first bonding region BR1. The feeding structure 1100f and the connector part 313 may be directly connected through a second bonding region BR2. Heat may be applied for bonding in the first and second bonding regions BR1 and BR2. Accordingly, the bonding regions BR1 and BR2 may be referred to as heating sections. An attachment region AR corresponding to a sealant region for attachment of the glass panel 310 to the vehicle frame may be formed on a side end area on the opaque region 312 of the glass panel 310.

Referring to (b) of FIG. 10, the glass panel 310 may include the transparent region 311 and the opaque region 312. The antenna assembly 1000 may include the antenna module 1100 and the feeding structure 1100f. The antenna module 1100 may include the protective layer 1031, the transparent electrode layer 1020, the first transparent dielectric substrate 1010a, and the adhesive layer 1041. The feeding structure 1100f implemented as the opaque region may overlap a partial region of the antenna module 1100 implemented as the transparent substrate. The feeding structure 1100f and the transparent electrode layer 1020 of the antenna module 1100 may be connected in a coupling feeding manner. The feeding structure 1100f and the connector part 313 may be directly connected through a bonding region BR. Heat may be applied for bonding in the bonding region BR1. Accordingly, the bonding region BR may be referred to as a heating section. An attachment region AR corresponding to a sealant region for attachment of the glass panel 310 to the vehicle frame may be formed on a side end area on the opaque region 312 of the glass panel 310.

Referring to (a) and (b) of FIG. 10, the transparent substrate 1010a may include a (hard) coating layer to protect the transparent electrode layer 1020 from an external environment. Meanwhile, a UV-cut component may be added to the adhesive layer 1041 to suppress yellowing from sunlight.

In some examples, a wideband transparent antenna structure that can be disposed on glass of a vehicle can be implemented as a single dielectric substrate on the same plane as a CPW feeder. In addition, the wideband transparent antenna structure that can be disposed on the glass of the vehicle may be implemented as a structure in which grounds are formed at both sides of a radiator so as to constitute a wideband structure.

Figure 11A:
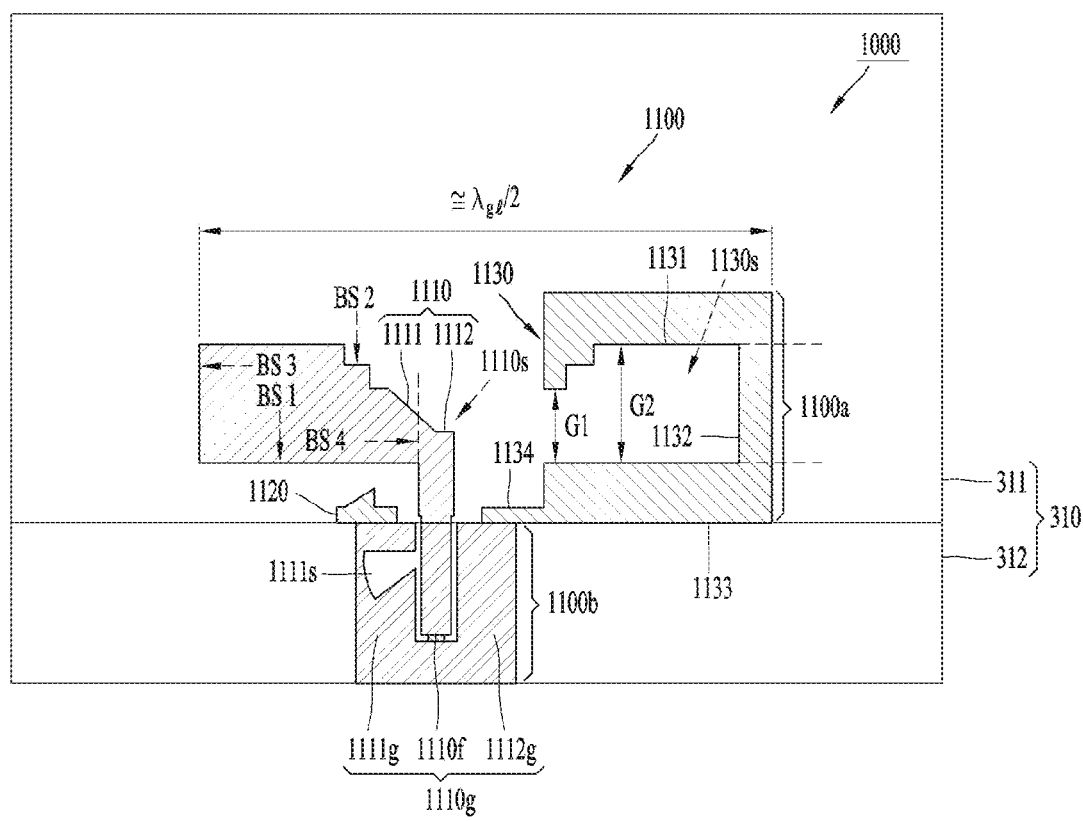
FIGS. 11A and 11B are front views of an antenna assembly configuration according to the present disclosure.
Figure 11B:
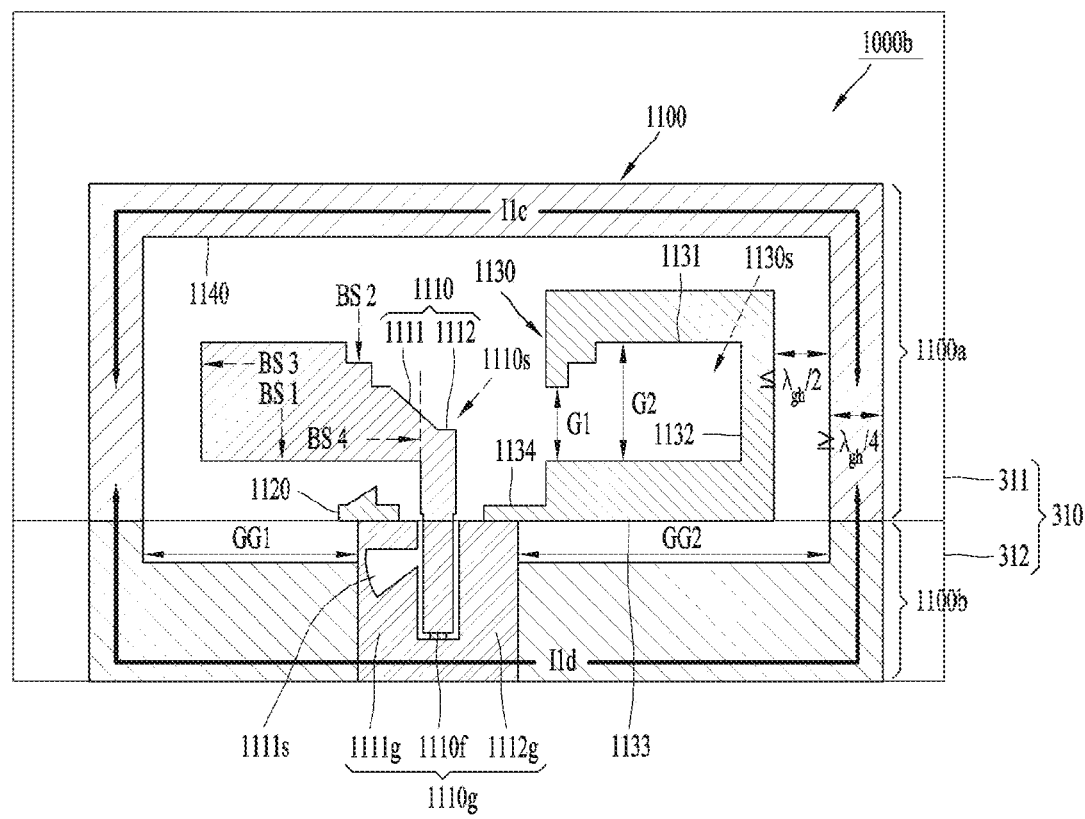
Figure 11C:
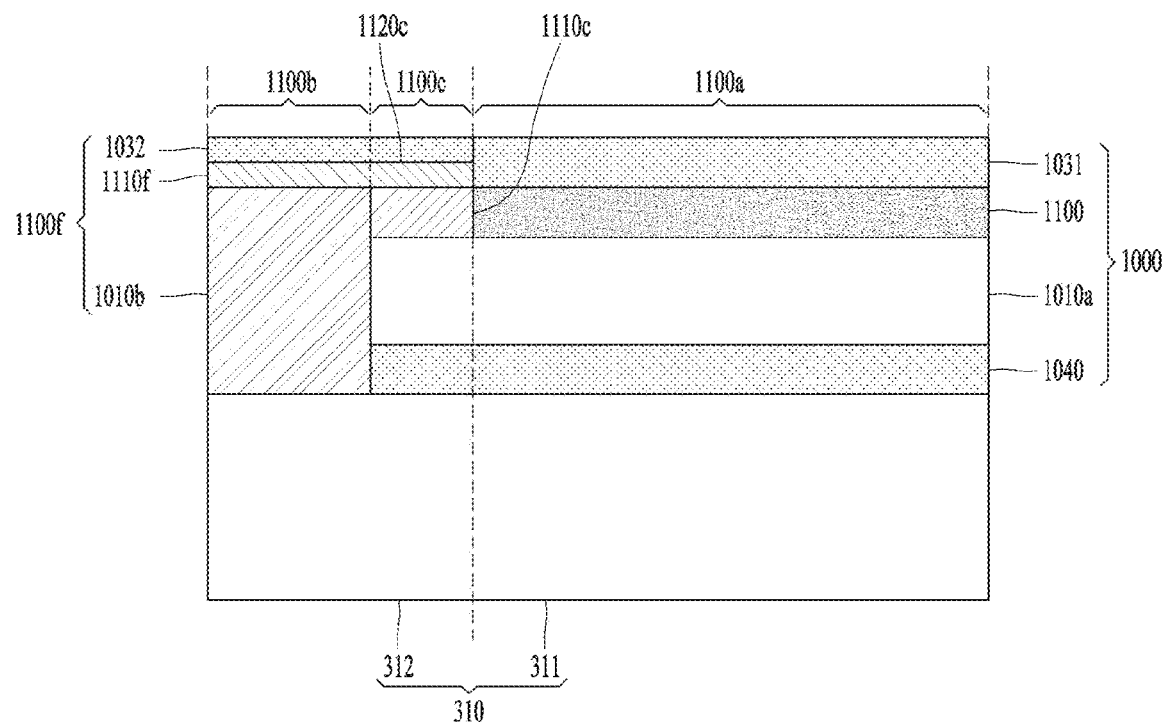
FIG. 11C is a view illustrating a stacked structure of the antenna assembly of FIGS. 11A and 11B.

Hereinafter, an antenna assembly associated with a broadband transparent antenna structure according to the present disclosure will be described. In this regard, FIGS. 11A and 11B are front views of an antenna assembly configuration according to the present disclosure. FIG. 11C is a view illustrating a laminated structure of the antenna assembly of FIGS. 11A and 11B.

Referring to FIGS. 1 to 11B, the vehicle 500 may include the antenna assembly 1000. The antenna assembly 1000 may include a transparent dielectric substrate 1010a, a first region 1100a, and a second region 1100b.

The first region 1100a may include an antenna 1100 on one side of the transparent dielectric substrate 1010a. The second region 1100b may include a grounded conductive pattern 1110g and a feeding pattern 1110f. The first region 1100a and the second region 1100b may also be referred to as a radiator region and a ground region (or a feeding region), respectively. The antenna 1100 may be referred to as an antenna module 1100 because it includes a plurality of conductive patterns.

The antenna assembly 1000 implemented as the transparent antenna may be designed as a CPW antenna structure in the form of a single layer. Meanwhile, the antenna assembly 1000 may include a first conductive pattern 1110 to a third conductive pattern 1130. Referring to FIG. 11B, the antenna assembly 1000 may include a first conductive pattern 1110 to a fourth conductive pattern 1140.

The first conductive pattern 1110 may include a plurality of sub-patterns, namely, a plurality of conductive portions. The first conductive pattern 1110 may include a first part 1111 and a second part 1112. The first part 1111 may be formed perpendicularly to the second part 1112. The second part 1112 may be electrically connected to the feeding pattern 1110f. In this regard, the meaning of "being electrically connected" may include that corresponding conductive portions are connected either directly or by being spaced apart at a certain gap.

The second conductive pattern 1120 may be disposed in one side region or a lower region of the first conductive pattern 1110. The second conductive pattern 1120 may be electrically connected to a first part 1111g of the ground conductive pattern 1110g. The second conductive pattern 1120 may further be arranged on the antenna assembly 1000 to resonate further in a frequency band different from operating frequency bands of the first conductive pattern 1110 and the third conductive pattern 1130.

The third conductive pattern 1130 may be disposed in another side region of the first conductive pattern 1110. The third conductive pattern 1130 may be electrically connected to a second part 1112g of the ground conductive pattern 1110g. The third conductive pattern 1130 may include a third part 1131, a fourth part 1132, a fifth part 1133, and a sixth part 1134. As another example, the sixth part 1134 may be formed with the same width as the fifth part 1133 to be integrated with the fifth part 1133.

The third part 1131 of the third conductive pattern 1130 may be parallel to the fifth part 1133. A first end (portion) of the third part 1131 and a second end (portion) of the fifth part 1133 may be separated by a first gap G1. A second end of the third part 1131 and a first end of the fifth part 1133 may be connected by the fourth part 1132. The sixth part 1134 may be connected to the second end of the fifth part 1133. A portion of the sixth part 1134 may be electrically connected to the ground conductive pattern 1110g. A portion of the sixth part 1134 may be electrically connected to the second part 1112g of the ground conductive pattern 1110g.

The fourth conductive pattern 1140 may be formed to surround the first conductive pattern 1110, the second conductive pattern 1120, and the third conductive pattern 1130 on one side of the dielectric substrate 1010b. A first end of the fourth conductive pattern 1140 may be electrically connected to the third part 1113g of the ground conductive pattern 1110g. A second end of the fourth conductive pattern 1140 may be electrically connected to the fourth part 1114 of the ground conductive pattern 1110g.

Referring to FIG. 11C, the antenna assembly of FIGS. 11A and 11B may be disposed on the glass panel 310 of the vehicle. In this regard, the laminated structure of FIG. 11C will be described based on the antenna assembly 1000 of FIG. 11A for convenience of explanation, but is not limited thereto, and may also be applicable to the antenna assembly 1000b of FIG. 11B.

The glass panel 310 may include a transparent region 311 and an opaque region 312. A first region 1100a corresponding to the antenna region of the antenna assembly 1000 may be formed on the transparent region 311. A second region 1100b corresponding to the feeding region of the antenna assembly 1000 may be formed on the opaque region 312. A portion of the first region 1100a that is connected to the feeding pattern 1110f of the second region 1100b may be disposed in the opaque region 312.

The antenna assembly 1000 may include conductive patterns 1100 implemented as a metal mesh layer formed on the transparent dielectric substrate 1010a. A transparent antenna element may be implemented by the conductive patterns 1100 formed on the metal mesh layer. Dummy metal mesh grids spaced apart from the transparent antenna element may be disposed on the metal mesh layer 1020. A first protective layer 1031 may be formed on the top of the metal mesh layer 1020. An adhesive layer 1040 may be formed on the bottom of the transparent dielectric substrate 1010a.

A conductive pattern including the feeding pattern 1110f and the ground pattern may be formed on a second dielectric substrate 1010b. The second dielectric substrate 1010b may be implemented as an FPCB, but is not limited thereto. A second protective layer 1032 may be formed on the top of the feeding pattern 1110f. The second dielectric substrate 1010b, the conductive pattern including the feeding pattern 1110f and the ground pattern, and the second protective layer 1032 may form a feeding structure 1100f. The feeding pattern 1110f may be connected to the conductive patterns 1100 formed on the metal mesh layer in a third region 1100c corresponding to a bonding region. In the third region 1100c, a first connection pattern 1110c among the conductive patterns 1100 may be connected to a second connection pattern 1120c, which is an end portion of the feeding pattern 1110f.

The antenna assembly according to the present disclosure may operate as a broadband antenna to perform 4G wireless communication and 5G wireless communication in the vehicle. In this regard, FIGS. 12A to 12C are conceptual views illustrating operations in different operating modes in different frequency bands.

Figure 12A:
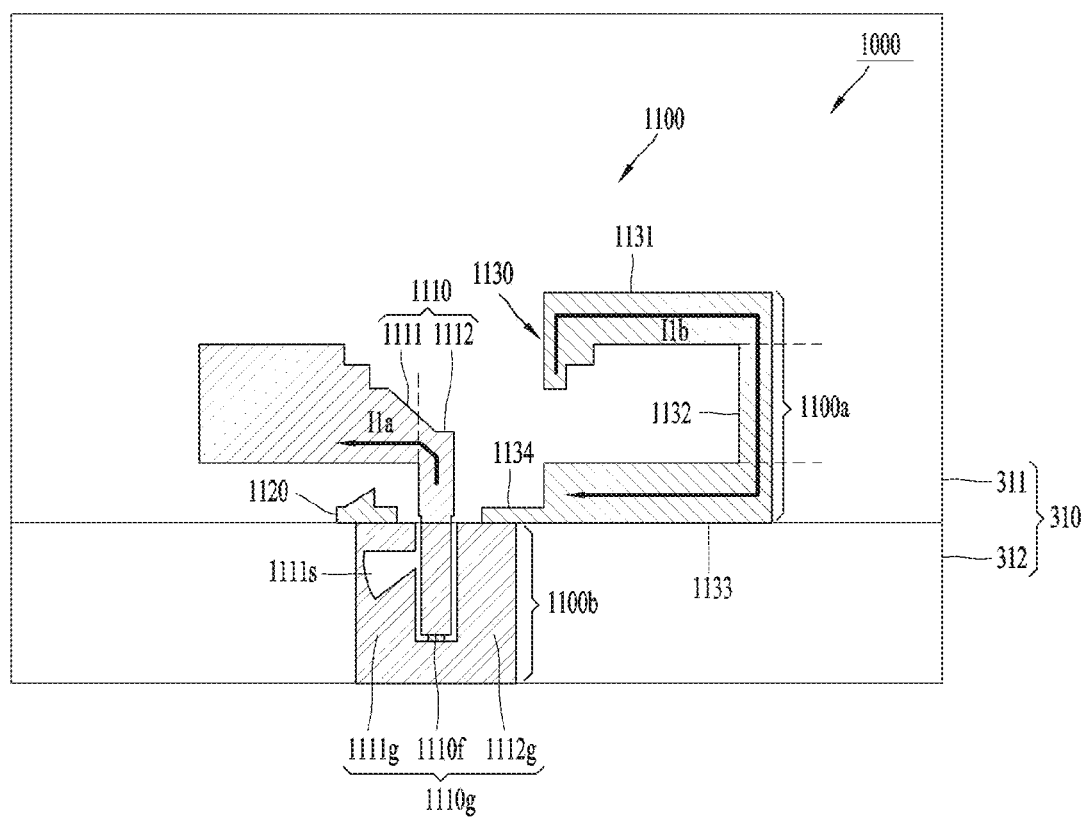
FIGS. 12A to 12C are conceptual views illustrating operations in different operating modes in different frequency bands.

Referring to FIGS. 11A and 12A, the antenna 1100 may be configured to radiate a wireless signal in a first frequency band of 1500 to 2500 MHz. In this regard, the first conductive pattern 1110 and the third conductive pattern 1130 may operate in a dipole antenna mode, which is a first antenna mode, in the first frequency band. For example, the first conductive pattern 1110 and the third conductive pattern 1130 may operate in a quasi self-complementary dipole antenna mode in the first frequency band.

In some embodiments, a first current I1a of a first mode may be formed in one axial direction from the first part 1111 to the second part 1112 of the first conductive pattern 1110. A second current I1b of the first mode may be formed along the third part 1131 to the sixth part 1134 of the third conductive pattern 1130. The first current I1a of the first mode may be formed along a straight path, and the second current I1b of the first mode may be formed along a loop path. Since the path shapes in which the second current I1b and the first current I1a of the first mode are formed are different, the quasi self-complementary dipole antenna mode may be formed. Therefore, the antenna 1100 can operate in a wider bandwidth in the first frequency band by operating in the quasi self-complementary dipole antenna mode, compared to a dipole antenna mode in which the first and second currents are formed in the same form.

Figure 12B:
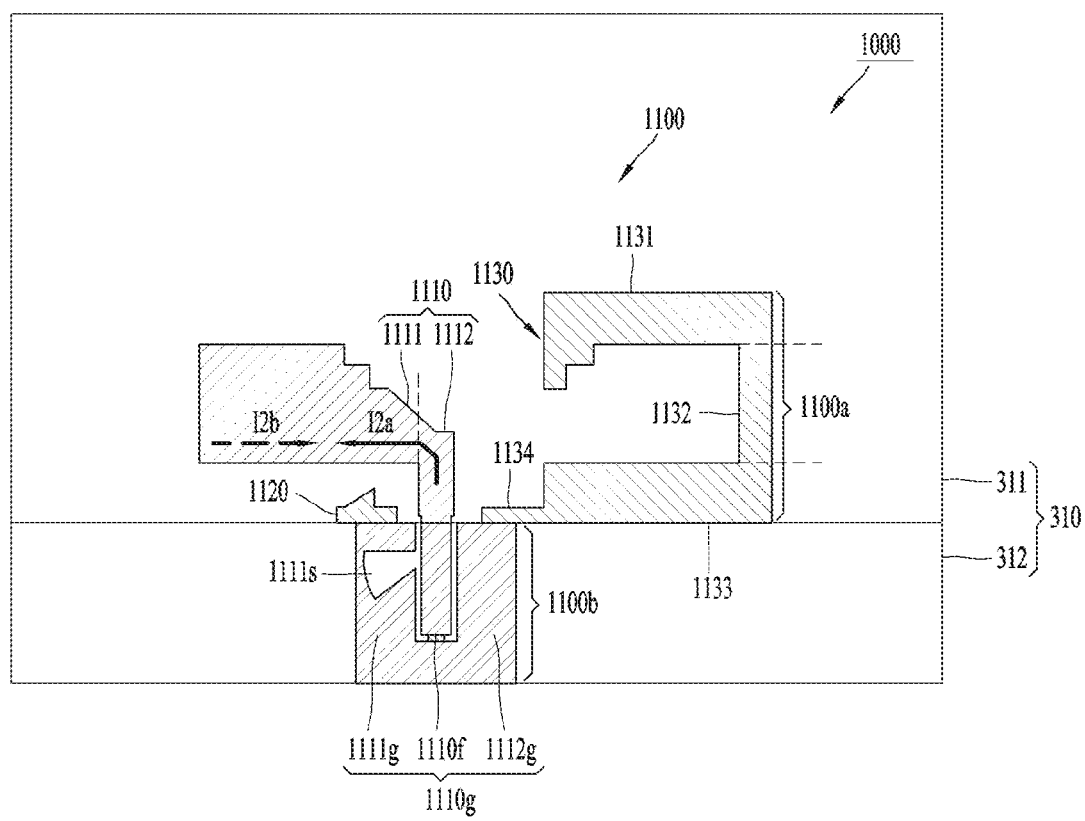
Figure 12C:
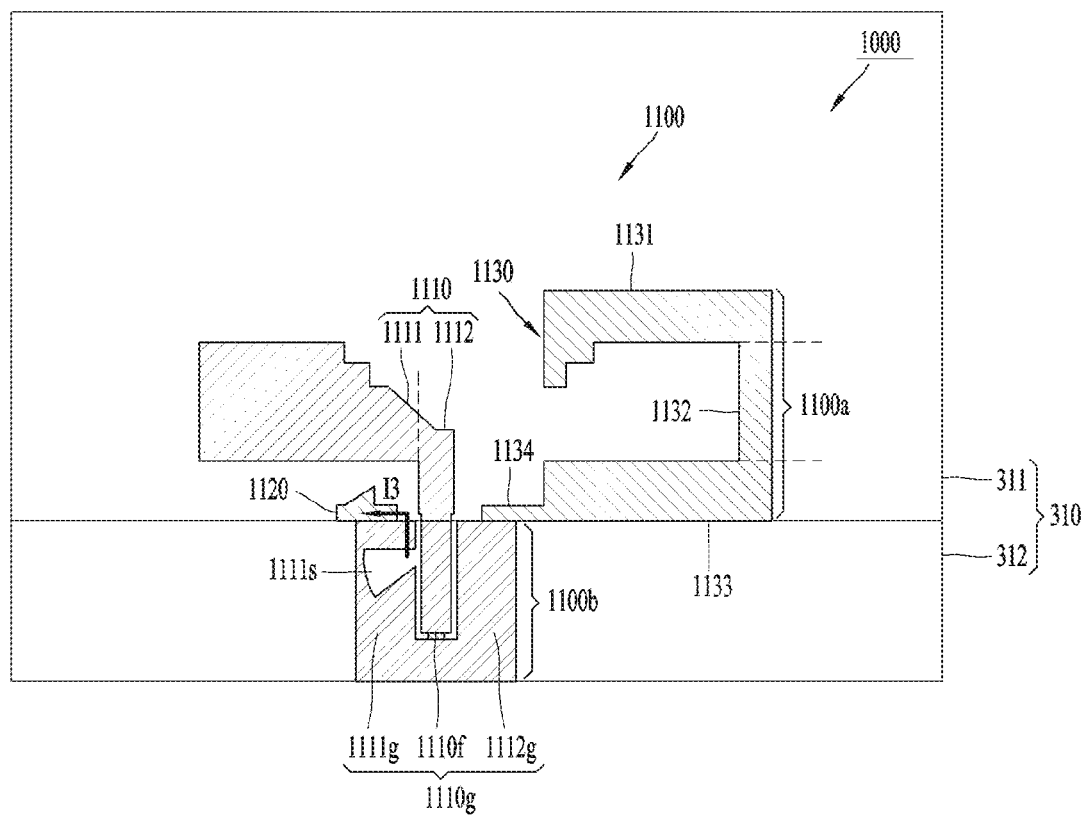

Referring to FIGS. 11A and 12B, the antenna 1100 may be configured to radiate a wireless signal in a second frequency band of 2500 to 5000 MHz. In this regard, the first conductive pattern 1110 may operate in a second antenna mode, in the second frequency band. Specifically, the first conductive pattern 1110 may operate in a monopole antenna mode in the second frequency band greater than the first frequency band. A first current I2a of a second mode may be formed from the first part 1111 to the second part 1112 of the first conductive pattern 1110. In addition, a second current I2b of the second mode may be formed from the second part 1112 to the first part 1111 of the first conductive pattern 1110.

Referring to FIGS. 11A and 12C, the antenna 1100 may be configured to radiate a wireless signal in a third frequency band of 5000 to 6000 MHz. In this regard, the second conductive pattern 1120 may operate as a radiator in the third frequency band. The third frequency band may be set to be wider than the second frequency band. A current I3 of a third mode may be formed along the second conductive pattern 1120.

Specifically, the wireless signal of the third frequency band may be radiated through the second conductive pattern 1120 connected to the ground conductive pattern 1110g and a slot of the second region 1100b implemented as an FPCB. A length of a current path generated along the second conductive pattern 1120 is shorter than a length of a current path generated along the first conductive pattern 1110. Accordingly, the third frequency band, which is the operating frequency band by the second conductive pattern 1120, may be set to be wider than the second frequency band, which is the operating frequency band by the first conductive pattern 1110.

Referring to FIGS. 11A to 12C, the structural features of the antenna 11000 having the first conductive pattern 1110 to the third conductive pattern 1130 will be described. The second conductive pattern 1110 may have a size that is smaller than that of the third conductive pattern 1130. The second conductive pattern 1110 may be disposed between the first part 1111 of the first conductive pattern 1110 and the ground conductive pattern 1110g. The second conductive pattern 1110 may be disposed between the first part 1111 of the first conductive pattern 1110 and the first part 1111g of the ground conductive pattern 1110g. The first part 1111g of the ground conductive pattern 1110g may include a first open slot 1110s.

Length and width of the third conductive pattern 1130 may be set in consideration of the operating frequency of the antenna 1100. A height of the fifth part 1133, which is the bottom portion of the third conductive pattern 1130, may be formed to be lower than or equal to $\lambda gh/2$. Here, $\lambda gh$ denotes a guided wavelength corresponding to the highest frequency of the operating frequency band.

The third conductive pattern 1130 may be formed as a complementary pattern to the first conductive pattern 1110. A bottom position of the first part 1111 of the first conductive pattern 1110 may be formed at a top position of the fifth part 1133 of the third conductive pattern 1130. A gap between the first part 1111 of the first conductive pattern 1110 and the first part 1111g of the ground conductive pattern 1110g may be set to be equal to a height of the fifth part 1133 of the third conductive pattern 1130.

A horizontal distance of the antenna 1100 may be set to correspond to the operating frequency. A horizontal distance from the end of the first conductive pattern 1110 to the end of the third conductive pattern 1130 may be set to be equal to $\lambda gl/2$ or within a certain range from $\lambda gl/2$. Here, $\lambda gl$ denotes a guided wavelength corresponding to the lowest frequency of the operating frequency band.

As described above, the third part 1131 of the third conductive pattern 1130 may be parallel to the fifth part 1133. A first end of the third part 1131 and a second end of the fifth part 1133 may be separated by a first gap G1. A mid-inside boundary of the third part 1131 and a mid-inside boundary of the fourth part 1132 may be separated by a second gap G2. The first gap G1 may be formed smaller than the second gap G2, so that the third conductive pattern 1130 can be formed as a complementary pattern to the first conductive pattern 1110.

A first open slot 1110s may be formed in the ground conductive pattern 1110g, and a second open slot 1130s may be formed in the third conductive pattern 1130. The third part 1131, the fourth part 1132, and the fifth part 1133 of the third conductive pattern 1130 may form the second open slot 1130s. The shape of the second open slot 1130s may be formed to be similar (to correspond) to the shape of the first part 1111 of the first conductive pattern 1110. The first part 1111 of the first conductive pattern 1110 may have a first stepped structure. The third conductive pattern 1130 with the second open slot 1130s may be formed in a second stepped structure. The first part 1111 of the first conductive pattern 1110 may be formed in the first stepped structure whose width monotonically decreases toward the second part 1112. The third part 1131 of the third conductive pattern 1130 may be formed in the second stepped structure whose width monotonically increases toward an end portion.

As described above, the fourth conductive pattern 1140 may be formed to surround the first conductive pattern 1110, the second conductive pattern 1120, and the third conductive pattern 1130. The fourth conductive pattern 1140 may be formed to be more adjacent to the third conductive pattern 1130 than to the first conductive pattern 1110. A gap between the third conductive pattern 1130 and the fourth conductive pattern 1140 may be equal to or smaller than $\lambda gh/4$.

The fourth conductive pattern 1140 of the ground ring structure may be formed to surround an entire radiator at a distance greater than $\lambda gh/4$ of the wavelength corresponding to the highest frequency at which the antenna 1110 operates. The width of the fourth conductive pattern 1140 may be set to be equal to or narrower than $\lambda gh/2$. The width of the fourth conductive pattern 1140 may be set to be wider than the distance between the fourth conductive pattern 1140 and the third conductive pattern 1130, so that a region affected by a current component of the third conductive pattern 1130 can be limited to the inside of the fourth conductive pattern 1140.

The first conductive pattern 1110 may formed to have a plurality of boundary sides, thereby optimizing antenna performance within the operating frequency band. A first boundary side BS1 of the first part 1111 of the first conductive pattern 1110 may have a first straight line. A second boundary side BS2 of the first part 1111 of the first conductive pattern 1110 may have a first stepped structure. A third boundary side BS3 of the first part 1111 of the first conductive pattern 1110 may be arranged between a first end of the first boundary side BS1 of the first part 1111 of the first conductive pattern 1110 and a first end of the second boundary side BS2 of the first part 1111 of the first conductive pattern 1110. A fourth boundary side BS4 of the first part 1111 of the first conductive pattern 1110 may be arranged between the first end of the first boundary side BS1 of the first part 1111 of the first conductive pattern 1110 and the first end of the second boundary side BS2 of the first part 1111 of the first conductive pattern 1110.

The ground conductive pattern 1110g may be configured to include a first ground gap portion GG1 and a second ground gap portion GG2. Accordingly, the lower portions of the first conductive pattern 1110 and the third conductive pattern 1130 may be spaced apart from the ground conductive pattern 1110g by certain widths or more. The first part 1111g of the ground conductive pattern 1110g and the third part 1113g of the ground conductive pattern 1110g may be separated by the first ground gap portion GG1. The second part 1112g of the ground conductive pattern 1110g and the fourth part 1114g of the ground conductive pattern 1110g may be separated by the second ground gap portion GG2. A distance of the second ground gap portion GG2 may be greater than or equal to the distance of the first ground gap portion GG1.

Referring to FIG. 7B and FIGS. 11A to 12C, the antenna assembly 1000 according to the present disclosure may be formed in a metal mesh shape 1020. The first conductive pattern 1110, the second conductive pattern 1120, and the third conductive pattern 1130 may be formed in the metal mesh shape 1020 having a plurality of opening areas OA on the transparent dielectric substrate 1010a. The first conductive pattern 1110, the second conductive pattern 1120, the third conductive pattern 1130, and the fourth conductive pattern 1140 may be formed in the metal mesh shape 1020 having the plurality of opening areas OA on the transparent dielectric substrate 1010a.

The first pattern 1110, the second pattern 1120, and the third pattern 1130 may be formed in a CPW structure as a single-layer structure on the transparent dielectric substrate 1010a. The first conductive pattern 1110, the second conductive pattern 1120, the third conductive pattern 1130, and the fourth conductive pattern 1140 may be formed in the CPW structure as the single-layer structure on the transparent dielectric substrate 1010a.

The antenna assembly 1000 may include a plurality of dummy mesh grid patterns 1020b on an outer portion of the conductive patterns 1110 to 1130 on the transparent dielectric substrate 1010a. The plurality of dummy metal grid patterns 1020b may be formed not to be connected to the feeding pattern 1110f and the ground conductive pattern 1110g. The plurality of dummy mesh grid patterns 1020b may be separated from each other.

The antenna assembly according to the present disclosure may operate as a broadband antenna by differently configuring conductive patterns, which operate as radiators, according to a plurality of antenna operating modes. In this regard, FIGS. 13A to 13C are views illustrating electric field distributions formed on conductive patterns of the antenna assembly in first to third frequency bands.

Figure 13A:
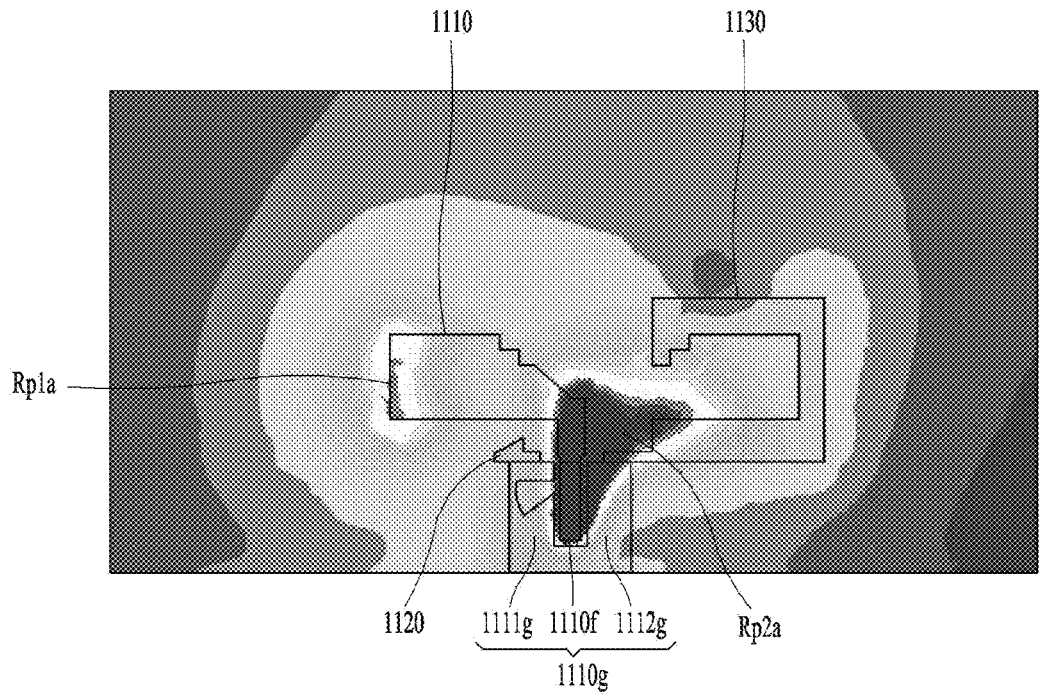
FIGS. 13A to 13C are views illustrating electric field distributions formed on conductive patterns of the antenna assembly in first to third frequency bands.

Referring to FIGS. 11A, 12A, and 13A, the current distribution on the first and third conductive patterns 1110, 1130 of the antenna assembly 1000 in the first frequency band may be shown to be higher than the current distribution on other regions. A first region Rp1a that is a peak area of the current distribution may be formed on one region of the first conductive pattern 1110. A second region Rp2a that is a peak area of the current distribution may be formed on one region of the third conductive pattern 1130. The second region RP2a may be formed based on the sixth part 1134 of the third conductive pattern 1130. Accordingly, the first conductive pattern 1110 and the third conductive pattern 1130 may operate as radiators in the first frequency band.

The first frequency band may be set to 1000 to 2000 MHz or 1500 to 2500 MHZ, but is not limited thereto. The first and third conductive patterns 1110 and 1130 may operate as dipole antennas in the first frequency band. The first and third conductive patterns 1110 and 1130 may operate in a quasi self-complementary dipole antenna mode to form a radiation pattern in a vertical (perpendicular) direction.

Figure 13B:
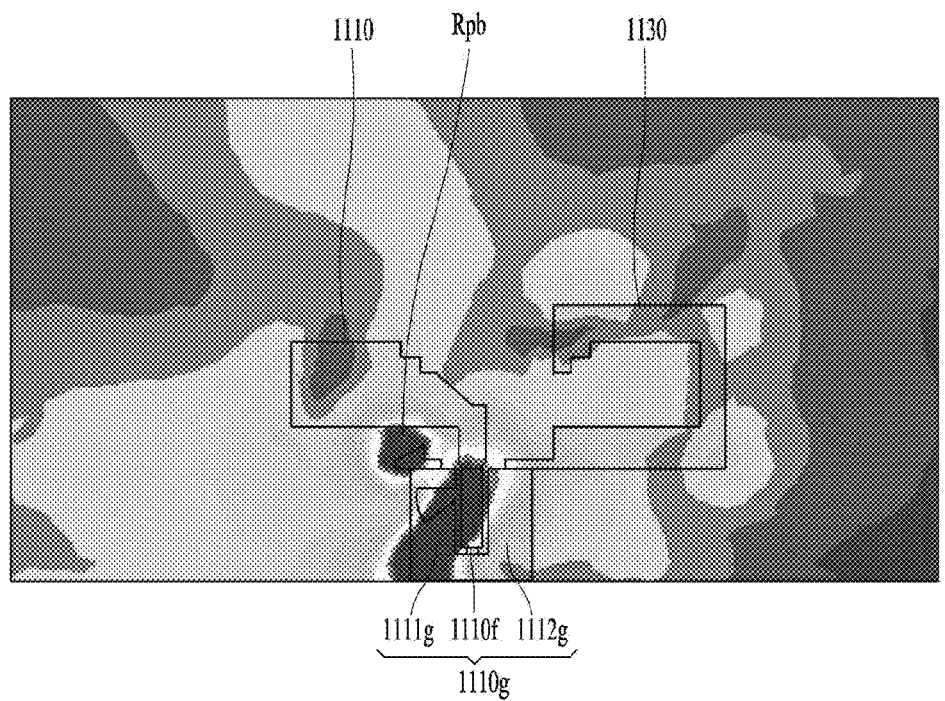
Figure 13C:
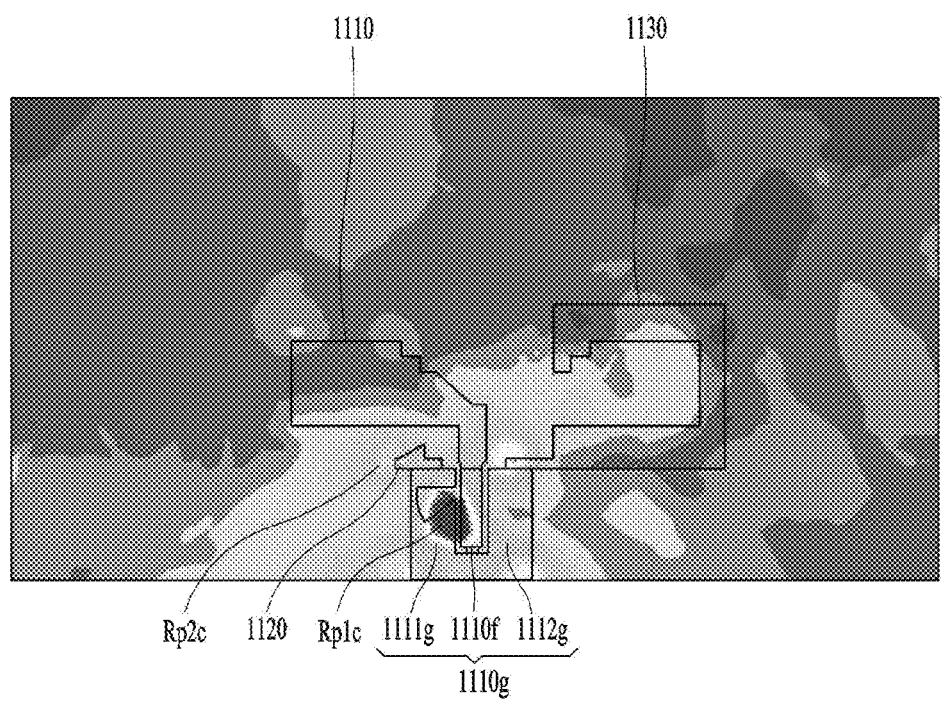

Referring to FIGS. 11A, 12B, and 13B, the current distribution on the first conductive pattern 1110 of the antenna assembly 1000 in the second frequency band may be shown to be higher than the current distribution on other regions. A peak area Rpb of the current distribution may be formed on the boundary region of the first conductive pattern 1110. Also, the first conductive pattern 1110 may operate as a radiator in the second frequency band.

The second frequency band may be set to 2500 to 5000 MHz, but is not limited thereto. Therefore, the first conductive pattern 1110 may operate as a monopole antenna in the second frequency band. The first conductive pattern 1110 may operate in a monopole antenna mode, so that a radiation pattern can be formed in a lateral direction.

Referring to FIGS. 11A, 12C, and 13C, the current distribution on the second region 1100b and the second conductive pattern 1120 of the antenna assembly 1000 in the third frequency band may be shown to be higher than the current distribution on other regions. A first region Rp1c that is a peak area of the current distribution may be formed on a slot region of the second region 1100b. Also, a second region Rp2c of a peak area of the current distribution may be formed in the boundary region of the second conductive pattern 1120. The current distribution in the first region Rp1c corresponding to the slot region may be formed higher than the current distribution in the second region Rp2c. The slot regions of the second conductive pattern 1120 and the ground region 1110g may operate as radiators in the third frequency band. The third frequency band may be set to 4500 to 6000 MHz, but is not limited thereto. Therefore, the second conductive pattern 1120 may operate as an antenna in the third frequency band. The slot regions of the second conductive pattern 1120 and the ground region 1110g may operate as radiators, so that a radiation pattern is formed in the lateral direction.

Therefore, the antenna assembly according to the present disclosure may be designed to configure an antenna that satisfies a broadband in a limited space. In this regard, in the first frequency band, which is a low frequency band of 1000 to 2000 MHz, a half-wavelength mode (first mode) of a basic complementary dipole antenna may be utilized. Meanwhile, in the second frequency band higher than the first frequency band, the first conductive pattern 1110 may operate in a monopole mode (second mode). Also, in the third frequency band higher than the second frequency band, the first conductive pattern 1110 may operate in a radiator mode (third mode) through the second conductive pattern 1120 formed as a ground stub and the slot of the ground region 1110g. Accordingly, the antenna assembly according to the present disclosure can be designed in a multi-radiation structure. In addition, the antenna assembly may be formed in a CPW antenna structure on a single layer.

Figure 14A:
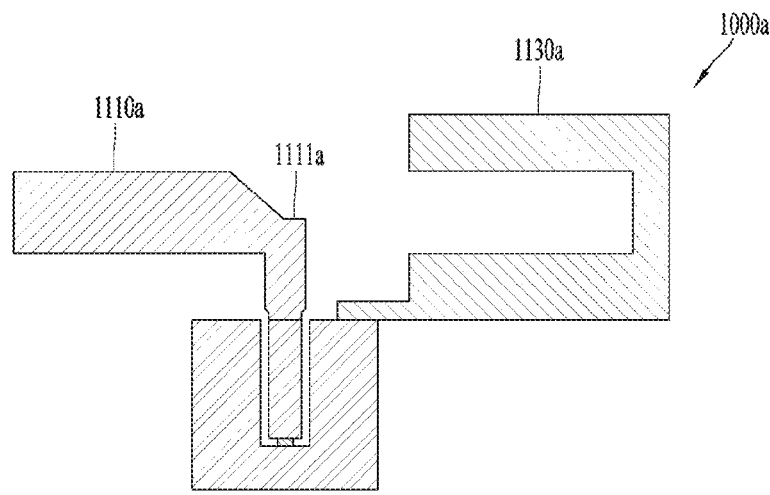
FIG. 14A is a view of different antenna assemblies according to embodiments.
Figure 14A:
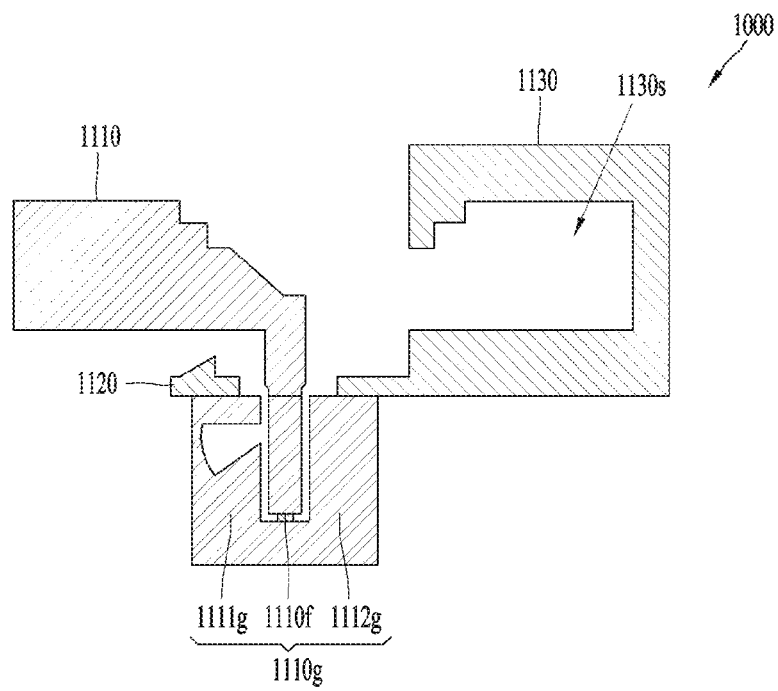

Meanwhile, the conductive patterns of the antenna assembly according to the present disclosure may be implemented in a complementary structure. In this regard, FIG. 14A is a view of different antenna assemblies according to embodiments. Referring to (a) of FIG. 14A, the first conductive pattern 1110a of the antenna assembly 1000a may be formed in a stepped structure. A slot region 1130s-1 of the third conductive pattern 1130b of the antenna assembly 1000a may be formed in a rectangular structure. Referring to (b) of FIG. 14B, the first conductive pattern 1110 and the third conductive pattern 1130 of the antenna assembly 1000 may be formed in a complementary structure. The first conductive pattern 1110 may be formed in a first stepped structure. The third conductive pattern 1130 may be formed in a second stepped structure. The slot region 1130s of the third conductive pattern 1130 may be formed in the second stepped structure. The stepped structures may be formed on the first and third conductive patterns 1110, 1130 corresponding to complementary dipole patterns, thereby improving antenna impedance characteristics.

Figure 14B:
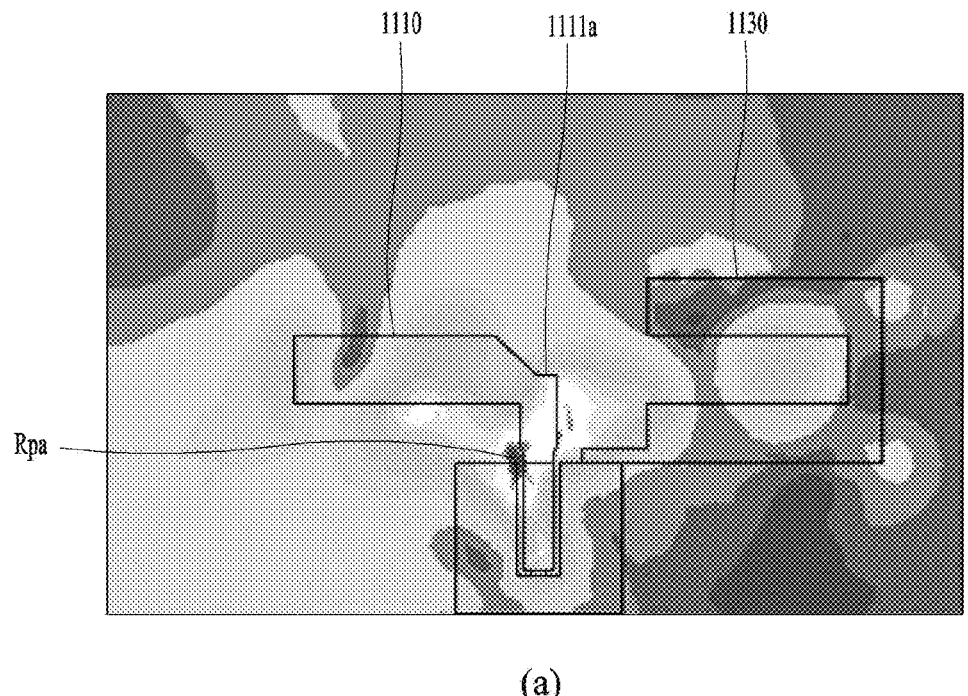
FIG. 14B compares electric field distributions of the antenna assemblies of FIG. 14A at specific frequencies.
Figure 14B:
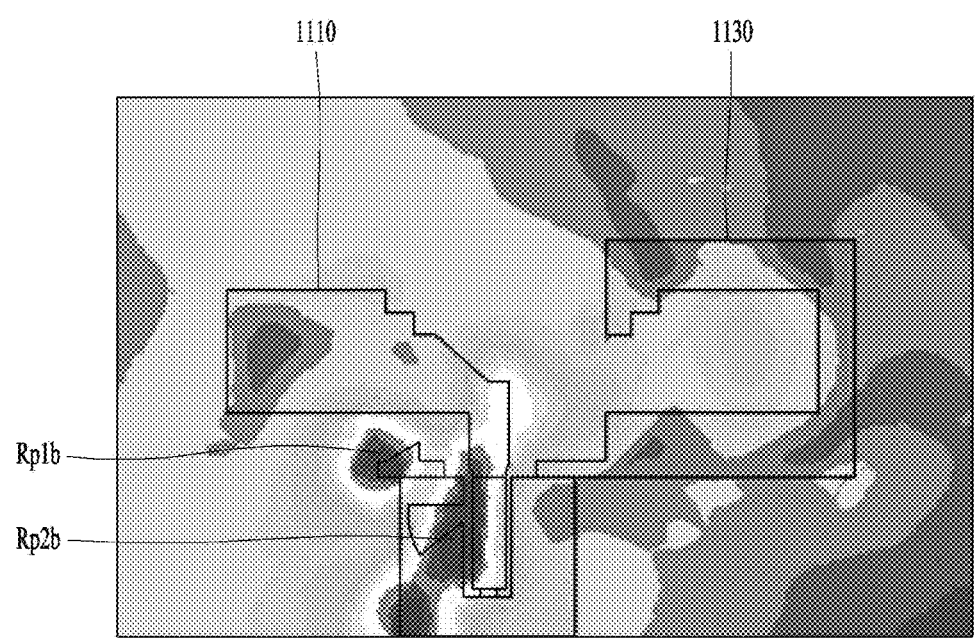

FIG. 14B compares electric field distributions of the antenna assemblies of FIG. 14A at specific frequencies. FIG. 14B illustrates the electric field distribution at a specific frequency of 4 GHz within the second frequency band. Referring to (a) of FIG. 14A and (a) of FIG. 14B, a peak area Rpa of a current distribution may be formed on the first conductive pattern 1110. The peak area Rpa of the current distribution may be formed on the first part 1111a of the first conductive pattern 1110a. The peak area Rpa of the current distribution may be limited to the first conductive pattern 1110a, which may limit the antenna efficiency and bandwidth characteristics.

Referring to (b) of FIG. 14A and (b) of FIG. 14B, a first region Rp1b of a peak area of a current distribution may be formed on the first conductive pattern 1120. Also, a second region Rp2b of the peak area of the current distribution may be formed in the slot region of the ground region 1110g corresponding to the second region 1100b. The peak areas Rp1b and Rp2b of the current distribution may extend to a plurality of regions including the second conductive pattern 1120 and the slot region, thereby improving antenna efficiency and bandwidth characteristics.

Figure 14C:
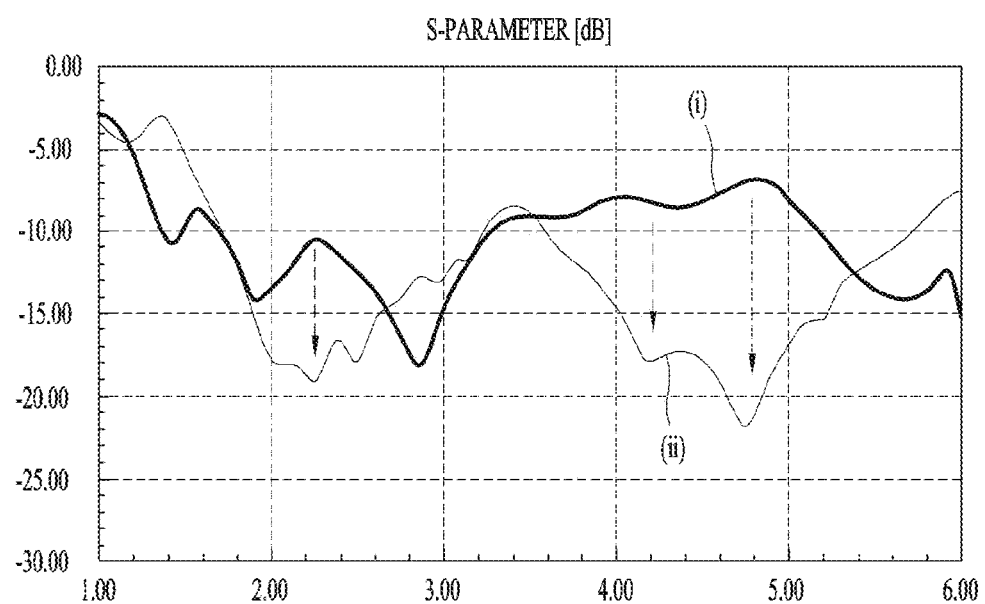
FIG. 14C compares reflection coefficient characteristics of the antenna assemblies of FIG. 14A.

FIG. 14C compares reflection coefficient characteristics of the antenna assemblies of FIG. 14A. Referring to FIGS. 14A and 14C, in a frequency band of 2 GHz to 2.7 GHZ, the reflection coefficient characteristic of the antenna assembly 1000a (i) may be lower than the reflection coefficient characteristic of the antenna assembly 1000 (ii). In a frequency band of 3.5 GHz to 5.5 GHZ, the reflection coefficient characteristic of the antenna assembly 1000a (i) may be lower than the reflection coefficient characteristic of the antenna assembly 1000 (ii). In particular, in a frequency band of 3.5 GHz to 5.2 GHZ, the reflection coefficient characteristic of the antenna assembly 1000a (i) may have a value of −10 dB or higher, which may deteriorate the impedance matching characteristic.

Therefore, the impedance matching characteristic of the antenna assembly 1000, which has the stepped structure on the first and third conductive patterns 1110, 1130 corresponding to the complementary dipole patterns, can be improved in a frequency band of 2 GHz or more. In this regard, the current flow and electric field distribution of a resonance mode of the antenna assembly 1000 may be implemented in different modes for each frequency band, thereby enabling improvement of broadband antenna characteristics and antenna efficiency.

Figure 15A:
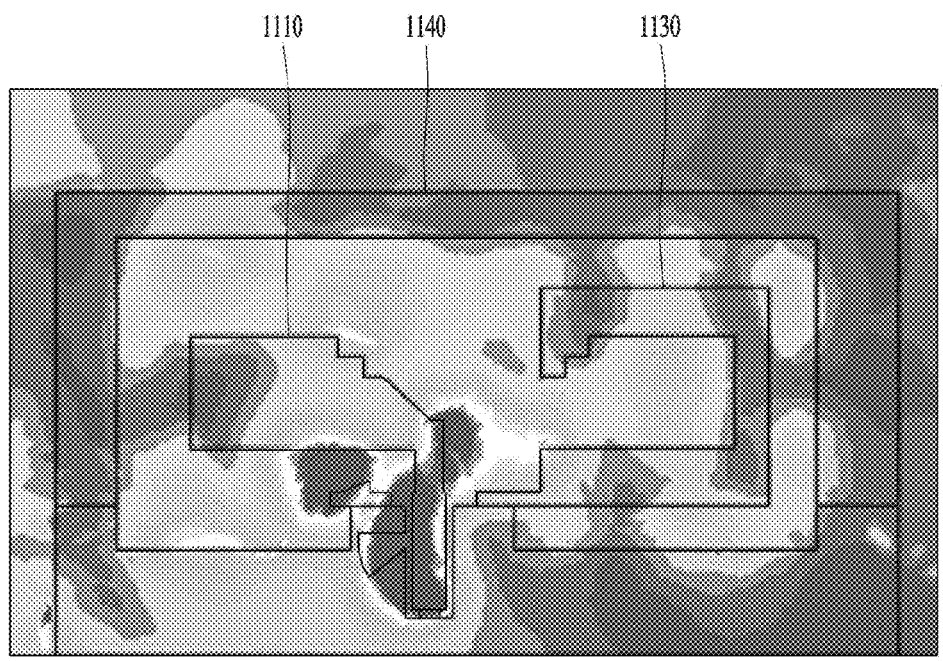
FIG. 15A is a view illustrating an electric field distribution formed on the antenna assembly of FIG. 11B.
Figure 15B:
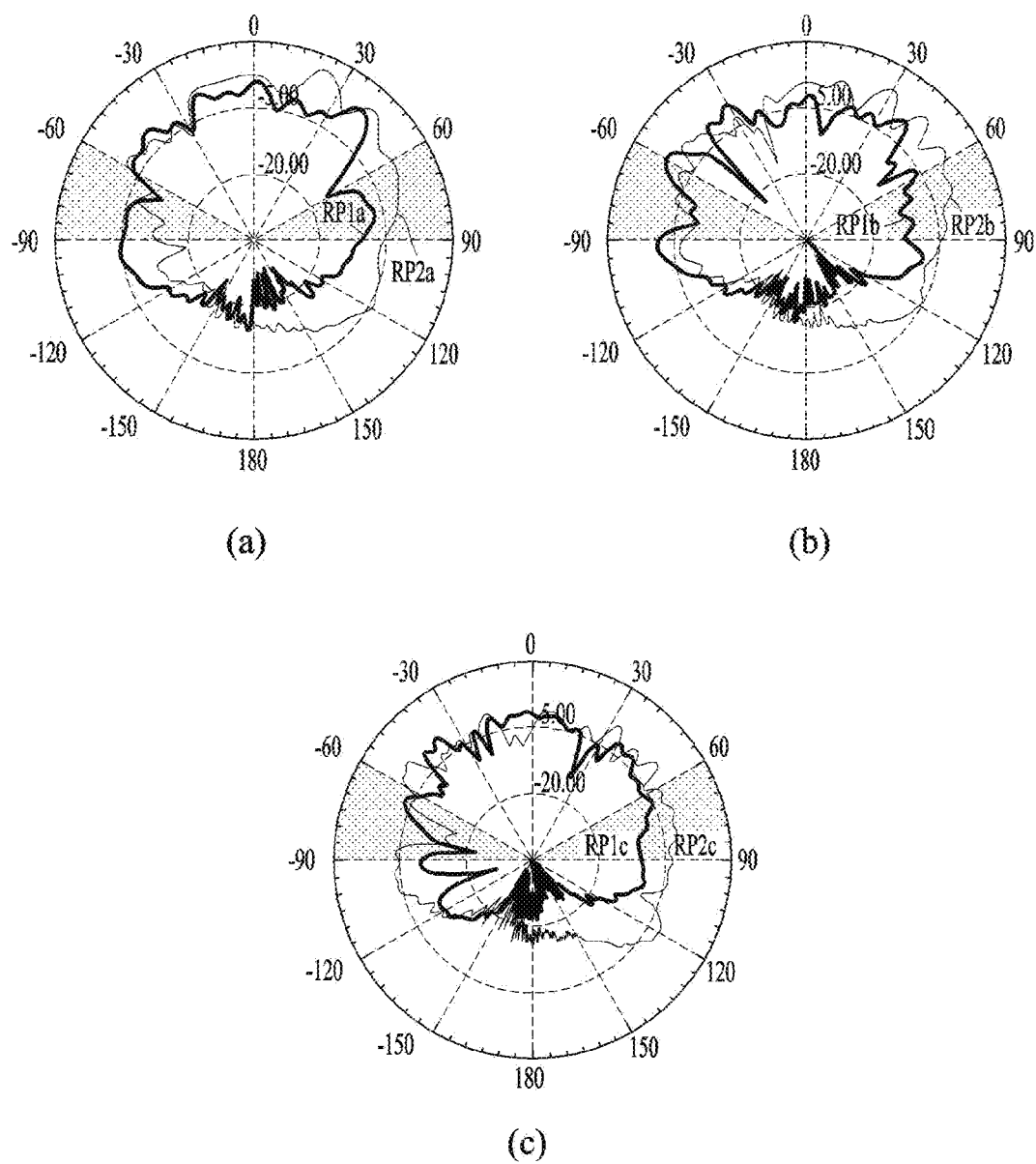
FIG. 15B compares radiation patterns of the antenna assembly of FIGS. 11A and 11B by frequency band.
Figure 16A:
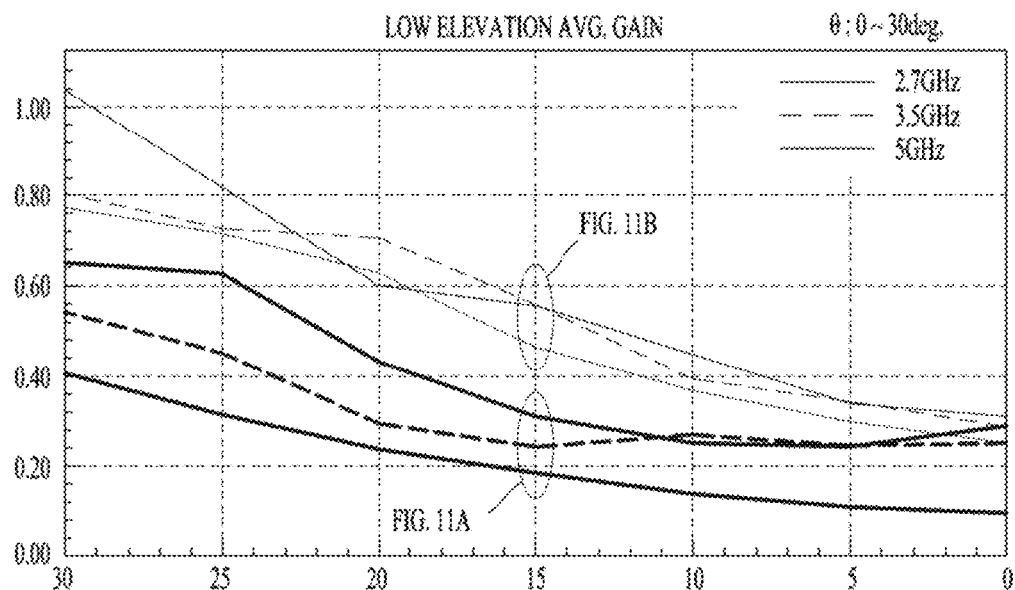
FIG. 16A is a view illustrating an antenna average gain by frequency for each angle of a low elevation area with respect to the antenna assembly of FIGS. 11A and 11B.
Figure 16B:
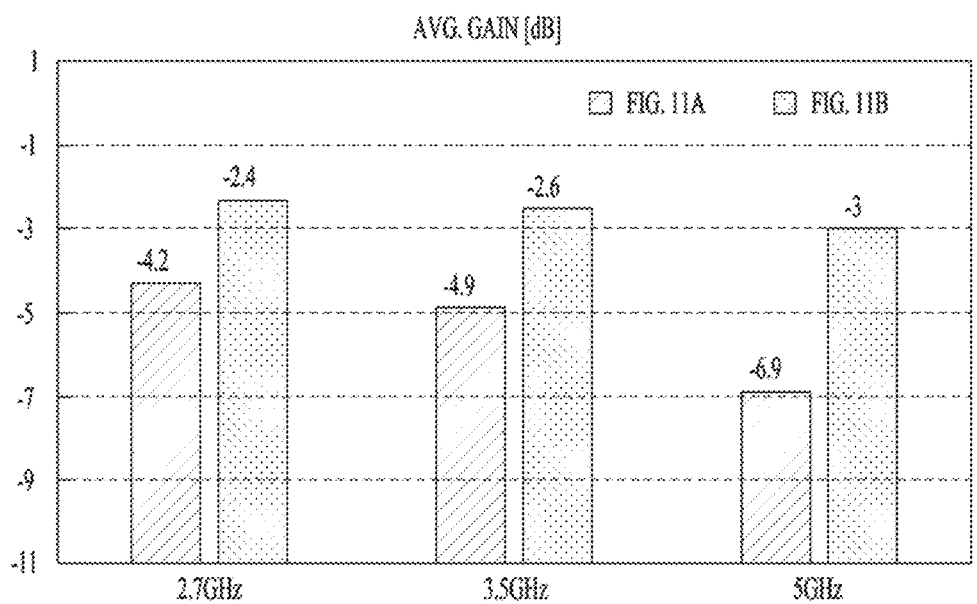
FIG. 16B is a bar graph of antenna average gains by frequency with respect to the antenna assembly of FIGS. 11A and 11B.

As described above, the antenna assembly forms a surrounding ground path by the fourth conductive pattern 1140 formed in the ground ring structure. Field dispersion may be reduced due to the surrounding ground path, and the effect of gathering antenna radiation patterns can be obtained. In this regard, FIG. 15A is a view illustrating an electric field distribution formed on the antenna assembly of FIG. 11B. FIG. 15B compares radiation patterns of the antenna assembly of FIGS. 11A and 11B for each frequency band. FIG. 16A is a view illustrating an antenna average gain by frequency for each angle of a low elevation area for the antenna assembly of FIGS. 11A and 11B. FIG. 16B is a bar graph of antenna average gains by frequency for the antenna assembly of FIGS. 11A and 11B.

Referring to FIGS. 11A and 13B, the electric field distribution on the first conductive pattern 1110, the internal slot 1111s, and the second conductive pattern 1120 is formed higher than the electric field distribution on other regions. Referring to FIGS. 11B and 15A, even in the antenna assembly 1140 which further includes the fourth conductive pattern 1140, the electric field distribution on the first conductive pattern 1110, the internal slot 1111s, and the second conductive pattern 1120 is formed higher than the electric field distribution on other regions.

Meanwhile, the electric field distribution on the third conductive pattern 1130 is formed at a level similar to the electric field distribution on the first conductive pattern 1110. Referring to FIG. 11B and FIG. 12A, the first and second currents I1a and I1b formed on the first conductive pattern 1110 are formed in parallel to third and fourth currents I1c and I1d formed on the fourth conductive pattern 1140. In addition, differences between the first and second currents I1a, I1b formed on the first conductive pattern 1110 and the third and fourth currents I1c, I1d formed on the fourth conductive pattern 1140 may be equal to or smaller than a threshold value.

Accordingly, the electric field distribution on the fourth conductive pattern 1140 is formed at a level similar to the electric field distribution on the first conductive pattern 1110. Therefore, the field dispersion is reduced by the fourth conductive pattern 1140 that forms the surrounding ground path and has the electric field distribution level similar to the first conductive pattern 1110. The third conductive pattern 1130 can reduce the field distribution and achieve the effect of gathering the antenna radiation patterns.

Referring to FIG. 11A, FIG. 11B, and (a) of FIG. 15B, a first radiation pattern RP1a of the antenna assembly having the first and second conductive patterns 1110-1130 at 2.7 GHZ and a second radiation pattern RP2a of the antenna assembly having the first to fourth conductive patterns 1110-1140 are illustrated. The level of the second radiation pattern RP2a of the ground ring structure is formed higher than the level of the first radiation pattern RP1a in a low elevation area of about 30 degrees or less.

Referring to FIG. 11A, FIG. 11B, and (b) of FIG. 15B, a first radiation pattern RP1b of the antenna assembly having the first and second conductive patterns 1110-1130 at 3.5 GHZ and a second radiation pattern RP2b of the antenna assembly having the first to fourth conductive patterns 1110-1140 are illustrated. The level of the second radiation pattern RP2b of the ground ring structure is formed higher than the level of the first radiation pattern RP1b in the low elevation area of about 30 degrees or less.

Referring to FIG. 11A, FIG. 11B, and (c) of FIG. 15B, a first radiation pattern RP1c of the antenna assembly having the first and second conductive patterns 1110-1130 at 5 GHz and a second radiation pattern RP2c of the antenna assembly having the first to fourth conductive patterns 1110-1140 are illustrated. The level of the second radiation pattern RP2c of the ground ring structure is formed higher than the level of the first radiation pattern RP1c in the low elevation area of about 30 degrees or less.

Referring to FIGS. 11A, 11B, 16A, and 16B, the average antenna gain in the low elevation area of 0 to 30 degrees for 2.7 GHz is-4.2 dB for (i) the antenna assembly 1000 with the first structure including the first to third conductive patterns. On the contrary, (ii) it can be seen that the average antenna gain is about-2.4 dB, which has been improved by about 1.8 dB, for the antenna assembly 1000b with the second structure of the ground ring structure including the first to fourth conductive patterns.

Referring to FIGS. 11A, 11B, 16A, and 16B, the average antenna gain in the low elevation area of 0 to 30 degrees for 3.5 GHz is-4.9 dB for (i) the antenna assembly 1000 with the first structure including the first to third conductive patterns. On the contrary, (ii) it can be seen that the average antenna gain is about-2.6 dB, which has been improved by about 2.3 dB, for the antenna assembly 1000b with the second structure of the ground ring structure including the first to fourth conductive patterns.

Referring to FIGS. 11A, 11B, 16A, and 16B, the average antenna gain in the low elevation area of 0 to 30 degrees for 5 GHz is-6.9 dB for (i) the first structure including the first to third conductive patterns. On the contrary, (ii) it can be seen that the average antenna gain is about-3.0 dB, which has been improved by about 3.9 dB, for the second structure of the ground ring structure including the first to fourth conductive patterns. Accordingly, the fourth conductive pattern 1140 having the ground ring structure surrounding the first to third conductive patterns 1110 to 1130 can be implemented, thereby improving the antenna gain of the low elevation area in the high band by about 2 dB or more.

Referring to FIGS. 11A, 11B, 16A, and 16B, as an operating frequency increases, the antenna gain improvement effect by the fourth conductive pattern 1140 can be more enhanced. As a frequency band increases, a distance from the electric field peak area by the first to third conductive patterns 1110 to 1130 to the end of the fourth conductive pattern 1140 increases in wavelength units. Accordingly, the electric field leakage effect by the first to third conductive patterns 1110 to 1130 can be further reduced in a high frequency band. As the fourth conductive pattern 1140 is formed, the gain flatness characteristic can be improved in a frequency band of 2.7 GHz to 5 GHz. In this regard, the antenna gain of the first structure including the first to third conductive patterns 1110 to 1130 is in the range of −6.9 dB to −4.2 dB with a gain difference of approximately 2.7 dB. On the contrary, the antenna gain of the second structure including the first to fourth conductive patterns 1110 to 1140 is in the range of −3.0 dB to −2.4 dB with a gain difference of about 0.6 dB, thereby greatly improving the gain flatness.

Figure 17A:
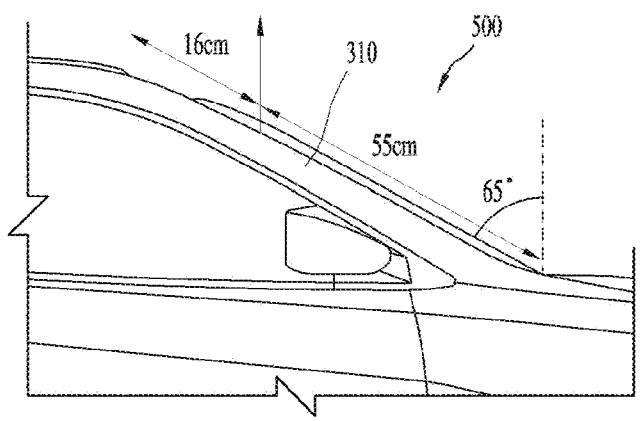
FIGS. 17A to 17C are views illustrating inclination angles of front glass, quarter glass, and rear glass of a vehicle and radiation patterns according to the arrangement of the antenna assembly.
Figure 17A:
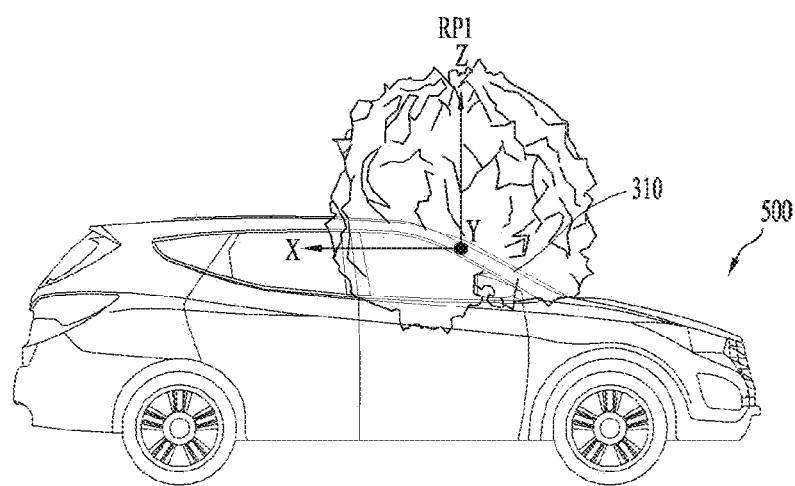
Figure 17B:
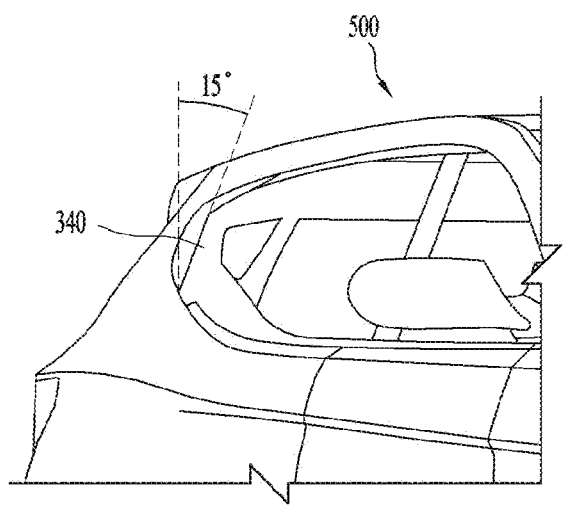
Figure 17B:
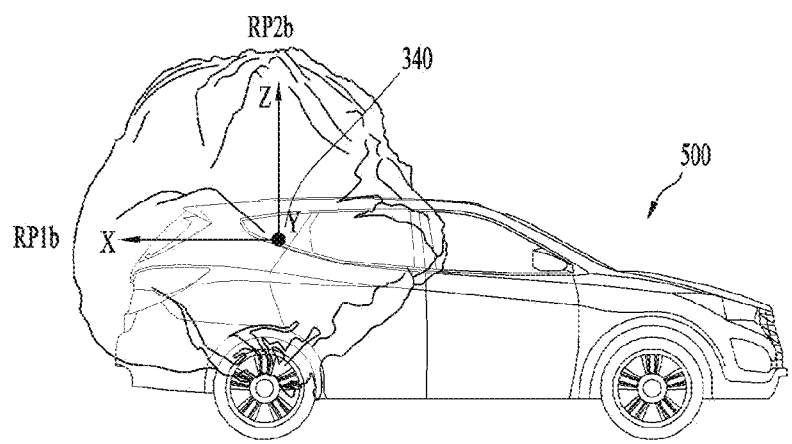
Figure 17C:
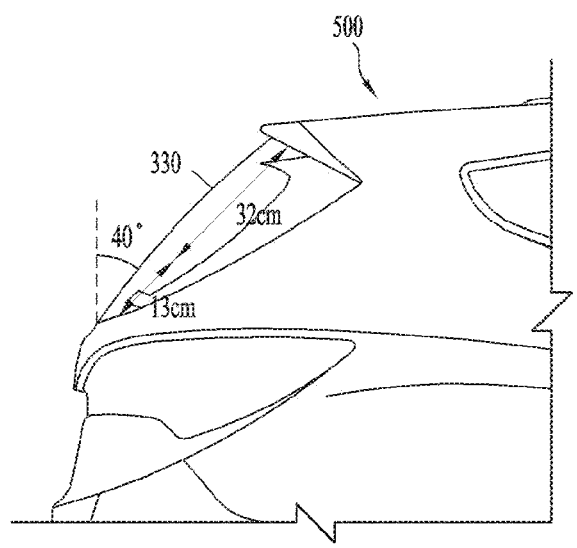
Figure 17C:
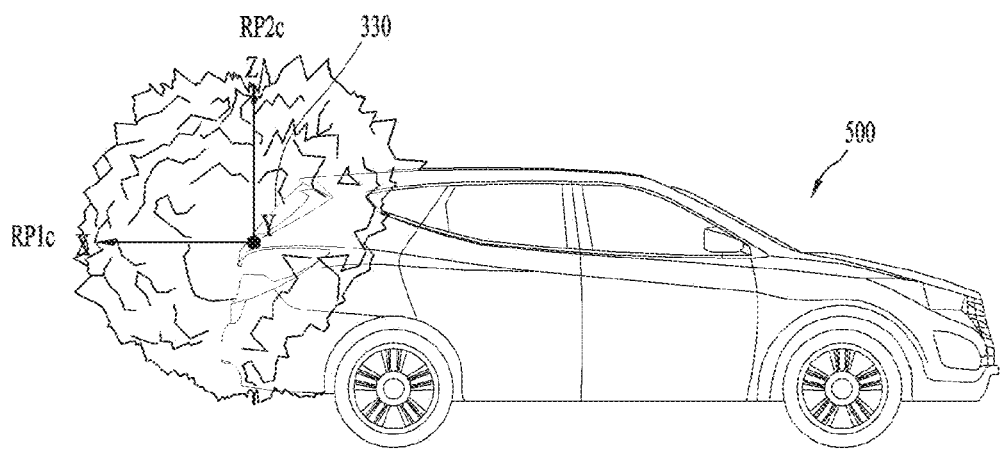

The antenna assembly according to the specification, as illustrated in FIG. 1, may be placed on one or more regions of the front glass 310, door glass 320, rear glass 330, quarter glass 340, and upper glass 350 of the vehicle. In this regard, FIGS. 17A to 17C are views illustrating inclination angles of front glass, quarter glass, and rear glass of a vehicle and radiation patterns according to the arrangement of the antenna assembly. The antenna assembly 1000 which includes the first conductive pattern 1110 and the second conductive pattern 1120, as illustrated in FIG. 11, may be placed on the front glass 310, quarter glass 340, and rear glass 330.

Referring to FIG. 1 and (a) of FIG. 17A, the front glass 310 of the vehicle 500 may be formed to be inclined at a first angle or more with respect to the vertical direction. For example, the front glass 310 may be formed to be inclined at about 65 degrees with respect to the vertical direction. Referring to FIG. 1 and (b) of FIG. 17A, when the antenna assembly is placed on the front glass 310 of the vehicle 500, the peak area RP1 of the radiation pattern may be formed in the vertical direction.

Referring to FIG. 1 and (a) of FIG. 17B, the front glass 340 of the vehicle 500 may be formed to be inclined at a second angle smaller than the first angle with respect to the vertical direction. For example, the quarter glass 340 may be formed to be inclined at about 15 degrees with respect to the vertical direction. Referring to FIG. 1 and (b) of FIG. 17B, when the antenna assembly is placed on the quarter glass 340 of the vehicle 500, the peak area of the radiation pattern may be provided with a first peak area RP1$b$ in the horizontal direction and a second peak area RP2$b$ in the vertical direction. The second peak area RP2$b$ in the vertical direction may be in a lateral direction compared to the peak area RP1 of the radiation pattern in which the antenna assembly is arranged on the front glass 310 of (b) of FIG. 17A.

Referring to FIG. 1 and (b) of FIG. 17C, the rear glass 330 of the vehicle 500 may be formed to be inclined at a third angle that is smaller than the first angle and larger than the second angle with respect to the vertical direction. For example, the rear glass 330 may be formed to be inclined at about 40 degrees with respect to the vertical direction. Referring to FIG. 1 and (b) of FIG. 17C, when the antenna assembly is placed on the rear glass 330 of the vehicle 500, the peak area of the radiation pattern may be provided with a first peak area RP1$c$ in the horizontal direction and a second peak area RP2$c$ in the vertical direction. The second peak area RP2$c$ in the vertical direction may be in a lateral direction compared to the peak area RP1 of the radiation pattern in which the antenna assembly is arranged on the front glass 310 of (b) of FIG. 17A.

Referring to FIGS. 17A to 17C, when the antenna assembly is placed on the vehicle glass due to the influence of the conductive body of the vehicle and the ground, a radiation pattern in an upward direction (vertical direction) may be formed to be dominant over a radiation pattern in another direction (horizontal directions). Especially, as the inclination angle of the glass panel increases, the antenna radiation pattern may be formed more upward (vertically). Additionally, the antenna radiation pattern may be formed more upwardly (vertically) in a frequency band of 1.7 to 3.5 GHz of the MB band and HB band higher than the LB band. Accordingly, the antenna gain can be reduced in the low elevation area of about 30 degrees with respect to a horizontal plane.

The inclination of the glass panel is designed such that inclination angles become greater in the order of the quarter glass 340, rear glass 330, and front glass 310. Accordingly, when the antenna assembly is placed on a structure where the inclination angle is greater than a certain angle, such as the rear glass 330 and the front glass 310, a horizontal radiation pattern needs to be formed.

Figure 18A:
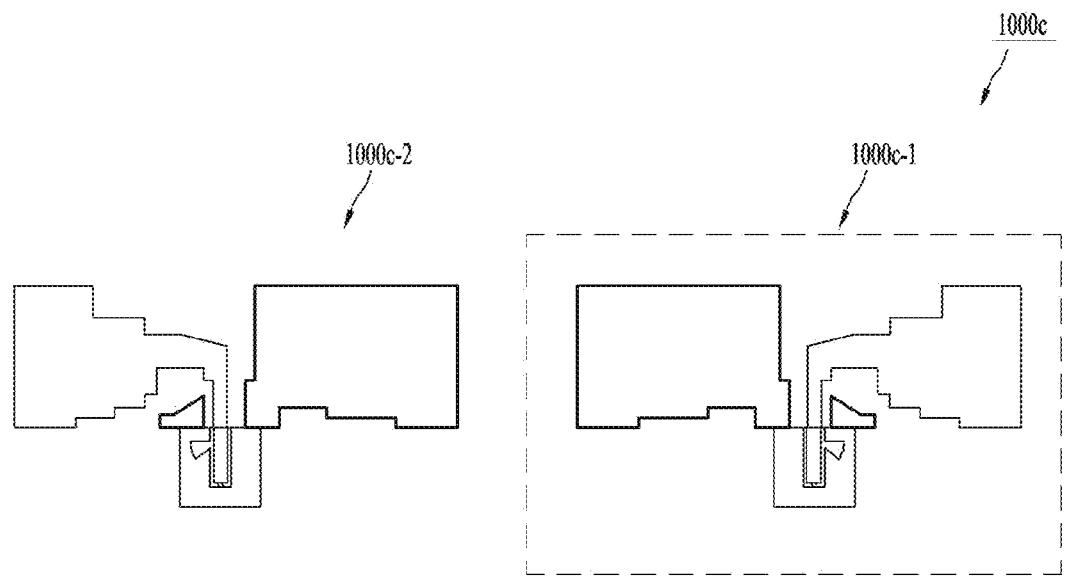
FIG. 18A is a view illustrating an arbitrary antenna structure formed by a plurality of conductive patterns without a ground ring structure.

In this regard, a description will be given below of the radiation pattern characteristics and current distribution of the antenna assembly 1000$b$ which further includes the fourth conductive pattern 1140 with the ground ring structure as illustrated in FIG. 11B. In this regard, FIG. 18A is a view illustrating an arbitrary antenna structure formed by a plurality of conductive patterns without a ground ring structure. Meanwhile, FIG. 18B is a view illustrating a structure in which the antenna assembly of FIG. 11B is disposed adjacent to the antenna structure of FIG. 18A.

Referring to FIG. 18A, the antenna structure 1000$c$ may include a first radiation structure 1110$c$-1 and a second radiation structure 1000$c$-2. The first radiation structure 1000$c$-1 and the second radiation structure 1000$c$-2 may each include a plurality of conductive patterns and operate in the first frequency band to the third frequency band.

Figure 18B:
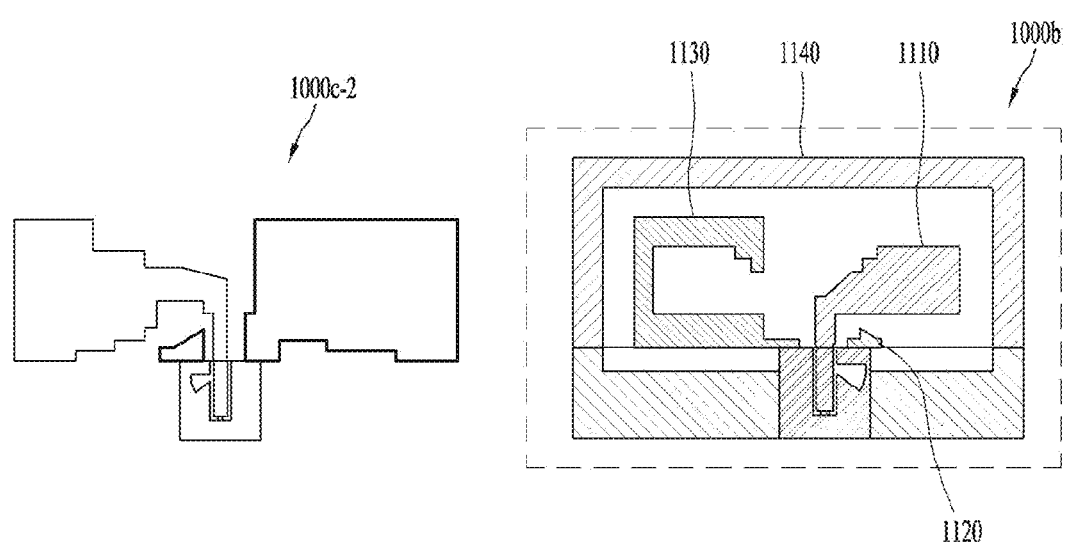
FIG. 18B is a view illustrating a structure in which the antenna assembly of FIG. 11B is disposed adjacent to the antenna structure of FIG. 18A.

Referring to FIG. 18B, the antenna assembly 1000$b$ may be disposed adjacent to the second radiation structure 1000$c$-2. The antenna assembly 1000$b$ may include the fourth conductive pattern 1140 having the ground ring structure surrounding the first to third conductive patterns 1110 to 1130.

Figure 19A:
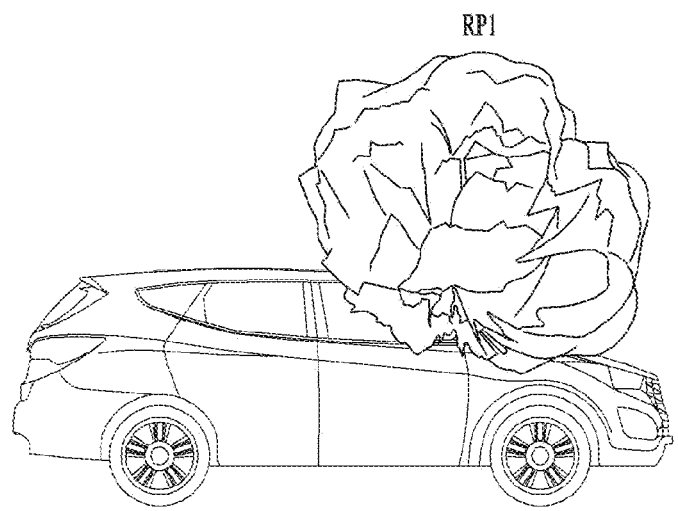
FIGS. 19A and 19B are views illustrating antenna radiation patterns when the antenna structures of FIGS. 18A and 18B are disposed on the front glass of the vehicle.
Figure 19B:
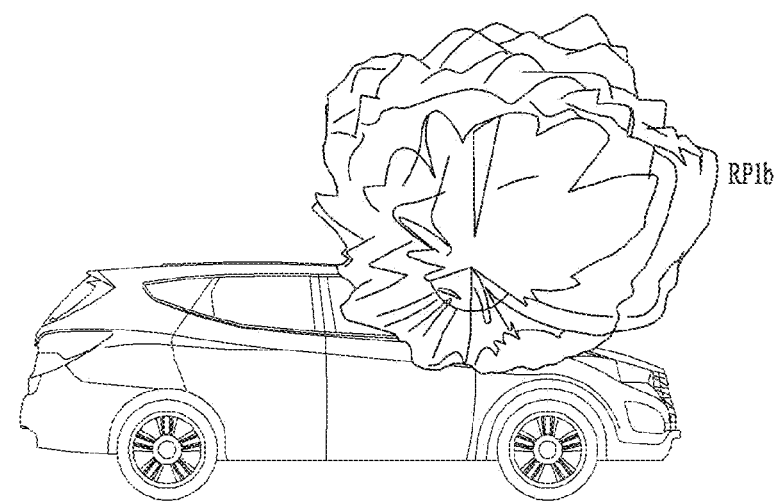
Figure 19C:
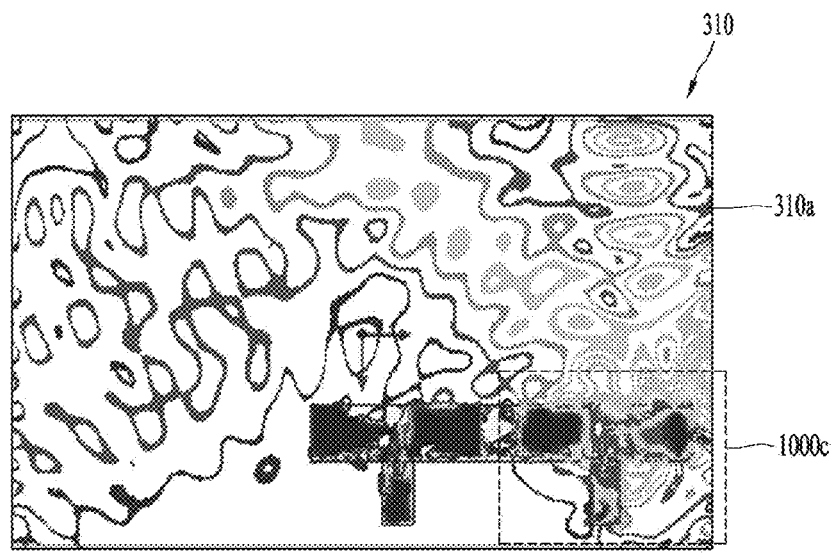
FIGS. 19C and 19D are views illustrating electric field distributions when the antenna structures of FIG. 18A and the antenna assembly of FIG. 18B are disposed on vehicle glass.
Figure 19D:

FIGS. 19A and 19B are views illustrating antenna radiation patterns when the antenna structures of FIGS. 18A and 18B are disposed on the front glass of the vehicle. FIGS. 19C and 19D are views illustrating electric field distributions when the antenna structure of FIG. 18A and the antenna assembly of FIG. 18B are disposed on vehicle glass.

Referring to FIG. 1, FIG. 18A, and FIG. 19A, the peak area RP1 of the radiation pattern of the antenna structure 1000$c$ disposed on the front glass 310 may be formed in the vertical direction. Referring to FIGS. 18A and 19C, the electric field distribution formed on the antenna structure 1000$c$ appears higher in the regions corresponding to the conductive patterns than in other regions. Current paths on the antenna structure 1000$c$ may be current paths of the conductive patterns corresponding to radiators. Additionally, the electric field distribution formed on the conductive patterns maintains a high level even in the upper region 310*a* of the front glass 310, which is the external region of the antenna structure 1000*c*. Therefore, the antenna efficiency may decrease and the vertical radiation pattern component may increase due to the current formed on the upper region 310*a* of the front glass. Accordingly, as the inclination angle of the glass panel on which the antenna assembly 1000 is placed increases, the peak angle of the radiation pattern may be formed upwardly (vertically).

Referring to FIG. 1, FIG. 18B, and FIG. 19B, the antenna assembly 1000*b* further including the fourth conductive pattern 1140 with the ground ring structure may be disposed on the front glass 310 of the vehicle. The peak area RP1*b* of the radiation pattern of the antenna assembly 1000*b* disposed on the front glass 310 may be a low elevation area. The low elevation area may be defined in a range of about 30 degrees with respect to the horizontal plane, but is not limited thereto. The antenna assembly 1000*b* further including the fourth conductive pattern 1140 of the ground ring structure may implement low elevation beam characteristics even on a region, such as the front glass 310 of the vehicle, with a large inclination angle.

Referring to FIGS. 11B, 15A, and 19D, the electric field distribution on the first conductive pattern 1110, the internal slot 1111*s*, and the second conductive pattern 1120 is formed higher than the electric field distribution on other regions in the antenna assembly 1000*b*. Meanwhile, the electric field distribution on the fourth conductive pattern 1140 is formed at a level similar to the electric field distribution on the first conductive pattern 1110.

A ground path surrounded by the fourth conductive pattern 1140 is formed, and the field dispersion phenomenon is reduced by the fourth conductive pattern 1140 that has the electric field distribution level similar to the first conductive pattern 1110. The fourth conductive pattern 1140 can reduce the field distribution and achieve the effect of gathering the radiation patterns of the antenna. In this regard, a current path is formed on the fourth conductive pattern 1140 of the ground ring structure, in addition to the radiators of the first to third conductive patterns 1110 to 1130. The electric field distribution formed on the first to third conductive patterns 1110 to 1130 decreases below a critical level on the upper region 310*a* of the front glass 310, which is the external region of the antenna assembly 1000. Accordingly, unnecessary current components are not formed on the upper region 310*a* of the front glass, which may result in an increase in antenna efficiency and decrease in radiation pattern components in the vertical direction. Therefore, the electric field can be concentrated inside the antenna assembly 1000*b*, and the upward (vertical) radiation pattern can be suppressed by the fourth conductive pattern 1140, which is the expanded ground.

Figure 20A:
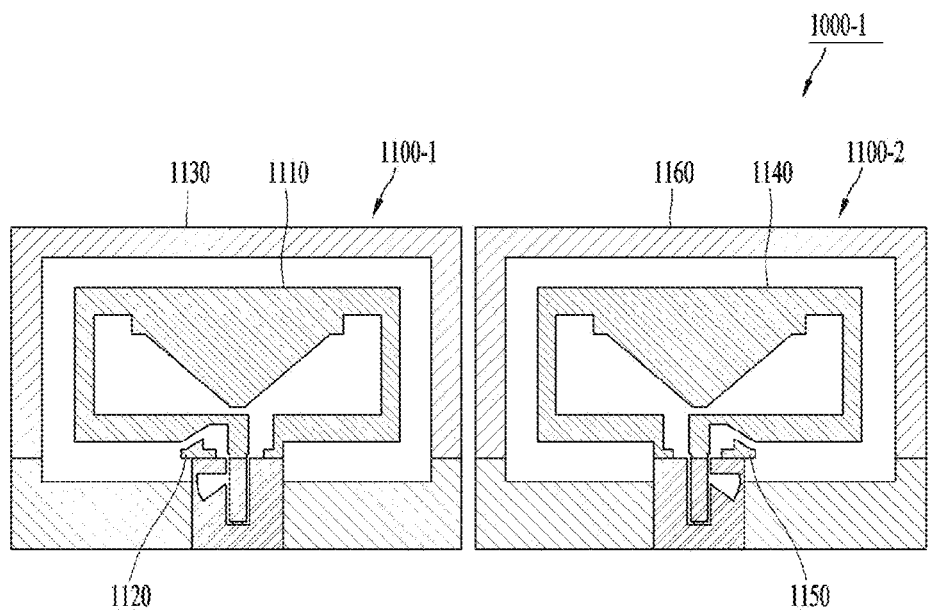
FIG. 20A is a view illustrating a MIMO antenna assembly formed with a folded dipole antenna structure.
Figure 20B:
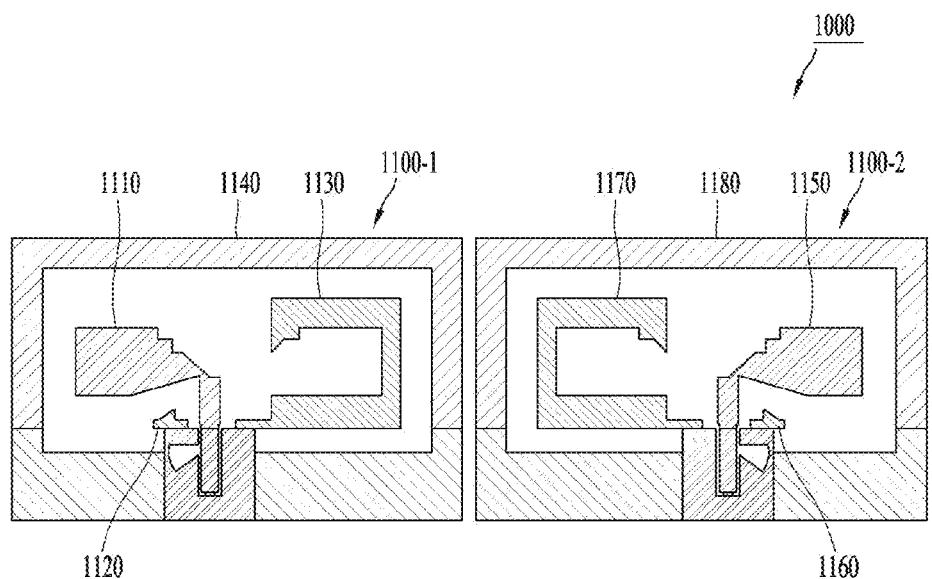
FIG. 20B is a view illustrating a MIMO antenna assembly formed with a complementary dipole antenna structure.

Meanwhile, the antenna assemblies according to various embodiments of the specification may be configured with various structures to support multi-input and multi-output (MIMO) communications. In this regard, FIG. 20A is a view illustrating a MIMO antenna assembly formed with a folded dipole antenna structure. FIG. 20B is a view illustrating a MIMO antenna assembly formed with a complementary dipole antenna structure.

Referring to FIGS. 20A, the antenna assembly 1000-1 includes a first radiation structure 1100-1 and a second radiation structure 1100-2. The first radiation structure 1111-1 may include first and second conductive patterns 1110 and 1120. The first radiation structure 1100-1 may further include a third conductive pattern 1130 with a ground ring structure surrounding the first and second conductive patterns 1110 and 1120. The second radiation structure 1100-2 may include fourth and fifth conductive patterns 1140 and 1150. The second radiation structure 1100-2 may further include a sixth conductive pattern 1160 with a ground ring structure surrounding the fourth and fifth conductive patterns 1140 and 1150. The third and sixth conductive patterns 1130 and 1160 forming the ground ring structure may be configured to be connected to each other, but may alternatively be configured to be spaced apart from each other to improve isolation.

Referring to FIGS. 20B, the antenna assembly 1000 includes a first radiation structure 1100-1 and a second radiation structure 1100-2. The first radiation structure 1100-1 may include first to third conductive patterns 1110 to 1130. The first radiation structure 1100-1 may further include a fourth conductive pattern 1140 with a ground ring structure surrounding the first to fourth conductive patterns 1110 to 1130. The second radiation structure 1100-2 may include fifth to seventh conductive patterns 1150 to 1170. The second radiation structure 1100-2 may further include an eighth conductive pattern 1180 with a ground ring structure surrounding the fifth to seventh conductive patterns 1150 to 1170. The fourth and eighth conductive patterns 1140 and 1180 forming the ground ring structure may be configured to be connected to each other, but may alternatively be configured to be spaced apart from each other for improvement of isolation.

Referring to FIGS. 20A and 20B, the antenna elements of the ground ring structure may be arranged adjacently. Low elevation beam performance can be optimized in the second frequency band or higher through the antenna elements with the ground ring structure.

Figure 20C:
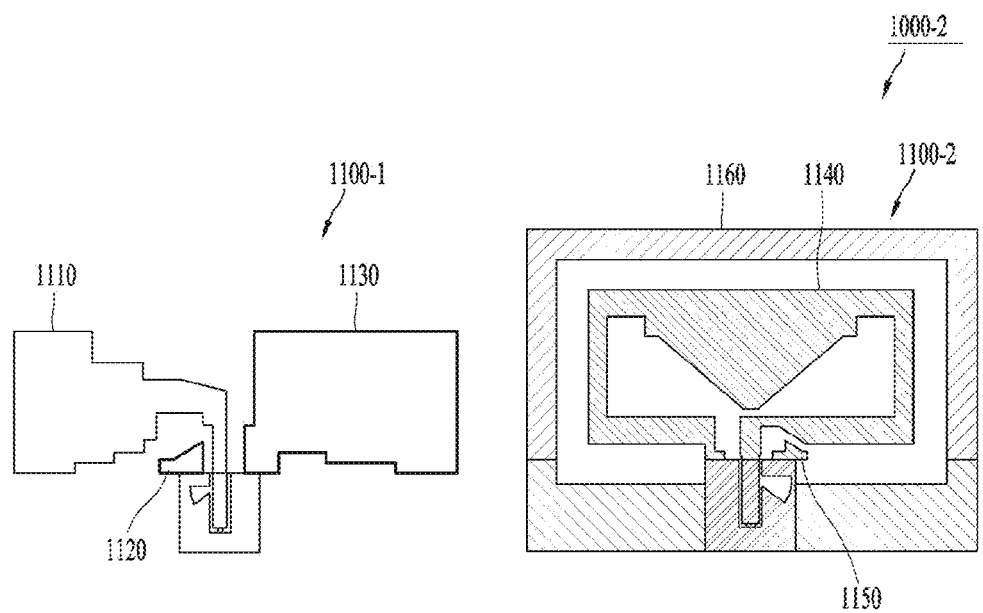
FIGS. 20C and 20D are views illustrating antenna assemblies each having an asymmetrical structure having different antenna elements.
Figure 20D:
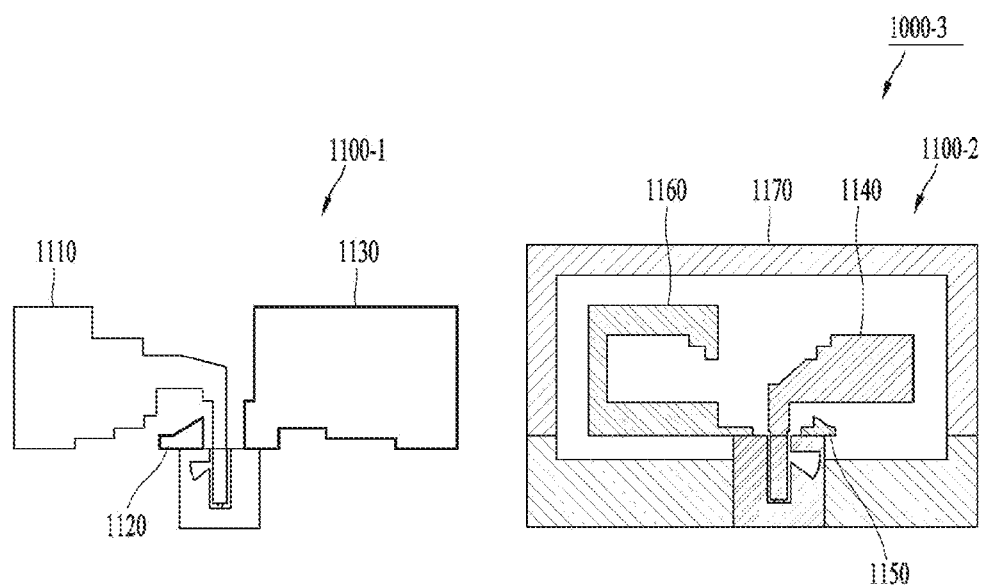

FIGS. 20C and 20D are views illustrating antenna assemblies each having an asymmetrical structure including different antenna elements. FIG. 20C illustrates an antenna assembly in which an arbitrary antenna element including a plurality of conductive patterns without a ground ring structure and the antenna element with the ground ring structure of FIG. 20A are arranged. FIG. 20D illustrates a structure in which an arbitrary antenna element including a plurality of conductive patterns without a ground ring structure and the antenna element with the ground ring structure of FIG. 20B are arranged.

Referring to FIG. 20C, the antenna assembly 1000-2 includes a first radiation structure 1100-1 and a second radiation structure 1100-2 with an asymmetrical structure. The first radiation structure 1111-1 may include first to third conductive patterns 1110. The second radiation structure 1100-2 may include fourth and fifth conductive patterns 1140 and 1150. The second radiation structure 1100-2 may further include a sixth conductive pattern 1160 with a ground ring structure surrounding the fourth and fifth conductive patterns 1140 and 1150.

Referring to FIG. 20D, the antenna assembly 1000-3 includes a first radiation structure 1100-1 and a second radiation structure 1100-2 with an asymmetrical structure. The first radiation structure 1111-1 may include first to third conductive patterns 1110 to 1130. The second radiation structure 1100-2 may include fourth to sixth conductive patterns 1140 to 1160. The second radiation structure 1100-2 may further include a seventh conductive pattern 1170 with a ground ring structure surrounding the fourth to sixth conductive patterns 1140 to 1160.

Referring to FIGS. 20C and 20D, the antenna elements of the asymmetrical structure may be arranged adjacently. The antenna performance in the low frequency band, which is the first frequency band, may be improved through antenna elements operating in a dipole mode of an asymmetrical structure. In particular, the isolation characteristics between the antenna elements in the low frequency band, which is the first frequency band, may be improved through the antenna elements of the asymmetrical structure.

Figure 21A:
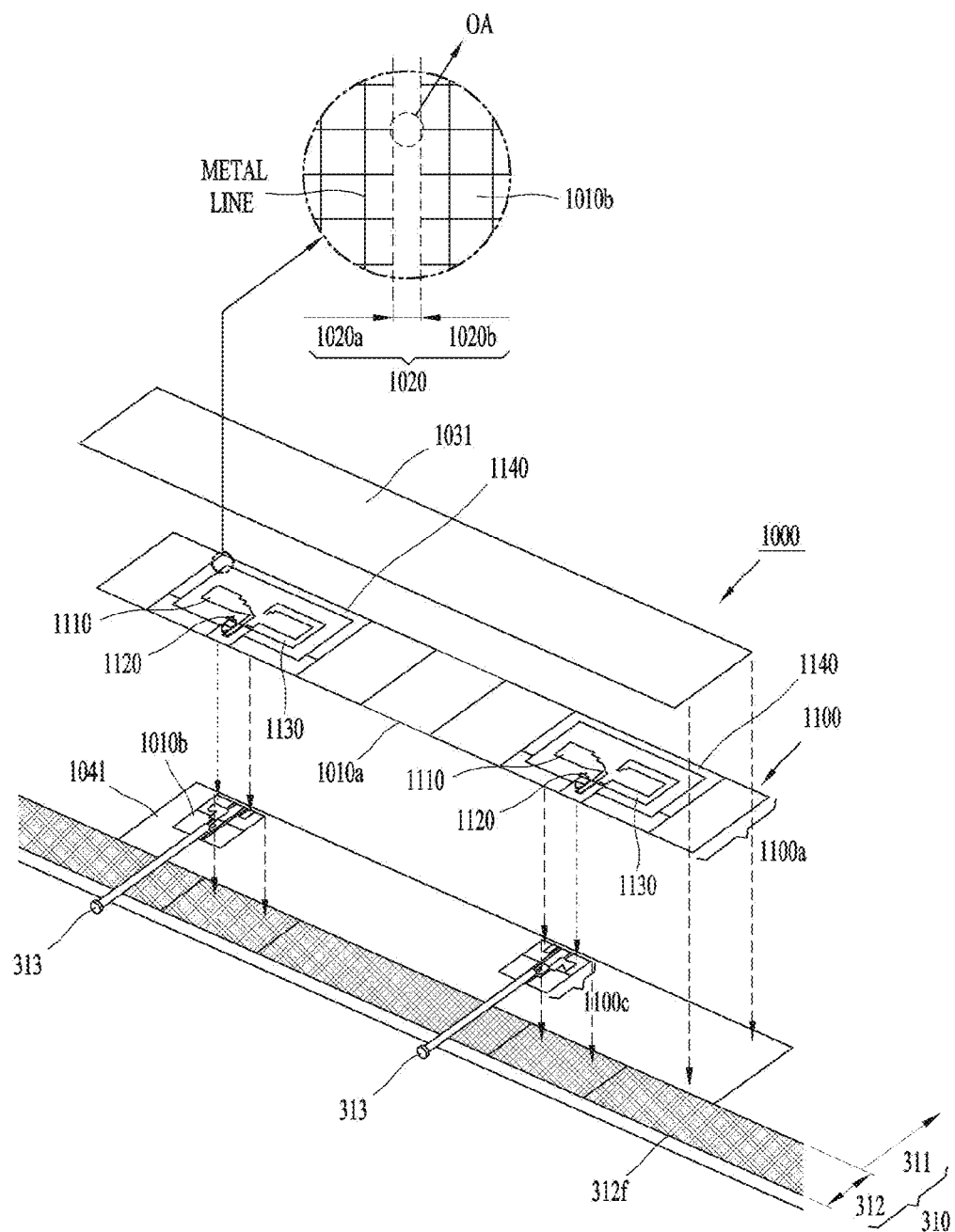
FIG. 21A is a view illustrating the structure of an antenna assembly with a transparent antenna structure according to another aspect of the present disclosure.
Figure 21B:
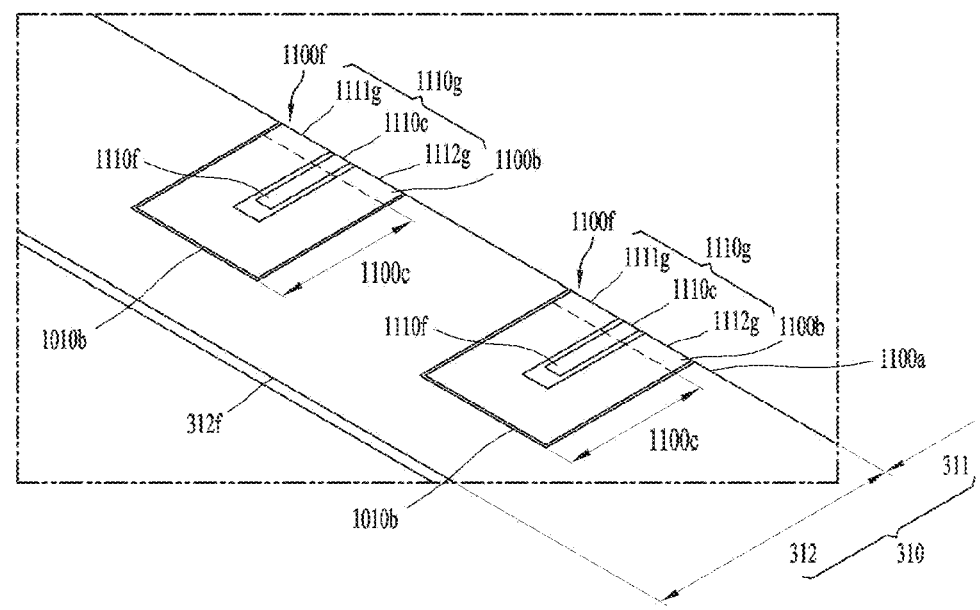
FIG. 21B is a view illustrating a structure in which a second dielectric substrate of the antenna assembly of FIG. 21A is disposed in an opaque region of a glass panel.

The foregoing description has been given of the antenna assembly with the transparent antenna structure according to one aspect of the specification. Hereinafter, an antenna assembly with a transparent antenna structure according to another aspect of the specification will be described. In this regard, FIG. 21A is a view illustrating the structure of an antenna assembly with a transparent antenna structure according to another aspect of the specification. FIG. 21B is a view illustrating a structure in which a second dielectric substrate of the antenna assembly of FIG. 21A is disposed in an opaque region of a glass panel.

Referring to FIGS. 1, 11A to 11C, 21A, and 21B, a vehicle may be configured to include a glass panel 310 and an antenna assembly 1000. The glass panel 310 may be configured to include a transparent region 311 and an opaque region 312. The antenna assembly 1000 may be disposed on the glass panel 310. The antenna assembly 1000 may include a first transparent dielectric substrate 1010a, an antenna element 1100, connection patterns 1110c and 1120c, a second dielectric substrate 1010b, a ground conductive pattern 1110g, and a feeding pattern 1110f.

The antenna assembly 1000 implemented as the transparent antenna may be designed as a CPW antenna structure in the form of a single layer. Meanwhile, the antenna assembly 1000 may include a first conductive pattern 1110 to a third conductive pattern 1130. Referring to FIG. 11B, the antenna assembly 1000 may include a first conductive pattern 1110 to a fourth conductive pattern 1140.

The first transparent dielectric substrate 1010a may include a first region 1100a and a second region 1100b. The first region 1100a may include an antenna element 1100 on one side of the first transparent dielectric substrate 1010a. The antenna element 1100 may be referred to as an antenna module 1100 because it includes a plurality of conductive patterns. The first region on one side of the first transparent dielectric substrate 1010a may be disposed in the transparent region 311 of the glass panel 310.

The connection patterns 1110c and 1120c may be connected to the antenna element 1100. The connection patterns 1110c and 1120c may be disposed in the second region 1110b on one side of the first transparent dielectric substrate 1010a. The second region 1100b on the one side of the first transparent dielectric substrate 1010b may be disposed in the opaque region 312 of the glass panel 310.

The second dielectric substrate 1010b may be disposed in the opaque region 312 of the glass panel 310. The ground conductive pattern 1110g and the feeding pattern 1110f may be disposed in the third region 1100c on one side of the second dielectric substrate 1010b.

The first conductive pattern 1110 may include a plurality of sub-patterns, namely, a plurality of conductive portions. The first ground region 1110 may include a first part 1111 and a second part 1112. The first part 1111 may be formed perpendicularly to the second part 1112. The second part 1112 may be electrically connected to the feeding pattern 1110f. In this regard, the meaning of "being electrically connected" may include that the respective conductive portions are connected either directly or by being spaced apart at a certain gap.

The second conductive pattern 1120 may be disposed in one side region or a lower region of the first conductive pattern 1110. The second conductive pattern 1120 may be electrically connected to a first part 1111g of the ground conductive pattern 1110g. The second conductive pattern 1120 may further be arranged on the antenna assembly 1000 to resonate further in a frequency band different from operating frequency bands of the first conductive pattern 1110 and the third conductive pattern 1130.

The third conductive pattern 1130 may be disposed in another side region of the first conductive pattern 1110. The third conductive pattern 1130 may be electrically connected to a second part 1112g of the ground conductive pattern 1110g. The third conductive pattern 1130 may include a third part 1131, a fourth part 1132, a fifth part 1133, and a sixth part 1134. As another example, the sixth part 1134 may be formed with the same width as the fifth part 1133 to be integrated with the fifth part 1133.

The third part 1131 of the third conductive pattern 1130 may be parallel to the fifth part 1133. A first end of the third part 1131 and a second end of the fifth part 1133 may be separated by a first gap G1. A second end of the third part 1131 and a first end of the fifth part 1133 may be connected by the fourth part 1132. The sixth part 1134 may be connected to the second end of the fifth part 1133. A portion of the sixth part 1134 may be electrically connected to the ground conductive pattern 1110g. A portion of the sixth part 1134 may be electrically connected to the second part 1112g of the ground conductive pattern 1110g.

The fourth conductive pattern 1140 may be formed to surround the first conductive pattern 1110, the second conductive pattern 1120, and the third conductive pattern 1130 on one side of the dielectric substrate 1010b. A first end of the fourth conductive pattern 1140 may be electrically connected to the third part 1113g of the ground conductive pattern 1110g. A second end of the fourth conductive pattern 1140 may be electrically connected to the fourth part 1114 of the ground conductive pattern 1110g.

Meanwhile, an antenna assembly according to the present disclosure may be configured to include a first transparent dielectric substrate, on which a transparent electrode layer is formed, and a second dielectric substrate. In this regard, FIG. 21C is a view illustrating the flow of processes in which the antenna assembly according to the embodiment is manufactured by being coupled to a glass panel according.

Figure 21C:
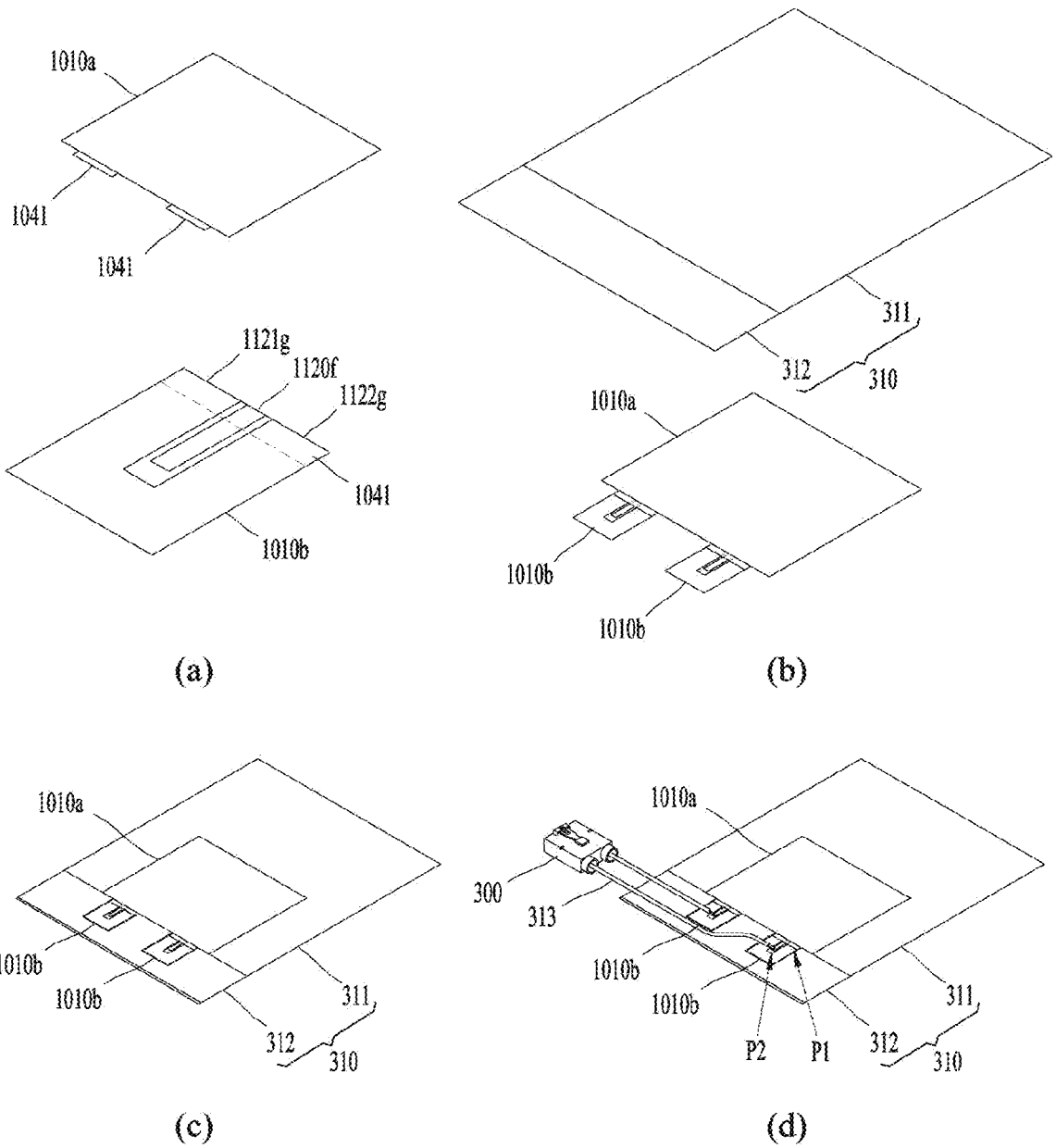
FIG. 21C is a view illustrating the flow of processes in which an antenna assembly is manufactured by being coupled to a glass panel according to an embodiment.

Referring to (a) of FIG. 21C, the first transparent dielectric substrate 1000a on which the transparent electrode layer is formed may be manufactured. In addition, the second dielectric substrate 1010b that includes the feeding pattern 1120f and the ground patterns 1121g and 1122g formed on both sides of the feeding pattern 1120f may be manufactured. The second dielectric substrate 1010b may be implemented as an FPCB, but is not limited thereto. Adhesion regions corresponding to the adhesive layers 1041 may be formed on the first transparent dielectric substrate 1000a and the second dielectric substrate 1010b, respectively.

Referring to (b) of FIG. 21C, the glass panel 310 with the transparent region 311 and the opaque region 312 may be manufactured. In addition, the antenna assembly 1000 may be manufactured by coupling at least one second dielectric substrate 1010b to the lower region of the first transparent dielectric substrate 1000a. The first transparent dielectric substrate 1000a and the second dielectric substrate 1010b may be coupled through ACF bonding or low-temperature soldering to be implemented as the transparent antenna assembly. Through this, the conductive pattern formed on the first transparent dielectric substrate 1000a can be electrically connected to the conductive pattern formed on the second dielectric substrate 1010b. When a plurality of antenna elements are implemented on the glass panel 310, the feeding structure 1100f made of the second dielectric substrate 1010b may also be implemented as a plurality of feeding structures.

Referring to (c) of FIG. 21C, the transparent antenna assembly 1000 may be attached to the glass panel 310. In this regard, the first transparent dielectric substrate 1000a on which the transparent electrode layer is formed may be disposed in the transparent region 311 of the glass panel 310. Meanwhile, the second dielectric substrate 1010b, which is the opaque substrate, may be disposed in the opaque region 312 of the glass panel 310.

Referring to (d) of FIG. 21C, the first transparent dielectric substrate 1000a and the second dielectric substrate 1010b may be bonded at a first position P1. The connector part 313, such as a Fakra cable, may be bonded to the second dielectric substrate 1010b at a second position P2. The transparent antenna assembly 1000 may be coupled to the telematics control unit (TCU) 300 through the connector part 313. To this end, the second conductive pattern formed on the second dielectric substrate 1010b may be electrically connected to a connector of one end of the connector part 313. A connector of another end of the connector part 313 may be electrically connected to the telematics control unit (TCU) 300.

Figure 22A:
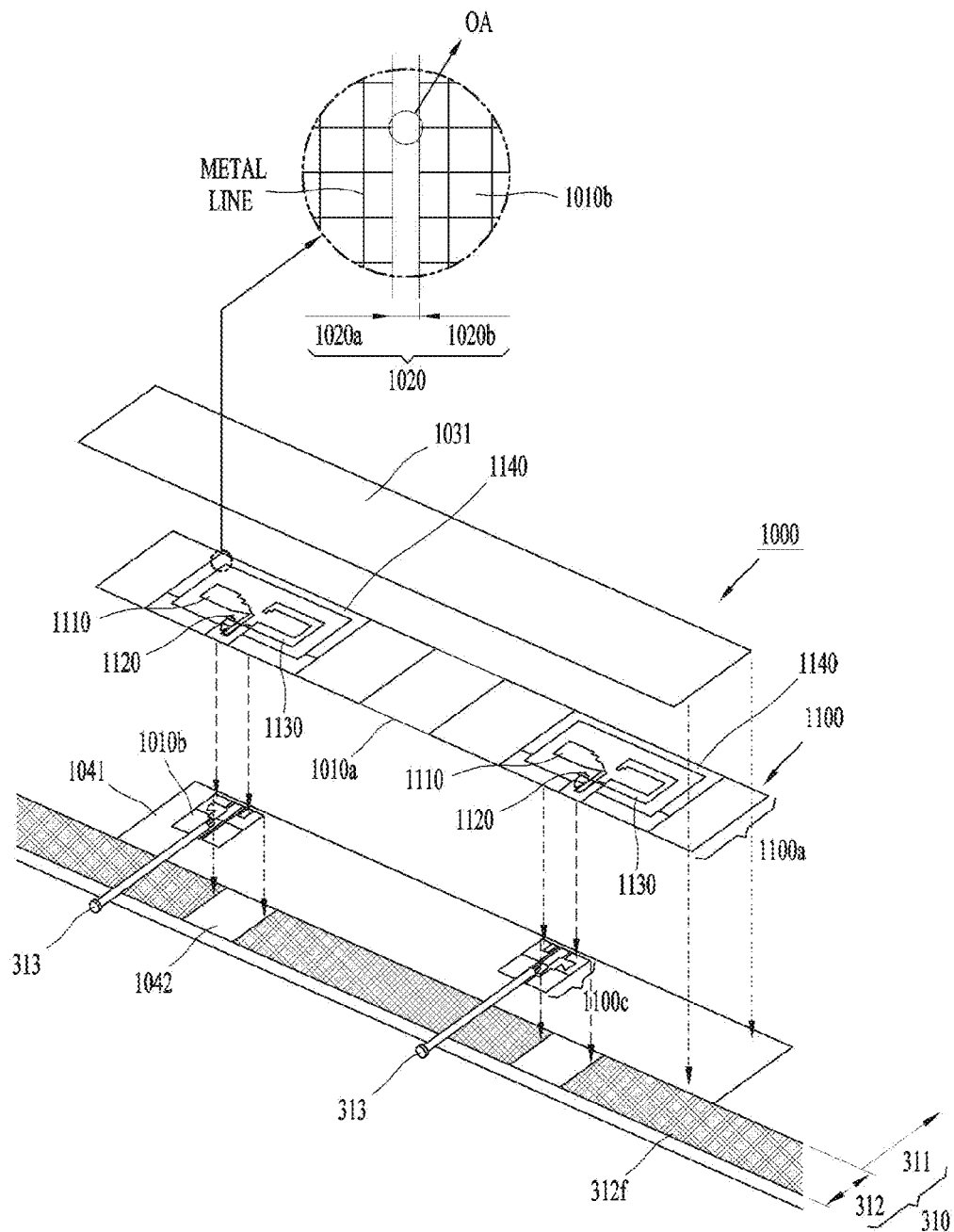
FIG. 22A is a view illustrating the structure of an antenna assembly with a transparent antenna structure according to still another aspect of the present disclosure.
Figure 22B:
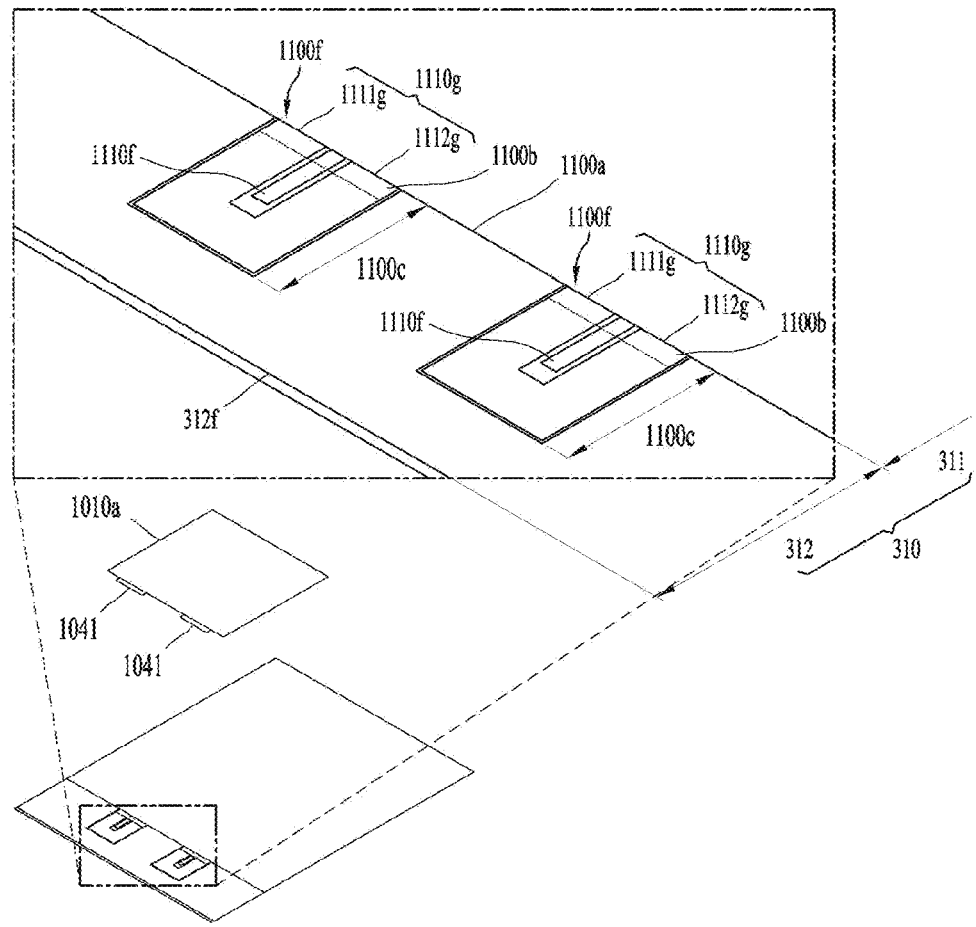
FIG. 22B is a process flowchart of a structure in which a feeding structure of the antenna assembly of FIG. 22A is disposed in an opaque region of a glass panel.
Figure 22B:
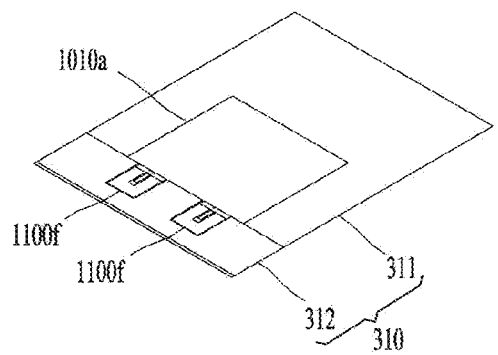
Figure 22B:
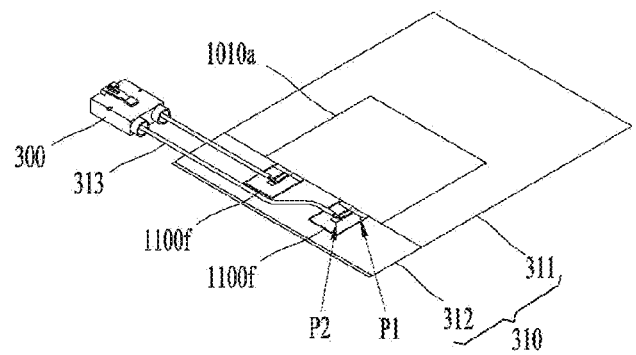
Figure 23:
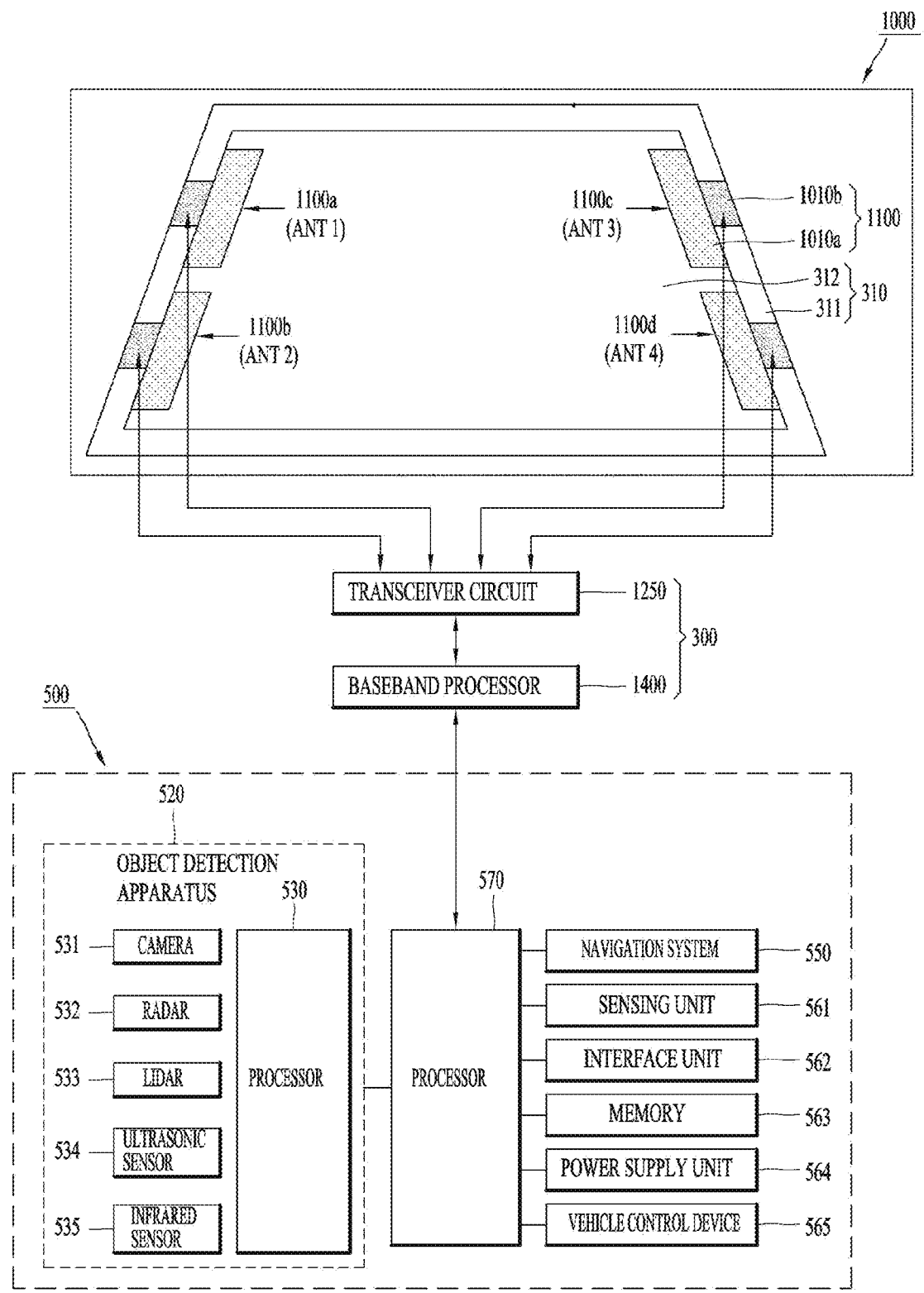
FIG. 23 illustrates an example of a configuration in which a plurality of antenna modules disposed at different positions of a vehicle are coupled with other components of the vehicle.

Hereinafter, an antenna assembly with a transparent antenna structure according to still another aspect of the specification will be described. In this regard, FIG. 22A is a view illustrating the structure of an antenna assembly with a transparent antenna structure according to still another aspect of the present specification. FIG. 22B is a process flowchart of a structure in which a feeding structure of the antenna assembly of FIG. 22A is disposed in an opaque region of a glass panel. In this regard, a feeding structure 1100f may be disposed in a region where a frit pattern 312f has been removed.

Referring to FIGS. 1, 11A to 11C, 22A, and 22B, a vehicle may be configured to include a glass panel 310 and an antenna assembly 1000. The glass panel 310 may be configured to include a transparent region 311 and an opaque region 312. One side of the opaque region 312 may include the ground conductive pattern 1110g and the feeding pattern 1110f. The frit pattern 312f may be removed from the region where the second dielectric substrate 1010b having the ground conductive pattern 1110g and the feeding pattern 1110f is disposed.

The antenna assembly 1000 may be disposed on the glass panel 310. The antenna assembly 1000 may include a first transparent dielectric substrate 1010a, an antenna element 1100, connection patterns 1110c and 1120c, a second dielectric substrate 1010b, a ground conductive pattern 1110g, and a feeding pattern 1110f.

The antenna assembly 1000 implemented as the transparent antenna may be designed as a CPW antenna structure in the form of a single layer. Meanwhile, the antenna assembly 1000 may include a first conductive pattern 1110 to a third conductive pattern 1130. Referring to FIG. 11B, the antenna assembly 1000 may include a first conductive pattern 1110 to a fourth conductive pattern 1140.

The first transparent dielectric substrate 1010a may include a first region 1100a and a second region 1100b. The first region 1100a may include an antenna element 1100 on one side of the first transparent dielectric substrate 1010a. The antenna element 1100 may be referred to as an antenna module 1100 because it includes a plurality of conductive patterns. The first region on one side of the first transparent dielectric substrate 1010a may be disposed in the transparent region 311 of the glass panel 310.

The connection patterns 1110c and 1120c may be connected to the antenna element 1100. The connection patterns 1110c and 1120c may be disposed in the second region 1110b on one side of the first transparent dielectric substrate 1010a. The second region 1100b on the one side of the first transparent dielectric substrate 1010b may be disposed in the opaque region 312 of the glass panel 310.

The second dielectric substrate 1010b may be disposed in the opaque region 312 of the glass panel 310. The ground conductive pattern 1110g and the feeding pattern 1110f may be disposed in the third region 1100c on one side of the second dielectric substrate 1010b.

The first conductive pattern 1110 may include a plurality of sub-patterns, namely, a plurality of conductive portions. The first ground region 1110 may include a first part 1111 and a second part 1112. The first part 1111 may be formed perpendicularly to the second part 1112. The second part 1112 may be electrically connected to the feeding pattern 1110f. In this regard, the meaning of "being electrically connected" may include that the respective conductive portions are connected either directly or by being spaced apart at a certain gap.

The second conductive pattern 1120 may be disposed in one side region or a lower region of the first conductive pattern 1110. The second conductive pattern 1120 may be electrically connected to a first part 1111g of the ground conductive pattern 1110g. The second conductive pattern 1120 may further be arranged on the antenna assembly 1000 to resonate further in a frequency band different from operating frequency bands of the first conductive pattern 1110 and the third conductive pattern 1130.

The third conductive pattern 1130 may be disposed in another side region of the first conductive pattern 1110. The third conductive pattern 1130 may be electrically connected to a second part 1112g of the ground conductive pattern 1110g. The third conductive pattern 1130 may include a third part 1131, a fourth part 1132, a fifth part 1133, and a sixth part 1134. As another example, the sixth part 1134 may be formed with the same width as the fifth part 1133 to be integrated with the fifth part 1133.

The third part 1131 of the third conductive pattern 1130 may be parallel to the fifth part 1133. A first end of the third part 1131 and a second end of the fifth part 1133 may be separated by a first gap G1. A second end of the third part 1131 and a first end of the fifth part 1133 may be connected by the fourth part 1132. The sixth part 1134 may be connected to the second end of the fifth part 1133. A portion of the sixth part 1134 may be electrically connected to the ground conductive pattern 1110g. A portion of the sixth part 1134 may be electrically connected to the second part 1112g of the ground conductive pattern 1110g.

The fourth conductive pattern 1140 may be formed to surround the first conductive pattern 1110, the second conductive pattern 1120, and the third conductive pattern 1130 on one side of the dielectric substrate 1010b. A first end of the fourth conductive pattern 1140 may be electrically connected to the third part 1113g of the ground conductive pattern 1110g. A second end of the fourth conductive pattern 1140 may be electrically connected to the fourth part 1114 of the ground conductive pattern 1110g.

The antenna assembly of FIG. 22B has a structural difference, compared to the antenna assembly of FIG. 21C, in that the opaque substrate is not manufactured separately but is manufactured integrally with the glass panel 310. The antenna assembly of FIG. 22B is implemented in such a way that the feeding structure implemented as the opaque substrate is directly printed on the glass panel 310 rather than being separately manufactured as an FPCB.

Referring to (a) of FIG. 22B, the first transparent dielectric substrate 1000a on which the transparent electrode layer is formed may be manufactured. In addition, the glass panel 310 with the transparent region 311 and the opaque region 312 may be manufactured. In the process of manufacturing of the glass panel of the vehicle, metal wires/pads for connection of the connectors may be implemented (fired). Like heating wires implemented on the vehicle glass, a transparent antenna mounting portion may be implemented in a metal form on the glass panel 310. In this regard, a second conductive pattern may be implemented on the region where the adhesive layer 1041 is formed for electrical connection to the first conductive pattern of the first transparent dielectric substrate 1000a.

In this regard, the second dielectric substrate 1010b on which the second conductive pattern is formed may be manufactured integrally with the glass panel 310. The second dielectric substrate 1010b may be formed integrally with the glass panel 310 on the opaque region 312 of the glass panel 310. The frit pattern 312 may be removed from the opaque region 312 where the second dielectric substrate 1010b is formed. The second conductive pattern may be implemented by forming the feeding pattern 1110f and the ground patterns 1111g and 1112g on both sides of the feeding pattern 1110f on the second dielectric substrate 1010b.

Referring to (b) of FIG. 22B, the transparent antenna assembly 1000 may be attached to the glass panel 310. In this regard, the first transparent dielectric substrate 1000a on which the transparent electrode layer is formed may be disposed in the transparent region 311 of the glass panel 310. The antenna assembly 1000 may be manufactured by coupling at least one second dielectric substrate 1010b to the lower region of the first transparent dielectric substrate 1000a. The first transparent dielectric substrate 1000a and the second dielectric substrate 1010b may be coupled through ACF bonding or low-temperature soldering to be implemented as the transparent antenna assembly. Through this, the first conductive pattern formed on the first transparent dielectric substrate 1000a can be electrically connected to the second conductive pattern formed on the second dielectric substrate 1010b. When a plurality of antenna elements are implemented on the glass panel 310, the feeding structure 1100f made of the second dielectric substrate 1010b may also be implemented as a plurality of feeding structures.

Referring to (c) of FIG. 22B, the first transparent dielectric substrate 1000a and the second dielectric substrate 1010b may be bonded at a first position P1. The connector part 313, such as a Fakra cable, may be bonded to the second dielectric substrate 1010b at a second position P2. The transparent antenna assembly 1000 may be coupled to the telematics control unit (TCU) 300 through the connector part 313. To this end, the second conductive pattern formed on the second dielectric substrate 1010b may be electrically connected to a connector of one end of the connector part 313. A connector of another end of the connector part 313 may be electrically connected to the telematics control unit (TCU) 300.

Hereinafter, a vehicle having an antenna module according to one example will be described in detail. In this regard, FIG. 22 illustrates an example of a configuration in which a plurality of antenna modules disposed at different positions of a vehicle are coupled with other parts of the vehicle.

Referring to FIGS. 1 to 23, the vehicle 500 may include a conductive vehicle body operating as an electrical ground. The vehicle 500 may include a plurality of antennas 1100a to 1100d that can be disposed at different positions on the glass panel 310. The antenna assembly 1000 may be configured such that the plurality of antennas 1100a to 1100d include a communication module 300. The communication module 300 may include a transceiver circuit 1250 and a processor 1400. The communication module 300 may correspond to the TCU of the vehicle or may constitute at least a portion of the TCU.

The vehicle 500 may include an object detecting apparatus 520 and a navigation system 550. The vehicle 500 may further include a separate processor 570 in addition to the processor 1400 included in the communication module 300. The processor 1400 and the separate processor 570 may be physically or functionally separated and implemented on one substrate. The processor 1400 may be implemented as a TCU, and the processor 570 may be implemented as an electronic control unit (ECU).

In case where the vehicle 500 is an autonomous vehicle, the processor 570 may be an autonomous driving control unit (ADCU) integrated with an ECU. Based on information detected through the camera 531, radar 532, and/or lidar 533, the processor 570 may search for a path and control the speed of the vehicle 500 to accelerate or decelerate. To this end, the processor 570 may interoperate with the processor 530 corresponding to the MCU in the object detecting apparatus 520 and/or the communication module 300 corresponding to the TCU.

The vehicle 500 may include the first transparent dielectric substrate 1010a and the second dielectric substrate 1010b disposed on the glass panel 310. The first transparent dielectric substrate 1010a may be formed inside the glass panel 310 of the vehicle or may be attached to the surface of the glass panel 310. The first transparent dielectric substrate 1010a may be configured such that conductive patterns in the metal mesh grid shape are formed. The vehicle 500 may include an antenna module 1100 that is formed in a metal mesh shape on one side of the dielectric substrate 1010 to radiate wireless signals.

The antenna assembly 1000 may include a first antenna module 1100a to a fourth antenna module 1100d to perform MIMO. The first antenna module 1100a, the second antenna module 1100b, the third antenna module 1100c, and the fourth antenna module 1100d may be disposed on the upper left, lower left, upper right, and lower right sides of the glass panel 310, respectively. The first antenna module 1100a to the fourth antenna module 1100d may be referred to as a first antenna ANT1 to a fourth antenna ANT4, respectively. The first antenna ANT1 to the fourth antenna ANT4 may be referred to as the first antenna module ANT1 to the fourth antenna module ANT4, respectively.

As described above, the vehicle 500 may include the telematics control unit (TCU) 300, which is the communication module. The TCU 300 may control signals to be received and transmitted through at least one of the first to fourth antenna modules 1100a to 1100d. The TCU 300 may include a transceiver circuit 1250 and a processor 1400.

Accordingly, the vehicle may further include a transceiver circuit 1250 and a processor 1400. A portion of the transceiver circuit 1250 may be disposed in units of antenna modules or in combination thereof. The transceiver circuit 1250 may control a radio signal of at least one of the first to third frequency bands to be radiated through the antenna modules ANT1 to ANT4. The first to third frequency bands may be low band (LB), mid band (MB), and high band (HB) for 4G/5G wireless communications, but are not limited thereto.

The processor 1400 may be operably coupled to the transceiver circuit 1250 and may be configured as a modem operating in a baseband. The processor 1400 may receive or transmit a signal through at least one of the first antenna module ANT1 and the second antenna module ANT2. The processor 1400 may perform a diversity operation or MIMO using the first antenna module ANT1 and the second antenna module ANT2 such that a signal is transmitted to the inside of the vehicle.

Antenna modules may be disposed in different regions of one side surface and another side surface of the glass panel 310. The antenna modules may perform MIMO by simultaneously receiving signals from the front of the vehicle. In this regard, to perform 4×4 MIMO, the antenna modules may further include a third antenna module ANT3 and a fourth antenna module ANT4 in addition to the first antenna module ANT1 and the second antenna module ANT2.

The processor 1400 may select an antenna module to perform communication with an entity based on a driving path of the vehicle and a communication path with the entity communicating with the vehicle. The processor 1400 may perform MIMO by using the first antenna module ANT1 and the second antenna module ANT2 based on a direction that the vehicle travels. Alternatively, the processor 1400 may perform MIMO through the third antenna module ANT2 and the fourth antenna module ANT4 based on the direction that the vehicle travels.

The processor 1400 may perform MIMO in the first band through at least two of the first antenna ANT1 to the fourth antenna ANT4. The processor 1400 may perform MIMO in at least one of the second band and the third band through at least two of the first antenna ANT1 to the fourth antenna ANT4.

Accordingly, when signal transmission/reception performance of the vehicle in any one band is deteriorated, signal transmission/reception in the vehicle can be performed in other bands. For example, the vehicle may preferentially perform communication connection in the first band, which is the low band, for wide communication coverage and connection reliability, and then perform communication connection in the second and third bands.

The processor 1400 may control the transceiver circuit 1250 to perform the CA or DC through at least one of the first antenna ANT1 to the fourth antenna ANT4. In this regard, communication capacity can be expanded through the aggregation of the second band and the third band, which are wider than the first band. In addition, communication reliability can be improved through the dual connectivity with neighboring vehicles or entities by using the plurality of antenna elements disposed at the different regions of the vehicle.

The foregoing description has been given of the broadband transparent antenna assembly that may be placed on the vehicle glass and the vehicle equipped therewith. Hereinafter, the technical effects of a broadband transparent antenna assembly that may be disposed on vehicle glass and a vehicle equipped therewith will be described.

According to this specification, an antenna assembly that can be disposed on vehicle glass can be implemented to operate in a plurality of operating modes to achieve a broadband operation.

According to this specification, the antenna efficiency of a broadband transparent antenna assembly can be improved by optimizing the shapes of conductive patterns that may be disposed within a limited space of vehicle glass.

According to this specification, impedance matching characteristics and antenna efficiency of a broadband transparent antenna assembly can be improved by forming conductive patterns in a complementary structure.

According to this specification, an antenna radiation pattern in a low elevation area can be improved by forming a conductive pattern operating as a ground to surround conductive patterns operating as radiators.

According to this specification, a conductive pattern operating as a ground can be formed to surround conductive patterns operating as radiators, thereby improving low elevation radiation characteristics in a structure in which an antenna assembly is disposed on rear glass or front glass configured in an inclined shape among various types of vehicle glass.

According to this specification, a ground conductive pattern of a ground ring structure can be arranged around antenna elements or between antenna elements to improve antenna performance, including isolation characteristics, during a MIMO operation.

According to this specification, an antenna assembly made of a transparent material can be optimally configured in a transparent region and an opaque region of vehicle glass, so that an antenna region is invisible on the vehicle glass.

According to this specification, a difference in visibility between a region where an antenna made of a transparent material to be disposed on vehicle glass is disposed and the other region can be minimized through optimization with a frit pattern for each metal mesh region.

According to this specification, a step that is generated when an opaque substrate is coupled to a transparent electrode part can be removed, thereby solving the problem of deteriorated visibility and mass production due to the step upon the coupling.

According to this specification, invisibility of a transparent antenna for a vehicle and an antenna assembly including the same can be secured without feeding loss and deterioration of antenna performance, which are caused by an increase in length of a transmission line due to a separate impedance matching part.

According to this specification, it is possible to ensure both invisibility of an antenna pattern and the shape of a transmission line and invisibility of an antenna assembly including a transparent electrode part and an opaque substrate part when the antenna assembly is attached to vehicle glass.

According to this specification, a wideband antenna structure made of a transparent material that can be implemented in various shapes on a single plane can be provided through a plurality of metal mesh-shaped conductive patterns, a CPW feeder, and a conversion structure between them.

According to this specification, a wideband antenna structure made of a transparent material that can reduce feeding loss and improve antenna efficiency while operating in a wide band can be provided through a transparent region and a frit region of vehicle glass.

Further scope of applicability of the present disclosure will become apparent from the following detailed description. It should be understood, however, that the detailed description and specific examples, such as the preferred embodiment of the invention, are given by way of illustration only, since various changes and modifications within the spirit and scope of the invention will be apparent to those skilled in the art.

In relation to the aforementioned present disclosure, design and operations of an antenna assembly having transparent antennas and a vehicle controlling the same can be implemented as computer-readable codes in a program-recorded medium. The computer-readable medium may include all types of recording devices each storing data readable by a computer system. Examples of such computer-readable media may include hard disk drive (HDD), solid state disk (SSD), silicon disk drive (SDD), ROM, RAM, CD-ROM, magnetic tape, floppy disk, optical data storage element and the like. Also, the computer-readable medium may also be implemented as a format of carrier wave (e.g., transmission via an Internet). The computer may include the controller of the terminal. Therefore, the detailed description should not be limitedly construed in all of the aspects, and should be understood to be illustrative. Therefore, all changes and modifications that fall within the metes and bounds of the claims, or equivalents of such metes and bounds are therefore intended to be embraced by the appended claims.

The invention claimed is:

1. A vehicle comprising:
a transparent dielectric substrate comprising a first region and a second region;
an antenna disposed at a first region of the dielectric substrate; and
a ground conductive pattern and a feeding pattern disposed in the second region of the dielectric substrate,
wherein the antenna comprises:
a first conductive pattern comprising a first part and a second part, wherein the first part is connected and perpendicular to the second part and the second part is connected to the feeding pattern;
a second conductive pattern electrically connected to a first part of the ground conductive pattern;
a third conductive pattern comprising a third part, a fourth part, a fifth part, and a sixth part, wherein:
a length of the third part is parallel to a length the fifth part,
a first end of the third part and a second end of the fifth part are separated by a first gap,
a second end of the third part and a first end of the fifth part are connected by the fourth part,
the sixth part is connected to the second end of the fifth part, and
the sixth part is electrically connected to the ground conductive pattern; and
a fourth conductive pattern configured to surround the first conductive pattern, the second conductive pattern, and the third conductive pattern on the dielectric substrate,
wherein a first end of the fourth conductive pattern is electrically connected to a third part of the ground conductive pattern, and a second end of the fourth conductive pattern is electrically connected to a fourth part of the ground conductive pattern.

2. The vehicle of claim 1, wherein the first conductive pattern and the third conductive pattern operate in a quasi self-complementary dipole antenna mode in a first frequency band.

3. The vehicle of claim 2, wherein the first conductive pattern operates in a monopole antenna mode in a second frequency band, and
the second frequency band is wider than the first frequency band.

4. The vehicle of claim 3, wherein the second conductive pattern operates in a third frequency band, and the third frequency band is wider than the second frequency band.

5. The vehicle of claim 1, wherein a size of the first conductive pattern is smaller than a size of the third conductive pattern,
the second conductive pattern is arranged between the first part of the first conductive pattern and the ground conductive pattern, and
the first part of the ground conductive pattern comprises a first open slot.

6. The vehicle of claim 1, wherein a measurement along a first axis of the fifth part of the third conductive pattern is $\lambda gh/2$ or less, wherein $\lambda gh$ denotes a guided wavelength corresponding to a highest frequency of an operating frequency band.

7. The vehicle of claim 1, wherein a measurement along a first axis of a gap between the first part of the first conductive pattern and the first part of the ground conductive pattern is equal to a measurement along the first axis of the fifth part of the third conductive pattern.

8. The vehicle of claim 1, wherein a measurement from an outer end of the first conductive pattern to an outer end of the third conductive pattern is equal to $\lambda gl/2$, wherein $\lambda gl$ denotes an induced wavelength corresponding to a lowest frequency of an operating frequency band.

9. The vehicle of claim 1, wherein a middle portion of the third part and a middle portion of the fourth part are separated by a second gap, and the first gap is smaller than the second gap.

10. The vehicle of claim 1, wherein the third part, the fourth part, and the fifth part of the third conductive pattern form a second open slot, and
a shape of the second open slot is similar to a shape of the first part of the first conductive pattern.

11. The vehicle of claim 1, wherein a gap between the third conductive pattern and the fourth conductive pattern is equal to or smaller than $\lambda gh/4$.

12. The vehicle of claim 1, wherein a width of the fourth conductive pattern is equal to or smaller than $\lambda gh/2$.

13. The vehicle of claim 1, wherein:
a first outer side of the first part of the first conductive pattern is formed in a straight line,
a second outer side of the first part of the first conductive pattern is formed with a stepped shape,
a third outer side of the first part of the first conductive pattern is arranged between a first end of the first outer side and a first end of the second outer side, and
a fourth outer side of the first part of the first conductive pattern is arranged between a second end of the first outer side and a second end of the second outer side.

14. The vehicle of claim 1, wherein:
the first part of the ground conductive pattern and the third part of the ground conductive pattern are separated by a first ground gap portion, and
the second part of the ground conductive pattern and the fourth part of the ground conductive pattern are separated by a second ground gap portion.

15. The vehicle of claim 14, wherein the second ground gap portion is greater than or equal to the first ground gap portion.

16. The vehicle of claim 1, wherein:
the first conductive pattern, the second conductive pattern, the third conductive pattern, and the fourth conductive pattern are formed in a metal mesh shape having a plurality of opening areas on the transparent dielectric substrate, and the first conductive pattern, the second conductive pattern, and the third conductive pattern are formed in a Coplanar Waveguide (CPW) structure on the transparent dielectric substrate.

17. The vehicle of claim 1, wherein:
the antenna comprises a plurality of dummy mesh grid patterns at an outer portions of the first, second, and third conductive patterns on the transparent dielectric substrate,
the plurality of dummy mesh grid patterns are not connected to the feeding pattern and the ground conductive pattern, and
the plurality of dummy mesh grid patterns are separated from each other.

18. A vehicle comprising:
a glass panel comprising a transparent region and an opaque region; and
an antenna assembly disposed on the glass panel,
wherein the antenna assembly comprises:
a first transparent dielectric substrate comprising a first region and a second region;
an antenna element disposed at the first region of the first transparent dielectric substrate, wherein the first region is disposed at the transparent region of the glass panel;
first connection patterns connected to the antenna element and disposed in the second region, wherein the second region is disposed at the opaque region of the glass panel;
a second dielectric substrate disposed at the opaque region of the glass panel; and
a ground conductive pattern and a feeding pattern disposed at a third region of the second dielectric substrate,
wherein the antenna pattern comprises:
a first conductive pattern comprising a first part and a second part, wherein the first part is connected and perpendicular to the second part and the second part is connected to the feeding pattern;
a second conductive pattern electrically connected to a first part of the ground conductive pattern;
a third conductive pattern comprising a third part, a fourth part, a fifth part, and a sixth part, wherein:
 a length of the third part is parallel to a length of the fifth part,
 a first end of the third part and a second end of the fifth part are separated by a first gap,
 a second end of the third part and a first end of the fifth part are connected by the fourth part,
 the sixth part is connected to the second end of the fifth part, and
 the sixth part is electrically connected to the ground conductive pattern; and
a fourth conductive pattern configured to surround the first conductive pattern, the second conductive pattern, and the third conductive pattern on the dielectric substrate, and
wherein a first end of the fourth conductive pattern is electrically connected to a third part of the ground conductive pattern, and a second end of the fourth conductive pattern is electrically connected to a fourth part of the ground conductive pattern.

19. A vehicle comprising:
a glass panel comprising a transparent region and an opaque region, wherein the opaque region comprises a ground conductive pattern and a feeding pattern; and
an antenna assembly disposed on the glass panel,
wherein the antenna assembly comprises:
a first transparent dielectric substrate comprising a first region and a second region;
an antenna element disposed at the first region of the first transparent dielectric substrate, wherein the first region is disposed at the transparent region of the glass panel;
first connection patterns connected to the antenna element and disposed in the second region, wherein the second region is disposed at the opaque region of the glass panel;
a second dielectric substrate disposed at the opaque region of the glass panel; and
a ground conductive pattern and a feeding pattern disposed at a third region of the second dielectric substrate,
wherein the antenna element comprises:
a first conductive pattern comprising a first part and a second part, wherein the first part is connected and perpendicular to the second part and the second part is connected to the feeding pattern;
a second conductive pattern electrically connected to a first part of the ground conductive pattern;
a third conductive pattern comprising a third part, a fourth part, a fifth part, and a sixth part, wherein:
a length of the third part is parallel to a length of the fifth part,
a first end of the third part and a second end of the fifth part are separated by a first gap,
a second end of the third part and a first end of the fifth part are connected by the fourth part,
the sixth part is connected to the second end of the fifth part, and
the sixth part is electrically connected to the ground conductive pattern; and
a fourth conductive pattern configured to surround the first conductive pattern, the second conductive pattern, and the third conductive pattern, and
wherein a first end of the fourth conductive pattern is electrically connected to a third part of the ground conductive pattern, and a second end of the fourth conductive pattern is electrically connected to a fourth part of the ground conductive pattern.

\* \* \* \* \*